US009094899B2

(12) United States Patent
Smith et al.

(10) Patent No.: US 9,094,899 B2
(45) Date of Patent: Jul. 28, 2015

(54) CELL SELECTION IN DYNAMIC SPECTRUM ARBITRAGE SYSTEM

(71) Applicant: Rivada Networks, LLC, Colorado Springs, CO (US)

(72) Inventors: Clint Smith, Warwick, NY (US); Nageswara Rao Deekshitha Devisetti, Bangalore (IN); Samuel Smith, Warwick, NY (US)

(73) Assignee: Rivada Networks, LLC, Colorado Springs, CO (US)

( * ) Notice: Subject to any disclaimer, the term of this patent is extended or adjusted under 35 U.S.C. 154(b) by 0 days.

(21) Appl. No.: 14/287,096

(22) Filed: May 26, 2014

(65) Prior Publication Data

US 2014/0357285 A1    Dec. 4, 2014

Related U.S. Application Data

(60) Provisional application No. 61/827,927, filed on May 28, 2013.

(51) Int. Cl.
*H04W 36/00* (2009.01)
*H04W 4/00* (2009.01)
(Continued)

(52) U.S. Cl.
CPC .............. *H04W 48/17* (2013.01); *H04W 76/02* (2013.01)

(58) Field of Classification Search
CPC ....... H04W 16/14; H04W 24/00; H04W 4/20; H04W 4/22; H04W 72/00; H04W 28/04; H04W 28/16; H04W 84/18; H04W 16/18; H04W 28/0226; H04W 36/0055; H04W 40/08; H04W 40/20; H04W 48/17; H04W 72/0453
USPC ............. 455/450, 62, 452.1, 434, 454, 67.11, 455/67.16, 418, 41.2, 423, 452.2, 509, 515, 455/522, 436; 370/329, 338, 252, 328, 230, 370/331, 235
See application file for complete search history.

(56) References Cited

U.S. PATENT DOCUMENTS 7,228,355 B2 *   6/2007   Dowling .................... 709/230
7,236,791 B2     6/2007   Chambers et al.
(Continued)

FOREIGN PATENT DOCUMENTS

EP         2417786 B1       12/2012
JP       2012-029259 A       2/2012
(Continued)

OTHER PUBLICATIONS

International Search Report and Written Opinion issued in International Application No. PCT/US2014/039561 mailed on Oct. 1, 2014.
(Continued)

*Primary Examiner* — Inder Mehra
(74) *Attorney, Agent, or Firm* — The Marbury Law Group, PLLC

(57) ABSTRACT

A dynamic spectrum arbitrage (DSA) system may include a dynamic spectrum policy controller (DPC) and a dynamic spectrum controller (DSC) that together dynamically manage the allocation and use of resources (e.g., spectrum resources) across different networks. A wireless device may be configured to intelligently select and use these allocated resources. For example, the wireless device may be configured to traverse an ordered list of preferred of networks to identify and select a first cell site in a first telecommunication network, establish a first communication link between the wireless device and the selected first cell site, receive network information identifying a geographic region in which the wireless device is allowed to use resources of a second telecommunication network, determine whether the wireless device is in the geographical region, and establish a second communication link to a second cell in the second telecommunication network based on the received network information.

16 Claims, 30 Drawing Sheets

(51) Int. Cl.
*H04W 40/00* (2009.01)
*H04W 68/00* (2009.01)
*H04W 48/00* (2009.01)
*H04W 76/02* (2009.01)

(56) References Cited

U.S. PATENT DOCUMENTS

| | | |
|---|---|---|
| 8,199,768 B1 | 6/2012 | Gossett et al. |
| 8,310,946 B2 | 11/2012 | Somasundaram et al. |
| 2006/0245404 A1 | 11/2006 | Bajic |
| 2007/0149187 A1 | 6/2007 | Levy |
| 2007/0280177 A1 | 12/2007 | Uusikartano et al. |
| 2008/0108365 A1 | 5/2008 | Buddhikot et al. |
| 2008/0127232 A1 | 5/2008 | Langen et al. |
| 2009/0059856 A1 | 3/2009 | Kermoal et al. |
| 2009/0143046 A1 | 6/2009 | Smith |
| 2009/0161614 A1 | 6/2009 | Grandblaise et al. |
| 2009/0298461 A1 | 12/2009 | O'Reilly |
| 2011/0125905 A1 | 5/2011 | Baucke et al. |
| 2011/0158090 A1 | 6/2011 | Riley et al. |
| 2011/0228707 A1 | 9/2011 | Multikainen et al. |
| 2011/0228750 A1 | 9/2011 | Tomici et al. |
| 2011/0231302 A1 | 9/2011 | Stanforth et al. |
| 2011/0269464 A1 | 11/2011 | Xu et al. |
| 2012/0014332 A1 | 1/2012 | Smith et al. |
| 2012/0134328 A1 | 5/2012 | Gauvreau et al. |
| 2012/0165020 A1 | 6/2012 | Iwamura et al. |
| 2012/0264396 A1 | 10/2012 | Smith et al. |
| 2012/0320741 A1 | 12/2012 | Freda et al. |
| 2013/0045759 A1 | 2/2013 | Smith |
| 2013/0072146 A1 | 3/2013 | Smith |
| 2013/0095843 A1 | 4/2013 | Smith et al. |

FOREIGN PATENT DOCUMENTS

| | | |
|---|---|---|
| KR | 10-2012-0126032 A | 11/2012 |
| KR | 10-2013-0015529 A | 2/2013 |
| KR | 10-2013-0048561 A | 5/2013 |
| WO | 2010-049002 A1 | 5/2010 |
| WO | 2012-030190 A2 | 3/2012 |
| WO | 2012-037236 A2 | 5/2012 |
| WO | 2012-064563 A1 | 5/2012 |

OTHER PUBLICATIONS

International Search Report and Written Opinion issued in International Application No. PCT/US2014/039546 mailed on Oct. 2, 2014.

International Search Report and Written Opinion issued in International Application No. PCT/US2014/039580 mailed on Sep. 24, 2014.

International Search Report and Written Opinion issued in International Application No. PCT/US2014/039589 mailed on Sep. 24, 2014.

International Search Report and Written Opinion issued in International Application No. PCT/US2014/039592 mailed on Sep. 24, 2014.

International Search Report and Written Opinion issued in International Application No. PCT/US2014/039696 mailed on Sep. 23, 2014.

International Search Report and Written Opinion issued in International Application No. PCT/US2014/039757 mailed on Oct. 1, 2014.

International Search Report and Written Opinion issued in International Application No. PCT/US2014/039770 mailed on Sep. 29, 2014.

International Search Report and Written Opinion issued in International Application No. PCT/US2014/039785 mailed on Sep. 24, 2014.

International Search Report and Written Opinion issued in International Application No. PCT/US2014/039573 mailed on Oct. 14, 2014.

* cited by examiner

CELL SELECTION IN DYNAMIC SPECTRUM ARBITRAGE SYSTEM

RELATED APPLICATIONS

This application claims the benefit of priority to U.S. Provisional Application No. 61/827,927, entitled "Methods and Systems for Dynamic Arbitrage Cell Selection" filed May 28, 2013, the entire contents of which are hereby incorporated by reference.

BACKGROUND

With the ever increasing use of wireless communication devices for accessing networks and downloading large files (e.g., video files), there is an increasing demand for radio frequency spectrum. Smart phone users complain about dropped calls, slow access to the Internet and similar problems which are due largely to too many devices trying to access finite RF bandwidth allocated to such services. Yet parts of the RF spectrum, such as the RF bands dedicated to emergency services (e.g., police, fire and rescue, etc.), go largely unused due to the non-continuous and episodic employment of such voice-radio communication bands. Therefore, improved methods and solutions for dynamically allocating underutilized telecommunication resources (e.g., RF spectrum, etc.) of a first telecommunication network for access and use by wireless devices that subscribe to other networks will be beneficial to the telecommunication networks, service providers, and to the consumers of telecommunication services.

SUMMARY

The various embodiments include dynamic spectrum arbitrage (DSA) methods that include traversing by a processor of a wireless device an ordered list of preferred of networks to select a first cell site in a first telecommunication network, establishing a first communication link between the wireless device and the selected first cell site, receiving in the wireless device network information identifying a geographic region in which the wireless device is allowed to use resources of a second telecommunication network, determining whether the wireless device is in the geographical region, and establishing a second communication link between the wireless device and a second cell in the second telecommunication network based on the received network information and in response to determining that the wireless device is in the geographical region.

In an embodiment, receiving network information may include receiving a closed subscriber group (CSG) identifier that defines a specific CSG or hybrid cell in the second telecommunication network. In a further embodiment, establishing the first communication link between the wireless device and the selected first cell site may include establishing the first communication link to a home network of the wireless device, and establishing the second communication link between the wireless device and the second cell in the second telecommunication network based on the received network information may include establishing the second communication link to a cell site in a lessor network that is different than the home network of the wireless device.

In a further embodiment, receiving network information may include receiving system information block (SIB) information. In a further embodiment, establishing the second communication link between the wireless device and the second cell in the second telecommunication network based on the received network may include establishing a connection between the wireless device and another Radio Access Technology (RAT) that is associated with the same or another network. In a further embodiment, establishing the second communication link between the wireless device and the second cell in the second telecommunication network based on the received network may include establishing a connection on another frequency band. In a further embodiment, the wireless device may include a dual USIM configured to facilitate the proper acquisition of a network using a DSA process.

In a further embodiment, the method may include receiving the network information in a first dynamic spectrum controller (DSC) in the first telecommunication network, sending the network information from the first DSC to a dynamic spectrum policy controller (DPC) that is outside of the first and second telecommunication networks, and sending the network information from the DPC to a second DSC in the second telecommunication network. In a further embodiment, the method may include receiving in a processor of the DPC a request for radio frequency (RF) spectrum resources from the first DSC, determining an amount of RF spectrum resources available for allocation within the second telecommunication network, dynamically allocating a portion of available RF spectrum resources of the second telecommunication network for access and use by the first telecommunication network, and informing the first DSC that use of allocated RF spectrum resources may begin.

Further embodiments may include dynamic spectrum arbitrage (DSA) system that may include a first dynamic spectrum controller (DSC) including a first DSC processor, an eNodeB, and a wireless device including a device processor. The device processor may be configured with processor-executable instructions to perform operations that include traversing an ordered list of preferred of networks to select a first cell site in a first telecommunication network, establishing a first communication link to the selected first cell site, receiving network information from the DSC identifying a specific geographic region in which the wireless device is allowed to use resources of a second telecommunication network, determining whether the wireless device is in the geographical region, and establishing a second communication link to a second cell in the second telecommunication network based on the received network information.

In an embodiment, the device processor may be configured with processor-executable instructions to perform operations such that receiving network information includes receiving a closed subscriber group (CSG) identifier that defines a specific CSG or hybrid cell in the second telecommunication network. In an embodiment, the device processor may be configured with processor-executable instructions to perform operations such that establishing the first communication link to the selected first cell site includes establishing the first communication link to a cell site in the home network of the wireless device, and establishing a second communication link to a second cell in the second telecommunication network based on the received network information may include establishing the second communication link to a cell site in a lessor network that is different than the home network of the wireless device.

In an embodiment, the device processor may be configured with processor-executable instructions to perform operations such that receiving network information includes receiving system information block (SIB) information. In an embodiment, the device processor may be configured with processor-executable instructions to perform operations such that establishing the second communication link between the wireless device and the second cell in the second telecommunication network based on the received network includes establishing a connection between the wireless device and another Radio Access Technology (RAT) that is associated with the same or another network. In an embodiment, the device processor may be configured with processor-executable instructions to perform operations such that establishing the second communication link between the wireless device and the second cell in the second telecommunication network includes establishing a connection on another frequency band.

In an embodiment, the wireless device may include a dual USIM configured to facilitate the proper acquisition of a network using a DSA process. In an embodiment, the first DSC processor may be configured with processor-executable instructions to perform operations including receiving the network information, and sending the network information to a dynamic spectrum policy controller (DPC) that is outside of the first and second telecommunication networks for forwarding to a second DSC in the second telecommunication network. In an embodiment, the DPC may include a DPC processor configured with processor-executable instructions to perform operations that include receiving a request for radio frequency (RF) spectrum resources from the first DSC, determining an amount of RF spectrum resources available for allocation within the second telecommunication network, dynamically allocating a portion of available RF spectrum resources of the second telecommunication network for access and use by the first telecommunication network, and informing the first DSC that use of allocated RF spectrum resources may begin.

Further embodiments may include a wireless device having a device processor configured with processor-executable instructions to perform operations that include traversing an ordered list of preferred of networks to select a first cell site in a first telecommunication network, establishing a first communication link to the selected first cell site, receiving network information identifying a specific geographic region in which the wireless device is allowed to use resources of a second telecommunication network, determining whether the wireless device is in the geographical region, and establishing a second communication link to a second cell in the second telecommunication network based on the received network information. In a further embodiment, the device processor may be configured with processor-executable instructions to perform operations such that receiving network information includes receiving a closed subscriber group (CSG) identifier that defines a specific CSG or hybrid cell in the second telecommunication network.

Further embodiments include a wireless computing device having a processor (or processing core) configured with processor-executable instructions to perform various operations corresponding to the methods discussed above.

Further embodiments include server computing devices having one or more processors configured with processor-executable instructions to perform various operations corresponding to the methods discussed above.

Further embodiments include computing devices that include various means for performing functions corresponding to the method operations discussed above.

Further embodiments include a non-transitory processor-readable storage medium having stored thereon processor-executable instructions configured to cause a processor/processing core to perform various operations corresponding to the method operations discussed above.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain features of the invention.

DETAILED DESCRIPTION

Figure 1A:
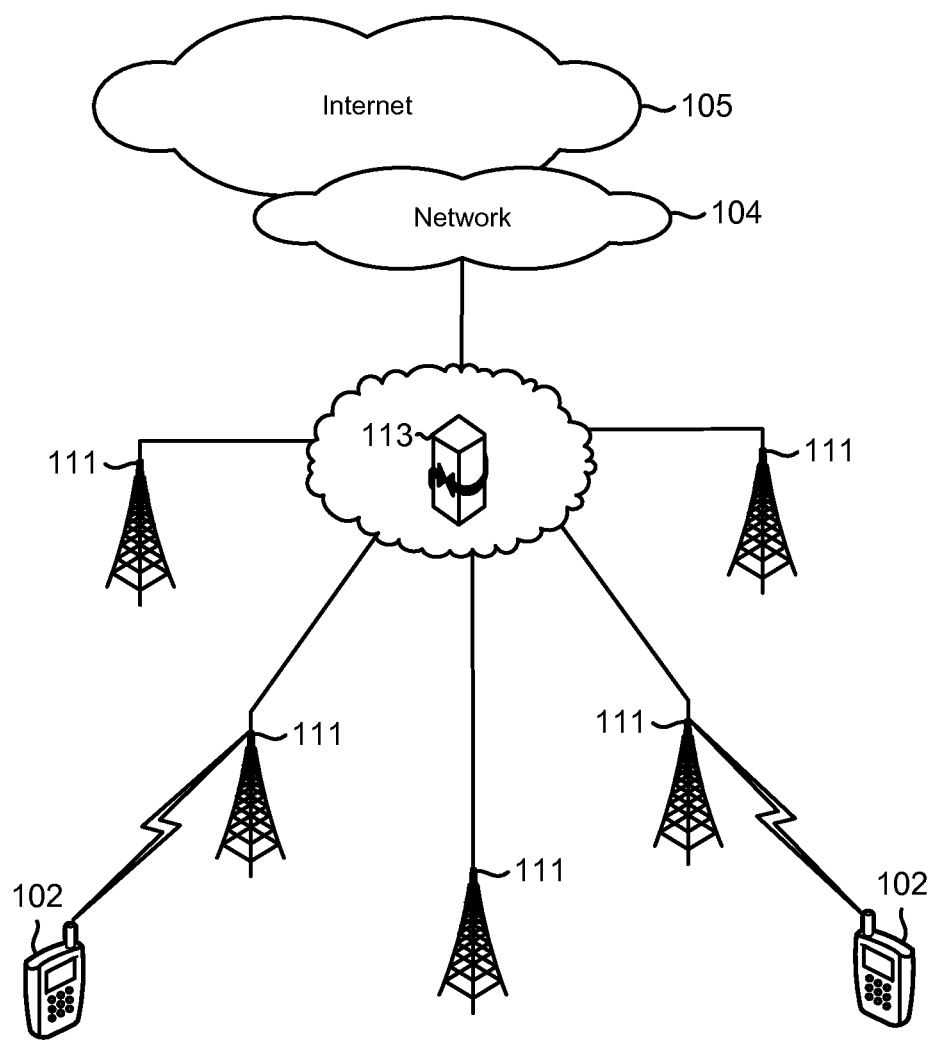
FIGS. 1A through 1E are system block diagrams illustrating various logical and functions components and communication links in communication systems that may be used to implement the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the terms "mobile device," "wireless device" and "user equipment (UE)" may be used interchangeably and refer to any one of various cellular telephones, personal data assistants (PDA's), palm-top computers, laptop computers with wireless modems, wireless electronic mail receivers (e.g., the Blackberry® and Treo® devices), multimedia Internet enabled cellular telephones (e.g., the iPhone®), and similar personal electronic devices. A wireless device may include a programmable processor and memory. In a preferred embodiment, the wireless device is a cellular handheld device (e.g., a wireless device), which can communicate via a cellular telephone communications network.

As used in this application, the terms "component," "module," "engine," "manager" are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, a computer, a server, network hardware, etc. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), global system for mobile communications (GSM), universal mobile telecommunications system (UMTS), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), public switched telephone network (PSTN), Wi-Fi Protected Access I & II (WPA, WPA2), Bluetooth®, integrated digital enhanced network (iden), land mobile radio (LMR), and evolved universal terrestrial radio access network (E-UTRAN). Each of these technologies involves, for example, the transmission and reception of voice, data, signaling and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

A high priority in responding to any emergency or disaster situation is establishing effective communications. In large scale emergency or disaster (both manmade and natural) situations, it is paramount to maintain communications between all first responders and emergency personnel in order to respond, manage, and control the emergency situation effectively. In the absence of effective communication among first responders and other emergency personnel, resources may not be effectively mobilized to the areas which need the resources most. Even in minor emergency situations (e.g., traffic accidents and fires), first responders must be able to call on support assets and coordinate with other services (e.g., public utilities, hospitals, etc.).

With the ubiquity of wireless device ownership and usage, emergency communication via wireless devices using commercial cellular communication networks often are the most efficient and effective means to mobilize emergency response personnel and resources. Enabling wireless devices to provide effective emergency communications obviates the technical challenges and expense of coordinating radio frequencies among various first responder agencies (e.g., police, fire, ambulance, FEMA, public utilities, etc.). Also, qualified first responders to an accident who are off duty or not ordinarily equipped with radios (e.g., doctors, nurses, retired police, or military personnel) will have or can quickly borrow a wireless device.

Emergency communications over cellular communication networks is not without problems, however. Cellular and other telecommunication networks ("networks") are designed to accommodate access requests from only a fraction of the total number of wireless devices in a particular cell. At times of emergency or crisis, network resources may become overtaxed when predictable human responses to the situation prompt an extraordinary number of wireless device users within a particular cell to access the network at the same time. Wireless device users may be attempting to alert emergency personnel of the emergency situation (such as a 911 emergency call) or to alert friends or family members that the user is safe despite being in the area of an emergency situation. Some users may be transmitting images of the emergency condition (fire, accident, etc.) to news services or friends. In a wide scale situation, emergency responders using wireless devices for emergency communications will add to the call volume. Regardless, the predictable increase in call volume during an emergency situation can overwhelm a commercial cellular communications network, particularly in the cell zone encompassing the emergency, thus rendering the network unreliable for emergency response personnel communication usage.

To overcome these and other limitations of existing solutions, the various embodiments include components configured to provide tiered priority access (TPA) capabilities to deliver quality of service (QoS) and grade of service (GoS) based wireless device communications for first responders. Detailed descriptions of example TPA systems are provided in U.S. Pat. No. 8,275,349 dated Sep. 25, 2012, the entire contents of which are hereby incorporated by reference in their entirety and for all purposes.

In overview, a TPA system or solution may include various components configured to perform various TPA operations to coordinate, make available and/or provide wireless communication resources to high priority users (e.g., emergency personnel) during times of high congestion or in emergency situations. For example, TPA components may be configured to monitor a wireless network's call volume, determine whether the wireless network call volume exceeds a first pre-determined threshold, partition the wireless network resources based on priorities when the wireless network call volume exceeds the first pre-determined threshold, and reserve a portion of the partitioned resources for high priority usage (i.e., use by wireless devices of authorized emergency personnel). The TPA components may be further configured to monitor incoming and outgoing calls to determine whether a call is made from or to an high priority device (e.g., to or from a pre-registered wireless device or wireless devices of authorized emergency personnel), allow general access to the wireless network resources so long as no call is made from or to high priority device, and restrict general access to the wireless network resources in response to determining that a call is made to or from a high priority device. As such, TPA solutions allow telecommunication systems use more the available resources, and ensure that high priority users can access and use the system when needed.

In the various embodiments, these and other TPA operations may be performed in (or in conjunction with) a dynamic spectrum arbitrage (DSA) system configured to dynamically manage the availability, allocation, access, and use of telecommunication resources (e.g., RF spectrum, etc.) between two or more networks (e.g., between a lessor network and a lessee network). A detailed description of an example DSA system is provided in U.S. Pat. No. 8,711,721 dated Apr. 29, 2014, the entire contents of which are hereby incorporated by reference in their entirety and for all purposes.

Briefly, a DSA system may include a dynamic spectrum policy controller (DPC) configured to manage the DSA operations and interactions between two or more networks (e.g., between a lessor network and a lessee network). The DPC component may be configured to establish a first communication link to a first dynamic spectrum controller (DSC) component in a first communication network (e.g., E-UTRAN, etc.), and a second communication link to a second DSC component in a second communication network. The DPC component may then determine whether radio frequency (RF) spectrum resources are available for allocation within the second communication network, determine the amount of RF spectrum resources that are available for allocation, and perform various operations to allocate all or a portion of the available RF resources of the second communication network for access and use by wireless devices in the first communication network.

The various embodiments include improved cell selection methods that allow the wireless devices to intelligently access and use the allocated resources (e.g., RF spectrum resources). In an embodiment, the cell selection methods may include selecting a cell in a lessor network based on a closed subscriber group identifier.

Generally, wireless devices include modem cards that enable their users to access wireless Internet protocol (IP) and data services through telecommunication networks. These modems often tie the wireless device a specific telecommunication service carrier (e.g., AT&T, Verizon, etc.) by requiring that the wireless device connect to the global telecommunications network (and ultimately the Internet) through that carrier's network (herein "home network"). When a connection through the home network is not available, such as when the wireless device is outside the geographical range of its home network, a conventional wireless device may be allowed to "roam" by connecting through a different service provider's cellular network (herein "visited network").

For example, when a conventional wireless device is powered on, the device performs various operations to identify a suitable carrier and/or network through which the wireless device may connect to the global telecommunications network. The wireless device may first scan the available cellular networks to determine whether a connection through the home network is available. This may be achieved by comparing values stored on a subscriber identification module (SIM) of the device to one or more values received from the telecommunication networks to determine whether the values identify at least one of the available cellular networks as being the wireless device's home network. If the values identify at least one of the available cellular networks as the home network, the wireless device may automatically establish a connection to the home network. On the other hand, when the values stored on the SIM do not match any of the values received from the available cellular networks, the wireless device may traverse a preferred roaming list (PRL) to identify a visitor network through which the device may connect to the global telecommunication network, and establish a connection to one of the identified visitor networks.

While such roaming capability provides the conventional wireless device with added mobility and connectivity, it is often much more expensive than connecting via the wireless device's home network. Further, the DSA system allows a first telecommunication network to lease resources from a second telecommunication network, and for wireless devices that subscribe to the first telecommunication network to use the leased resources in the same manner as they would use the resources of their home network (i.e., without paying roaming rates).

By configuring the wireless devices to intelligently determine the resources that they are authorized to access and use, the various embodiments prevent wireless devices that subscribe to participating networks from attaching to an overloaded cell site in their home network and/or to a cell site of a visitor network when a leased resource is available. That is, the various embodiments allow the wireless devices to intelligently identify a carrier, network, and/or cell through which they connect to the global telecommunication network, and ultimately the Internet. In an embodiment, the wireless devices may identify the carrier/network/cell by using a closed subscriber group identifier value.

In the various embodiments, a wireless device may be equipped with SIM hardware, memory, or card that stores one or more values that identify the wireless device's home network and/or the current network to which the wireless device is connected. In various embodiments, the SIM may be implemented in hardware, a mobile device memory, and/or a removable memory card. The SIM may be a universal SIM (USIM), virtual SIM, a removable user identity module (R-UIM), a Mini SIM, a MicroSIM, an embedded SIM, or any other similar identity module. In an embodiment, the SIM may be a 3GPP compliant SIM, such as USIM, that is configured to support UMTS, EDGE, GPRS, LTE, CDMA, and/or other related communication technologies. In various embodiments, the SIM may be a single-SIM, dual-SIM, or multi-SIM. In an embodiment, the SIM may be configured to support a Milenage authentication algorithm, which is a known algorithm that is based on an Advanced Encryption Standard (AES).

The SIM may be configured to store critical information that may be used by the wireless device to select the correct, most available, most appropriate, and/or most cost effective network (e.g., PLMN) through which the wireless device may connect and/or to determine that is no longer to utilize a PLMN. This critical information may include a home public land mobile network (HPLMN) value that may be used to identify a participating public land mobile network (PLMN) to which the mobile device may connect, a home international mobile subscriber identity (IMSI) value, a prioritized list of permitted virtual participating public land mobile network (VPLMN), and a list of forbidden PLMNs.

In addition, a wireless device may store a preferred list of networks (PLMNs) and radio carriers that it is authorized to utilize. The preferred list may be an ordered list that organizes the networks/carriers in a rank order. A wireless device may be configured to select a carrier, network, and cell based on the preferred list. For example, when the wireless device is powered on and/or is trying to establish or reestablish connectivity, the wireless device may sequentially traverse the preferred list to identify a suitable network and/or cell site through with it may connect to the global telecommunication network.

After selecting a carrier, network, and/or cell site, the wireless device may request and/or receive network information (e.g., network ids, cell ides, CSG ids, etc.) via a system information block (SIB) or master information block (MIB) communication signal, and camp on the cell. The wireless device may then continuously, repeatedly, or periodically scan for other cells and determine whether it is camped on the best serving cell. This may be achieved via the wireless device measuring the signal strengths from adjacent cells and/or based on access technology. The wireless device may then connect to the best serving cell.

In an embodiment, the wireless device may be configured to update the preferred list in response to receiving an over-the-air broadcast or communication signal, a wireless application protocol (WAP) communication message, a short message service (SMS) message, etc. The wireless device may be further configured to begin searching for a new PLMN in response to detecting or determining that the preferred list has been updated. For example, the wireless device may be equipped with a client software application configured to reinitiate the cell selection process (or begin searching for a new PLMN that has been made available via the updated preferred list) in response to receiving a WAP/SMS message that includes an updated preferred list.

In addition, the wireless device may be configured to monitor the preferred list to determine whether the list has been updated and/or to detect changes in the preferred list. Alternatively or in addition, the wireless device may determine whether it has received cell reselection instructions or updated network/cell information, such as a new SIB/MIB that instructs the wireless device to perform reselection operations. That is, the wireless device may continue to monitor the SIB/MIB for any changes or additional information, and perform cell reselection operations in response to determining that the performed list has been updated. The wireless device may also be configured to perform cell reselection operations in response to determining that reselection instructions have been received (e.g., via the SIB/MIB).

As mentioned above, the wireless device may request and/or receive network information after selecting a cell site to camp and/or after camping on a selected cell site. In an embodiment, this network information may include a closed subscriber group (CSG) identifier (CGS Id). A wireless device may use the CSG Ids to perform the cell selection/reselection operations, and to better manage its connections to the components in the lessor network. In an embodiment, the wireless devices may be configured to determine virtual bid areas based on CSGs or CSG Ids. In an embodiment, the lessor network may use the CSG Ids to manage the connections on a per-user and/or per-bid basis, such as by using the CSG Ids to identify lessee wireless devices that are specific to a bid, and providing the identified devices with different services (e.g., different QoS levels) based on bid specific policies and/or applying bid specific charging rules to the identified wireless devices.

As an example, after establishing a communication link to a carrier/network/cell, the wireless device may receive a SIB/MIB that includes CGS ids that define specific CSG or hybrid cell. The wireless device may use this information to identify, compute, or determine a geographic region in which the wireless device is allowed to use components of a lessor network (e.g., an area in which the wireless device may attach to an eNodeB of the lessor network). The wireless device may then determine whether it is in the geographic area, member of the CSG and/or within the area of the hybrid cell, and use this information to a new connection to a different resource/cell in the same or different network. The wireless device may also use this information to begin communicating on a different frequency band and/or to establish a communication link to another or different radio access technology (RAT) that is associated with the same or a different network.

The various embodiments may include a wireless device configured to select a first cell site in a first telecommunication network (e.g., the home network of the wireless device, a lessee network, etc.) and establish a first communication link to the selected first cell site. The wireless device may then receive network information identifying a specific geographic region in which the wireless device is allowed to use resources of a second telecommunication network (e.g., a lessor network that is different than a home network of the wireless device). In an embodiment, the network information may include a closed subscriber group (CSG) identifier that defines a specific CSG or hybrid cell in the second telecommunication network. The network information may be received via SIB/MIB and/or may be SIB information.

In response to receiving the network information, the wireless device may establish a second communication link to a second cell in the second telecommunication network (e.g., by using the CSG identifier, etc.), which may include establishing a connection on another frequency band or establishing the connection using a Radio Access Technology (RAT) that is associated with the first, second, or another telecommunication network.

In an embodiment, a first DSC in the first telecommunication network may receive the network information, and send this information to a DPC that is outside of the first and second telecommunication networks. The DPC may receive and send the network information to a second DSC in the second telecommunication network. The second DSC may then use this information to allow access to the wireless devices of the first telecommunication network.

The various embodiments may be implemented within a variety of communication systems, examples of which are illustrated in FIGS. 1A-1E. With reference to FIG. 1A, wireless devices 102 may be configured to transmit and receive voice, data, and control signals to and from a base station 111, which may be a base transceiver station (BTS), NodeB, eNodeB, etc. The base station 111 may communicate with an access gateway 113, which may include one or more of a controller, a gateway, a serving gateway (SGW), a packet data network gateway (PGW), an evolved packet data gateway (ePDG), a packet data serving node (PDSN), a serving GPRS support node (SGSN), or any similar component or combinations of the features/functions provided thereof. Since these structures are well known and/or discussed in detail further below, certain details have been omitted from FIG. 1A in order to focus the descriptions on the most relevant features.

The access gateway 113 may be any logical and/or functional component that serves as the primary point of entry and exit of wireless device traffic and/or connects the wireless devices 102 to their immediate service provider and/or packet data networks (PDNs). The access gateway 113 may forward the voice, data, and control signals to other network components as user data packets, provide connectivity to external packet data networks, manage and store contexts (e.g. network internal routing information, etc.), and act as an anchor between different technologies (e.g., 3GPP and non-3GPP systems). The access gateway 113 may coordinate the transmission and reception of data to and from the Internet 105, as well as the transmission and reception of voice, data and control information to and from an external service network 104, the Internet 105, other base stations 111, and to wireless devices 102.

In various embodiments, the base stations 111 and/or access gateway 113 may be coupled (e.g., via wired or wireless communication links) to a dynamic spectrum arbitrage (DSA) system configured to dynamically manage the availability, allocation, access, and use of various network resources (e.g., RF spectrum, RF spectrum resources, etc.). The DSA system is discussed in detail further below.

Figure 1B:
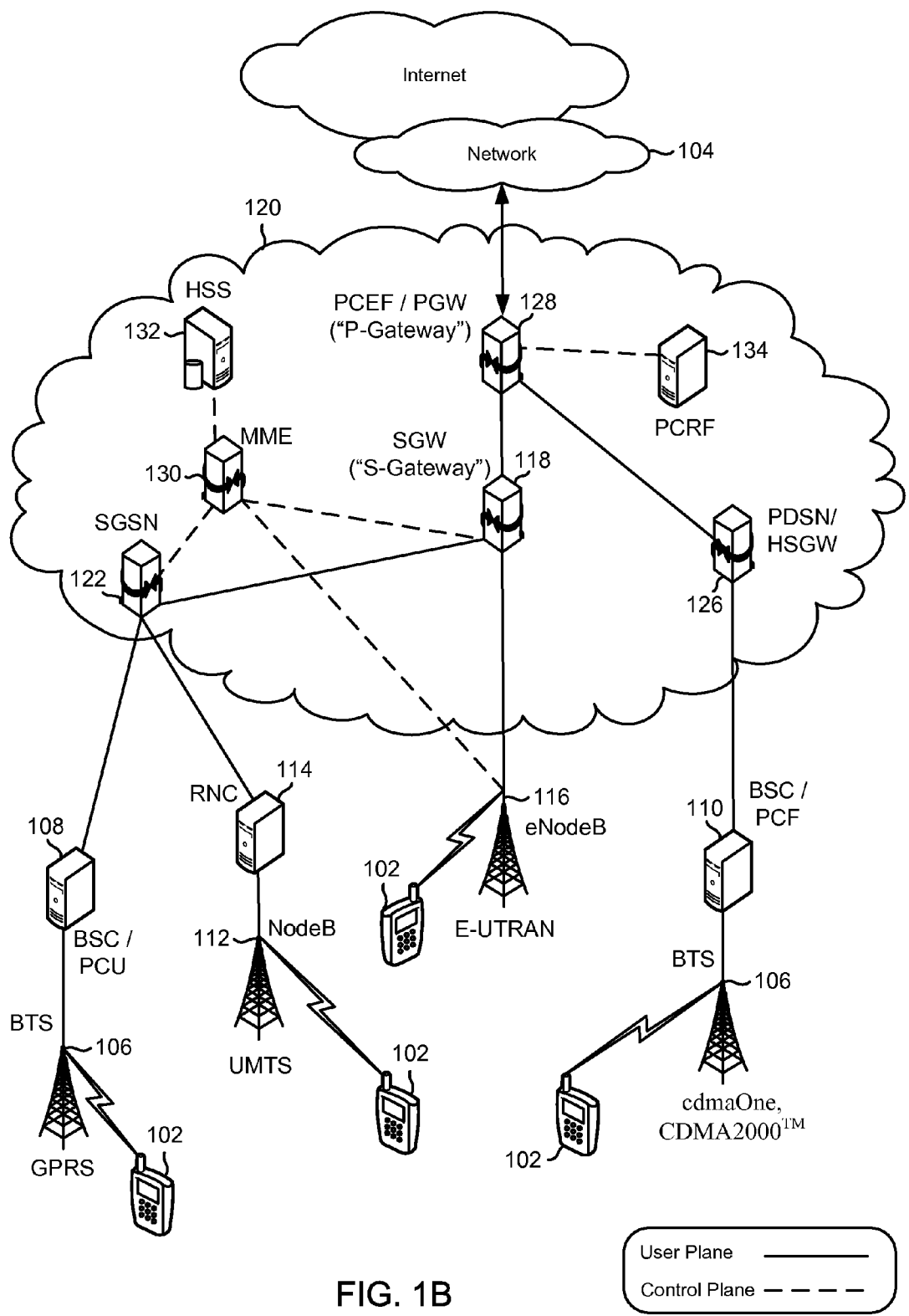

FIG. 1B illustrates that wireless devices 102 may be configured to send and receive voice, data and control signals to and from the service network 104 (and ultimately the Internet 105) using a variety of communication systems/technologies (e.g., GPRS, UMTS, LTE, cdmaOne, CDMA2000™), any or all of which may be supported by, or used to implement, the various embodiments.

In the example illustrated in FIG. 1B, long term evolution (LTE) and/or evolved universal terrestrial radio access network (E-UTRAN) data transmitted from a wireless device 102 is received by an eNodeB 116, and sent to a serving gateway (SGW) 118 located within the core network 120. The eNodeB 116 may send signaling/control information (e.g., information pertaining to call setup, security, authentication, etc.) to a mobility management entity (MME) 130. The MME 130 may request user/subscription information from a home subscriber server (HSS) 132, communicate with other MME components, perform various administrative tasks (e.g., user authentication, enforcement of roaming restrictions, etc.), select a SGW 118, and send authorization and administrative information to the eNodeB 116 and/or SGW 118. Upon receiving the authorization information from the MME 130 (e.g., an authentication complete indication, an identifier of a selected SGW, etc.), the eNodeB 116 may send data received from the wireless device 102 to a selected SGW 118. The SGW 118 may store information about the received data (e.g., parameters of the IP bearer service, network internal routing information, etc.) and forward user data packets to a policy control enforcement function (PCEF) and/or packet data network gateway (PGW) 128.

FIG. 1B further illustrates that general packet radio service (GPRS) data transmitted from the wireless devices 102 may be received by a base transceiver station (BTS) 106 and sent to a base station controller (BSC) and/or packet control unit (PCU) component (BSC/PCU) 108. Code division multiple access (CDMA) data transmitted from a wireless device 102 may be received by a base transceiver station 106 and sent to a base station controller (BSC) and/or packet control function (PCF) component (BSC/PCF) 110. Universal mobile telecommunications system (UMTS) data transmitted from a wireless device 102 may be received by a NodeB 112 and sent to a radio network controller (RNC) 114.

The BSC/PCU 108, BSC/PCF 110, and RNC 114 components may process the GPRS, CDMA, and UMTS data, respectively, and send the processed data to a component within the core network 120. More specifically, the BSC/PCU 108 and RNC 114 units may send the processed data to a serving GPRS support node (SGSN) 122, and the BSC/PCF 110 may send the processed data to a packet data serving node (PDSN) and/or high rate packet data serving gateway (HSGW) component (PDSN/HSGW) 126. The PDSN/HSGW 126 may act as a connection point between the radio access network and the IP based PCEF/PGW 128. The SGSN 122 may be responsible for routing the data within a particular geographical service area, and send signaling (control plane) information (e.g., information pertaining to call setup, security, authentication, etc.) to an MME 130. The MME 130 may request user and subscription information from a home subscriber server (HSS) 132, perform various administrative tasks (e.g., user authentication, enforcement of roaming restrictions, etc.), select a SGW 118, and send administrative and/or authorization information to the SGSN 122.

The SGSN 122 may send the GPRS/UMTS data to a selected SGW 118 in response to receiving authorization information from the MME 130. The SGW 118 may store information about the data (e.g., parameters of the IP bearer service, network internal routing information, etc.) and forward user data packets to the PCEF/PGW 128. The PCEF/PGW 128 may send signaling information (control plane) to a policy control rules function (PCRF) 134. The PCRF 134 may access subscriber databases, create a set of policy rules and performs other specialized functions (e.g., interacts with online/offline charging systems, application functions, etc.). The PCRF 134 may then send the policy rules to the PCEF/PGW 128 for enforcement. The PCEF/PGW 128 may implement the policy rules to control the bandwidth, the quality of service (QoS), the characteristics of the data, and the services being communicated between the service network 104 and the end users.

In the various embodiments, any or all of the components discussed above (e.g., components 102-134) may be coupled to, or included in, a DSA system configured to dynamically manage the availability, allocation, access, and use of telecommunication resources.

Figure 1C:
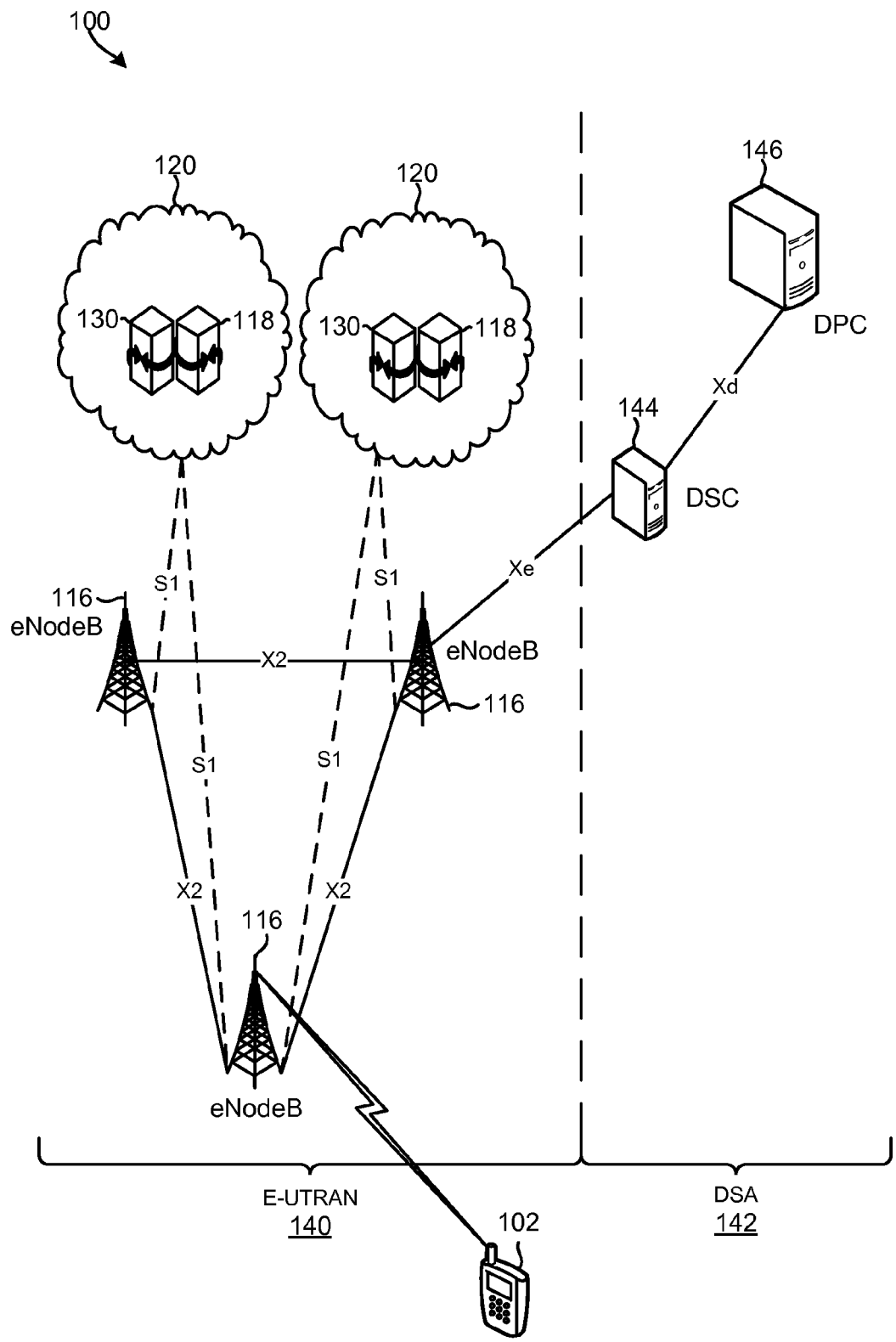

FIG. 1C illustrates various logical components and communication links in an embodiment system 100 that includes an DSA system 142 and a evolved universal terrestrial radio access network (E-UTRAN) 140. In the example illustrated in FIG. 1C, the DSA system 142 includes a dynamic spectrum controller (DSC) 144 component and a dynamic spectrum policy controller (DPC) 146 component. The E-UTRAN 140 includes a plurality of interconnected eNodeBs 116 coupled to the core network 120 (e.g., via a connection to an MME, SGW, etc.).

In various embodiments, the DSC 144 may be included in or coupled to the E-UTRAN 140, either as part of its core network 120 or outside of the core network 120. In an embodiment, the DSC 144 may be coupled directly (e.g., via wired or wireless communication links) to one or more eNodeBs 116.

The eNodeBs 116 may be configured to communicate with the DSC 144 via the Xe interface/reference point. In various embodiments, the Xe reference point between DSC and eNodeB 116 may use the DSAAP protocol, TR-069 protocol, and/or TR-192 data model extensions to support listing available resources at the eNodeB 116 and notifying the eNodeB 116 of bid/buy confirmations. The DSC 144 may be configured to communicate with the DPC 146 via the Xd interface/reference point. The Xd reference point between DSC and DPC may use the DSAAP protocol for dynamic spectrum and resource arbitrage operations. The eNodeBs 116 may be interconnected, and configured to communicate via an X2 interface/reference point, which may also use the DSAAP protocol to communicate information. The eNodeBs 116 may be configured to communicate with components in the core network 120 via the S1 interface. For example, the eNodeBs 116 may be connected to an MME 130 via the S1-MME interface and to a SGW 118 via the S1-U interface. The S1 interface may support a many-to-many relation between the MMEs 130, SGWs 118, and eNodeBs 116. In embodiment, the DPC and/or DSC component may also be configured to communicate with a HSS 132 component.

The eNodeBs 116 may be configured to provide user plane (e.g., PDCP, RLC, MAC, PHY) and control plane (RRC) protocol terminations towards the wireless device 102. That is, the eNodeBs 116 may act as a bridge (e.g., layer 2 bridge) between the wireless devices 102 and the core network 120 by serving as the termination point of all radio protocols towards the wireless devices 102, and relaying voice (e.g., VoIP, etc.), data, and control signals to network components in the core network 120. The eNodeBs 116 may also be configured to perform various radio resource management operations, such as controlling the usage of radio interfaces, allocating resources based on requests, prioritizing and scheduling traffic according to various quality of service (QoS) requirements, monitoring the usage of network resources, etc. In addition, the eNodeBs 116 may be configured to collect radio signal level measurements, analyze the collected radio signal level measurements, and handover wireless devices 102 (or connections to the mobile devices) to another base station (e.g., a second eNodeB) based on the results of the analysis.

The DSC 144 and DPC 146 may be functional components configured to manage the dynamic spectrum arbitrage process for sharing radio frequency and other network resources between different E-UTRANs 140. For example, the DPC 146 component may be configured to manage the DSA operations and interactions between multiple E-UTRAN networks by communicating with DSCs 144 in the E-UTRAN network.

Figure 1D:
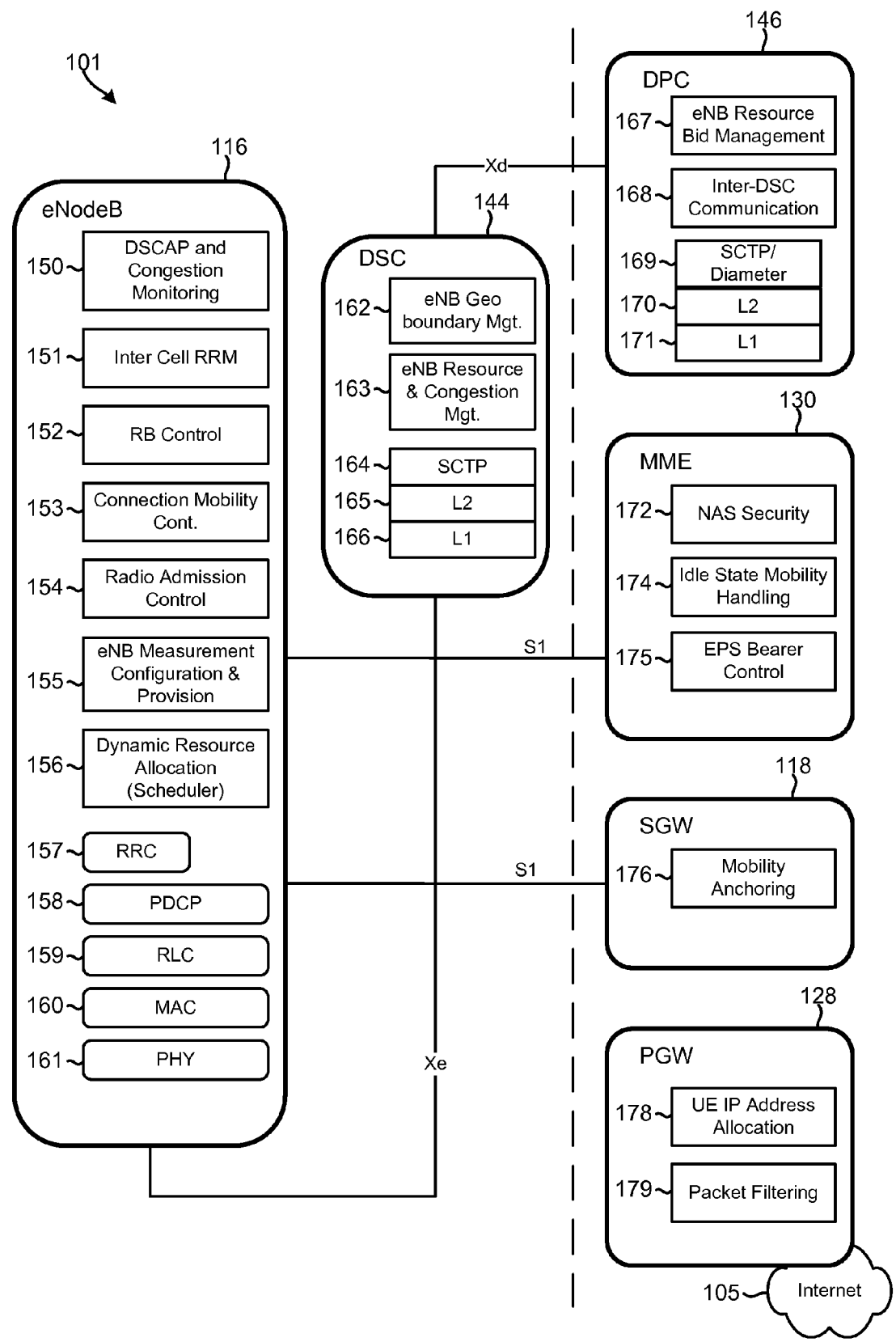

FIG. 1D illustrates various logical and functional components that may be included in a communication system 101 that suitable for use in performing DSA operations in accordance with various embodiments. In the example illustrated in FIG. 1D, the communication system 101 includes an eNodeB 116, a DSC 144, a DPC 146, an MME 130, a SGW 118, and a PGW 128.

The eNodeB 116 may include a DSC application protocol and congestion monitoring module 150, an inter-cell radio resource management (RRM) module 151, a radio bearer (RB) control module 152, a connection mobility control module 153, a radio admission control module 154, an eNodeB measurement configuration and provision module 155, and a dynamic resource allocation module 156. Each of these modules 150-156 may be implemented in hardware, in software, or in a combination of hardware and software.

In addition, the eNodeB 116 may include various protocol layers, including a radio resource control (RRC) layer 157, a packet data convergence protocol (PDCP) layer 158, a radio link control (RLC) layer 159, a medium access control (MAC) layer 160, and a physical (PHY) layer 161. In each of these protocol layers, various hardware and/or software components may implement functionality that is commensurate with responsibilities assigned to that layer. For example, data streams may be received in the physical layer 161, which may include a radio receiver, buffers, and processing components that perform the operations of demodulating, recognizing symbols within the radio frequency (RF) signal, and performing other operations for extracting raw data from the received RF signal.

The DSC 144 may include an eNodeB geographic boundary management module 162, an eNodeB resource and congestion management module 163, a stream control transmission protocol (SCTP) module 164, a Layer-2 (L2) buffer module 165, and a Layer-1 (L1) buffer module 166. The DPC 146 may include an eNodeB resource bid management module 167, an inter-DSC communication module 168, SCTP/DIAMETER module 169, an L2 buffer module 170, and a L1 buffer module 171. The MME 130 may include a non-access stratum (NAS) security module 172, and idle state mobility handling module 173, and an evolved packet system (EPS) bearer control module 174. The SGW 118 may include a mobility anchoring module 176. The PGW 128 may include a UE IP address allocation module 178 and a packet filtering module 179. Each of these modules 162-179 may be implemented in hardware, in software, or in a combination of hardware and software.

The eNodeB 116 may be configured to communicate with the SGW 118 and/or MME 130 via the S1 interface/protocol. The eNodeB 116 may also be configured to communicate with the DSC 144 via the Xe interface/protocol. The DSC 144 may be configured to communicate with the DPC 146 via the Xd interface/protocol.

The eNodeB 116 may be configured to perform various operations (e.g., via modules/layers 150-161) to provide various functions, including functions for radio resource management, such as radio bearer control, radio admission control, connection mobility control, dynamic allocation of resources to wireless devices 102 in both uplink and downlink (scheduling), etc. These functions may also include IP header compression and encryption of user data stream, selection of an MME at UE attachment when no routing to an MME 130 can be determined from the information provided by the UE, routing of user plane data towards SGW 118, scheduling and transmission of paging messages (originated from the MME), scheduling and transmission of broadcast information (originated from the MME), measurement and measurement reporting configuration for mobility and scheduling, scheduling and transmission of public warning system (e.g., earthquake and tsunami warning system, commercial mobile alert service, etc.) messages (originated from the MME), closed subscriber group (CSG) handling, and transport level packet marking in the uplink. In an embodiment, the eNodeB 116 may be a donor eNodeB (DeNB) that is configured to perform various operations to provide additional functions, such as an S1/X2 proxy functionality, S11 termination, and/or SGW/PGW functionality for supporting relay nodes (RNs).

The MME 130 may be configured to perform various operations (e.g., via modules 172-175) to provide various functions, including non-access stratum (NAS) signaling, NAS signaling security, access stratum (AS) security control, inter-CN node signaling for mobility between 3GPP access networks, idle mode UE reach-ability (including control and execution of paging retransmission), tracking area list management (e.g., for a wireless device in idle and active mode), PGW and SGW selection, MME selection for handovers with MME change, SGSN selection for handovers to 2G or 3G 3GPP access networks, roaming, authentication, bearer management functions including dedicated bearer establishment, support for public warning system (e.g., earthquake and tsunami warning system, commercial mobile alert service, etc.) message transmission, and performing paging optimization. The MME module may also communicate various device state and attach/detach status information to the DSC. In an embodiment, the MME 130 may be configured to not filter paging massages based on the CSG IDs towards macro eNodeBs.

The SGW 118 may be configured to perform various operations (e.g., via module 176) to provide various functions, including mobility anchoring (e.g., for inter-3GPP mobility), serving as a local mobility anchor point for inter-eNodeB handovers, E-UTRAN idle mode downlink packet buffering, initiation of network triggered service request procedures, lawful interception, packet routing and forwarding, transport level packet marking in the uplink (UL) and the downlink (DL), accounting on user and QoS class identifier (QCI) granularity for inter-operator charging, uplink (UL) and the downlink (DL) charging (e.g., per device, PDN, and/or QCI), etc.

The PGW 128 may be configured to perform various operations (e.g., via modules 178-179) to provide various functions, including per-user based packet filtering (by e.g. deep packet inspection), lawful interception, UE IP address allocation, transport level packet marking in the uplink and the downlink, UL and DL service level charging, gating and rate enforcement, DL rate enforcement based on APN-aggregate maximum bit rate (AMBR), etc.

The DSC 144 may be configured to perform various operations (e.g., via modules 162-166) to provide various functions, including managing resource arbitration operations within a network (e.g., PLMN), tracking network resource listings, tracking current bids in progress, tracking executed bids, and tracking bid specific closed subscriber group (CSG) identifiers (CSG-IDs) for mobility management of lessee wireless devices 102 in lessor networks. The DSC 144 may be configured to handover wireless devices 102 from lessee network to lessor network (i.e., perform handins), and handover wireless devices 102 from lessor network back to lessee network (i.e., perform backoff).

The DSC 144 may also be configured to track congestion states of eNodeBs, select target eNodeBs for handovers, and manage traffic on lessor eNodeBs. The DSC 144 may be configured to offload users based on configured policies (e.g. offload lower priority users, offload higher priority users, offload users with specific QoS, etc.) from lessee networks to other less loaded eNodeBs 116 within a lessor network. The DSC 144 may also perform backoff operations to handover a wireless device 102 from lessor network back to the lessee network. The DSC 144 may also be configured to monitor, manage, and/or maintain historic congestion information that is collected or received from one or more eNodeBs in the system.

The DPC 146 may be configured to perform various operations (e.g., via modules 167-171) to provide various functions, including functioning as a resource arbitrage broker between the DSCs 144 of lessor and lessee networks (e.g., PLMNs), listing resources from various lessor networks for auction, and managing the auction process. The DPC 146 may be configured to send notifications of outbid, bid win, bid cancel and bid withdrawal and bid expiry to DSCs 144, install bid specific charging rules in the online and/or offline charging systems of lessee and lessor networks, and coordinate resource usage between DSCs 144 by acting as gateway between lessee and lessor DSCs 144.

Figure 1E:
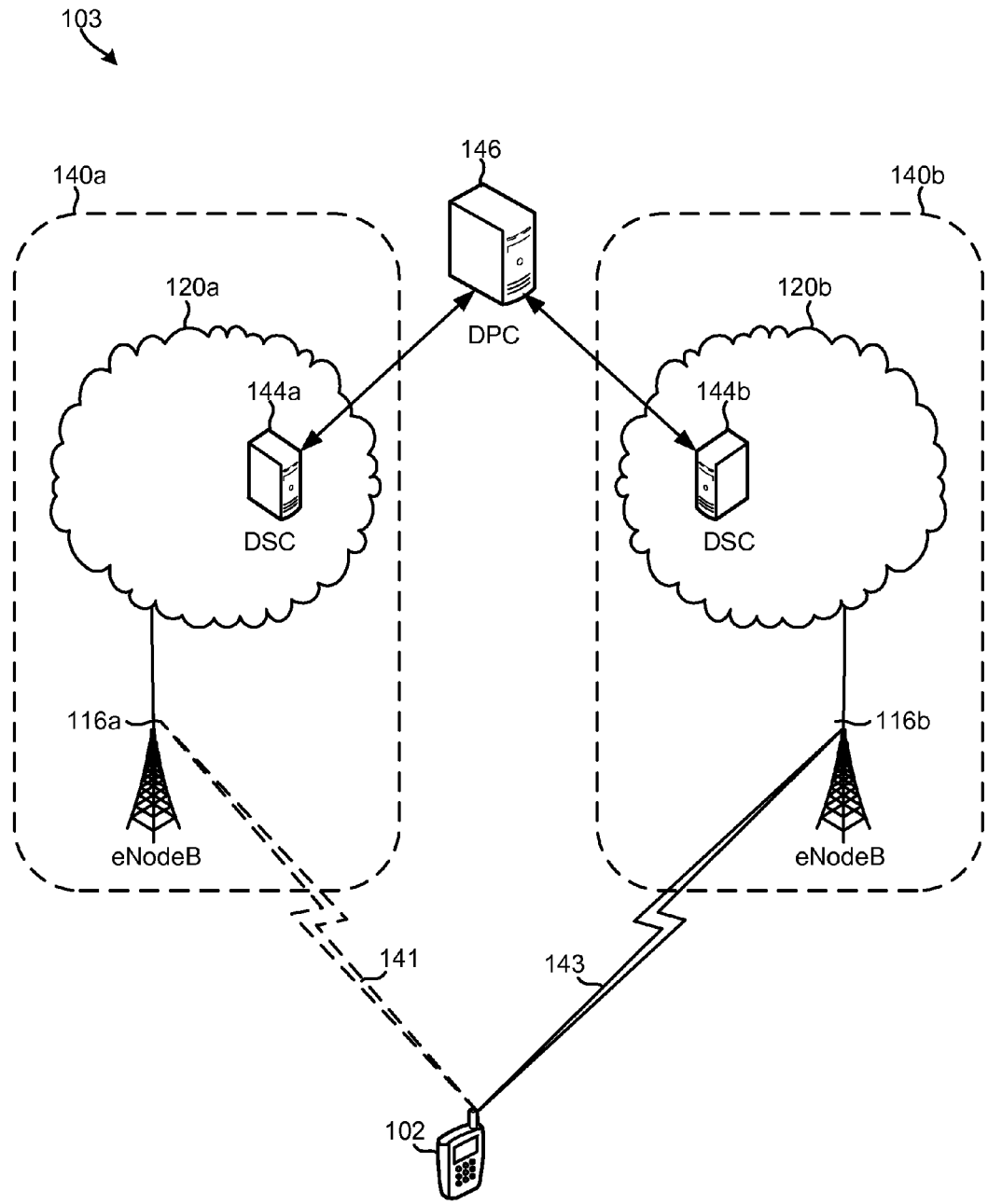

FIG. 1E illustrates network components and information flows in an example communication system 103 that includes two E-UTRANs 140a, 140b interconnected by a DPC 146 configured to manage DSA operations and interactions. In the example illustrated in FIG. 1E, each E-UTRAN 140a, 140b includes an eNodeB 116a, 116b that is outside of its core network 120a, 120b, and a DSC 144a, 144b that is inside of the core network 120a, 120b.

The DSCs 144a, 144b may be configured to communicate with the DPC 146 via Xd interface. The DSCs 144a, 144b may also be connected, directly or indirectly, to various network components in their respective core networks 120a, 120b, such as a PCRF 134, HSS 132 and a PCEF/PGW 128 (not illustrated in FIG. 1E). In an embodiment, one or more of the DSCs 144a, 144b may be connected directly to one or more of the eNodeBs 116a, 116b.

In addition to the above-mentioned connections and communication links, the system 103 may include additional connections/links to accommodate data flows and communications between components in different E-UTRANs (e.g., E-UTRANS 140a and 140b). For example, the system 103 may include a connection/communication link between an eNodeB 116b in the second E-UTRAN 140b to an SGW 118 in the first E-UTRAN 140a. As another example, the system 103 may include a connection/communication link between a SGW 118 in the second E-UTRAN 140b to a PGW 128 in the first E-UTRAN 140a. To focus the discussion of the relevant embodiments, these additional components, connections, and communication links are not illustrated in FIG. 1E.

As is discussed in detail further below, the DSCs 144a, 144b may be configured to send information regarding the availability of spectrum resources (e.g., information received from an eNodeB, PCRF, PCEF, PGW, etc.) to the DPC 146. This information may include data relating to current and expected future usage and/or capacity of each network or sub-network. The DPC 146 may be configured to receive and use such information to intelligently allocate, transfer, manage, coordinate, or lease the available resources of the first E-UTRAN 140a to the second E-UTRAN 140b, and vice versa.

For example, the DPC 146 may be configured to coordinate the allocation of spectrum resources to the second E-UTRAN 140b (i.e., lessee network) from the E-UTRAN 140a (i.e., lessor network) as part of the dynamic spectrum arbitrage operations. Such operations may allow a wireless device 102 that is wirelessly connected to the eNodeB 116b in the second E-UTRAN 140b via a communication link 143 to be handed off to an eNodeB 116a in the first E-UTRAN 140a so that it may use the allocated spectrum resources of the first E-UTRAN 140a. As part of this handoff procedure, the wireless device 102 may establish a new connection 141 to the eNodeB 116a in the first E-UTRAN 140a, terminate the wireless connection 143 to the original eNodeB 116b, and use the allocated resources of the first E-UTRAN 140a as if they are included in the second E-UTRAN 140b. The DSA operations may be performed so that the first DSC 144a is a lessor DSC for a first resource/period of time, and a lessee DSC for a second resource or another period of time.

In an embodiment, the DSA and/or handoff operations may be performed so that the wireless device 102 maintains a data connection to (or a data connection that is managed by) the original network after it is handed off. For example, DSA and/or handoff operations may be performed so that the wireless device 102 maintains a dataflow connection to a PGW 128 in the second E-UTRAN 140b after being handed off to the eNodeB 116a in the first E-UTRAN 140a.

Figure 2A:
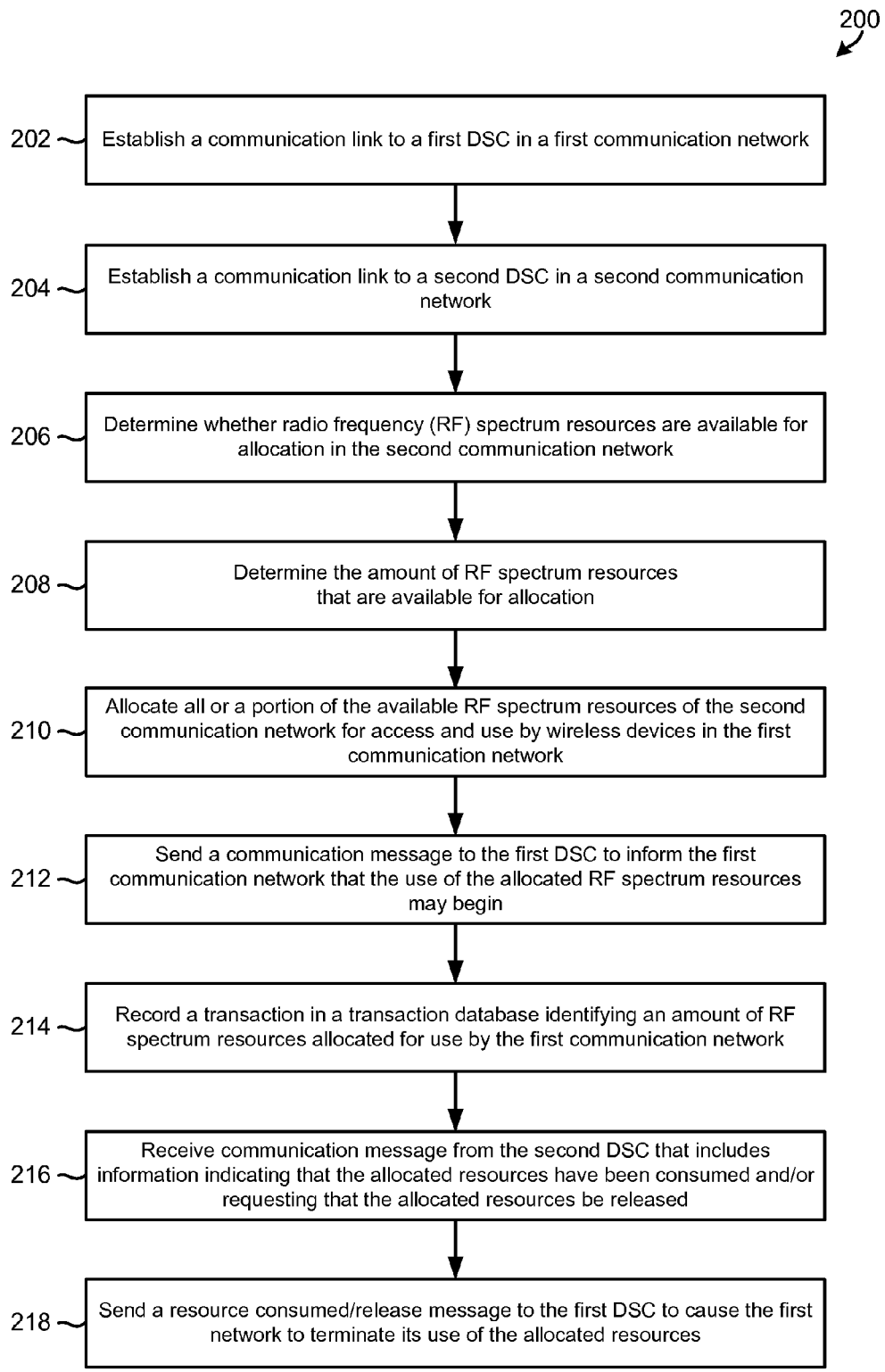
FIG. 2A is a process flow diagram illustrating a dynamic spectrum arbitrage (DSA) method of allocating resources from the perspective of a dynamic spectrum policy controller (DPC) in accordance with an embodiment.

FIG. 2A illustrates an example DSA method 200 of allocating resources in accordance with an embodiment. Method 200 may be performed by a processing core in a DPC 146 component (e.g., server computing device, etc.).

In block 202, the DPC 146 may establish a first communication link to a first DSC 144a in a first communication network (e.g., E-UTRAN, etc.). In block 204, the DPC 146 may establish a second communication link to a second DSC 144b in a second communication network. In block 206, the DPC 146 may determine whether radio frequency (RF) spectrum resources are available for allocation within the second communication network. This may be accomplished by using the DSAAP protocol to communicate with a DSC 144 in the second communication network via the second communication link, which may be a wired or wireless communication link. In block 208, the DPC 146 may determine the amount of RF spectrum resources that are available for allocation. In block 210, the DPC 146 may perform various operations to allocate all or a portion of the available RF resources of the second communication network for access and use by wireless devices 102 in the first communication network.

In block 212, the DPC 146 may send a communication message to the first DSC 144a (e.g., by using the DSAAP protocol) to inform the first communication network that the use of the allocated RF spectrum resources may begin. In block 214, the DPC 146 may record a transaction in a transaction database identifying an amount of RF spectrum resources allocated for use by the first communication network.

In block 216, the DPC 146 may receive a communication message from the second DSC 144b that includes information indicating that the allocated resources have been consumed and/or requesting that the allocated resources be released. In block 218, the DPC 146 may send a resource consumed/release message to the first DSC 144a to cause the first network to terminate its use of the allocated resources.

Figure 2B:
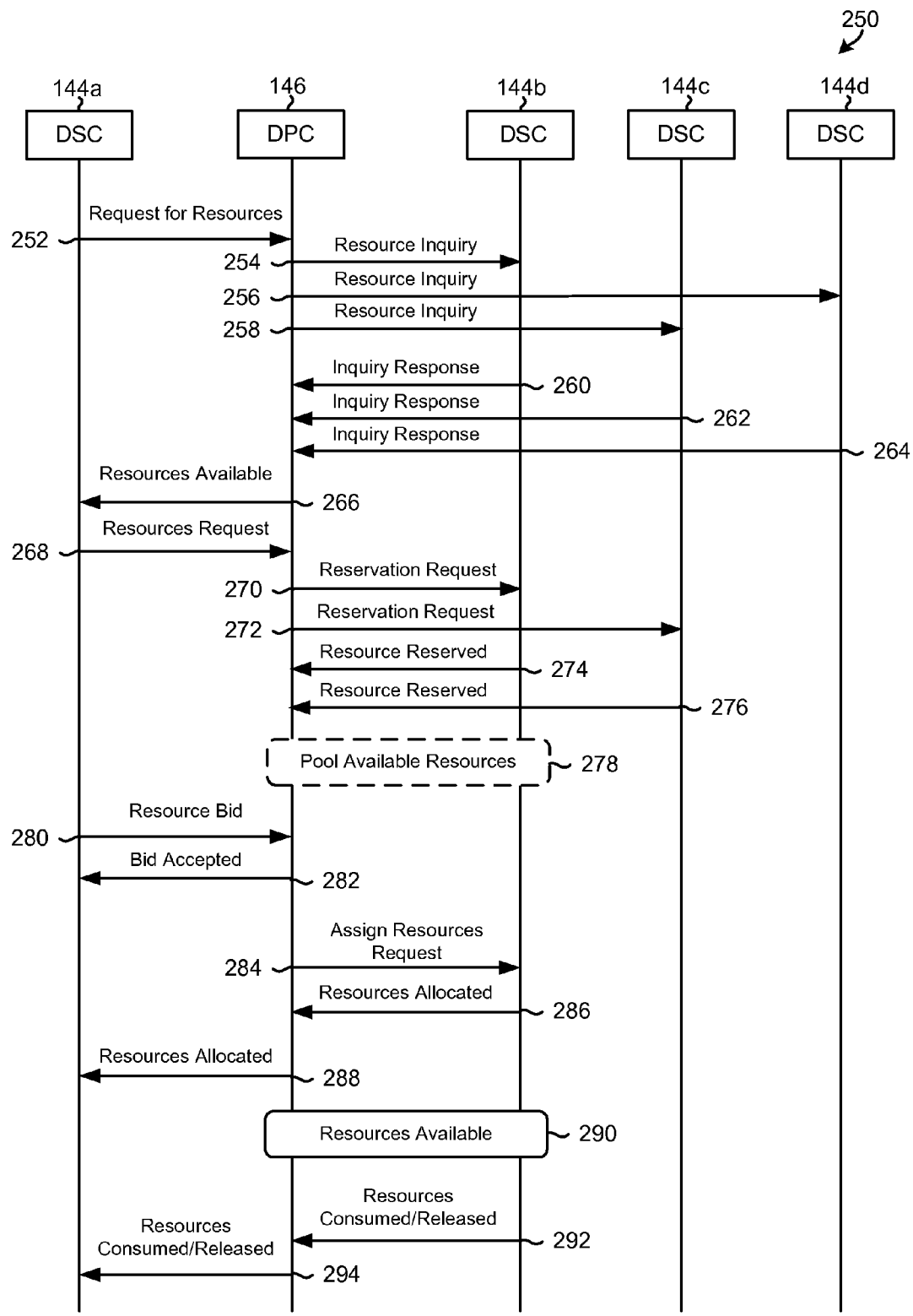
FIG. 2B is a message flow diagram illustrating message communications between components of a DSA communication system when allocating resources in accordance with an embodiment.

FIG. 2B illustrates example information flows between a DPC 146 and a plurality of DSCs 144a-d when performing another embodiment DSA method 250 to allocate resources. In the description below, the DSA method 250 is discussed from the perspective of the DPC 146 component, and may be performed by a processing core in the DPC 146. However, it should be understood that the DSA method 250 may be performed by processing cores in a DPC 146 component, processing cores in DSC 144a-d components, or a combination thereof. In addition, it should be understood that all the interactions and communications between the DPC 146 and the other components may be accomplished by DSAAP components and/or using the DSAAP protocol. As such, all such interactions and communications may be included in the DSAAP protocol.

In operation 252, a processing core in a DPC 146 component may receive a "request for resources" communication message from a first DSC 144a component in a first network (e.g., E-UTRAN, etc.). It should be understood that the "request for resources" communication message and all other communication messages discussed in this application may be DSAAP messages.

The "request for resources" communication message may include information suitable for informing the DPC 146 that the first network is interested in purchasing, leasing, accessing, and/or using resources from other networks. The "request for resources" communication message may also include information suitable for identifying the types and/or amounts of resources (e.g., RF spectrum resources, etc.) that are requested by the first network, the types and capabilities of the wireless devices 102 to which the requested resources will be allocated, and other similar information.

In operations 254, 256, and 258 the DPC 146 may generate and send a "resource inquiry" communication message to each of a second DSC 144b component in a second network, a third DSC 144c component in a third network, and a fourth DSC 144d component in a fourth network, respectively. The DPC 146 may be configured to generate the "resource inquiry" communication messages to include various component, device, and resource requirements, criteria, and information. For example, the DPC 146 may generate a "resource inquiry" communication message to include information identifying the types, capabilities, and geographic criteria of user wireless devices 102 in the first network (and other networks) to which resources are to be allocated. The geographic criteria may include a geographic location, a geographic polygon, and/or license area for a user wireless device 102 to which resources will be allocated.

In operations 260 and 262, the DPC 146 may receive "resource inquiry response" communication messages from the second and third DSCs 144b, 144c. These "resource inquiry response" communication messages may include information identifying the availability of excess resources that comply with the requirements/criteria included in the resource inquiry messages. In operation 264, the DPC 146 may receive another "resource inquiry response" communication message from the fourth DSC 144d. This "resource inquiry response" communication messages may include information indicating that the fourth network does not include resources that meet the requested requirements/criteria.

In an embodiment, as part of operations 260-264, the DPC 146 may update a database record to identify the second and third networks as having resources available for allocation and/or to identify the fourth network as not including such resources.

In operation 266, the DPC 146 may generate and send a "resource availability" communication message to a plurality of DSCs in a plurality of networks, including the first DSC 144a in the first network. The DPC 146 may be configured to generate the "resource availability" communication message to include information that is suitable for informing the networks that resources are available for allocation. In an embodiment, the DPC 146 may be configured to inform the networks that resources are available for allocation by broadcasting a communication signal that includes information suitable for informing the networks that resources are available for allocation via auction and/or an auction start time for the auction.

In operation 268, the DPC 146 may receive a "resource reservation request" communication message from the first DSC 144a. The received "resource reservation request" communication message may include information suitable for informing the DPC 146 that the first network intends to participate in the auction and/or bid on at least a portion of the available resources.

In operations 270 and 272, the DPC 146 may send the "resource reservation request" communication message to the second and third DSCs 144b, 144c, respectively. The "resource reservation request" communication message may include information suitable for causing the second and third DSCs 144b, 144c to reserve all or a portion of their available resources for allocation and use by other networks.

In operations 274 and 276, the DPC 146 may receive a "resource reservation response" communication message from each of the second and third DSCs 144b, 144c. The "resource reservation response" messages may include information suitable for informing the DPC 146 that the requested resources that have been reserved and/or information suitable for identifying the reserved resources.

Optionally, in operation block 278, the DPC 146 may pool the reserved resources for allocation and use by wireless devices 102 in other networks (e.g., the first network). For example, the DPC 146 may combine a block of spectrum reserved in the second network with a block of spectrum reserved in the third network. As another example, the DPC 146 may pool the resources available in the first and fourth channels of a block of spectrum reserved in the second network.

In operation 280, the DPC 146 may receive "resource bid" communication messages from a plurality of networks, including from the first DSC 144a in the first network. Each "resource bid" communication message may include a bid or offer for accessing, using, leasing, and/or purchasing a resource, as well as other related bid information (e.g., price, requested allocation/access methods, etc.). As part of operation 280, the DPC 146 may determine whether the received resource bids comply with the policies and rules of the DSA system and/or with requirements set forth by the networks offering the resources for allocation (e.g., meet the minimum asking price, etc.).

In operation 282, the DPC 146 may accept the bid/offer from the first network in response to determining that the resource bid received from the first network complies with the policies/rules of the DSA system and with requirements set forth by the resource offering network (e.g., offers a monetary amount for the use of all or a portion of the resources in the pool of available resources that is greater than or equal to a minimum amount specified by the second network). Also in operation 282, the DPC 146 may generate and send a "bid acceptance" communication message to the first DSC 144a.

In operation 284, the DPC 146 may allocate the resources of the second network for access and used by wireless devices 102 in the first network by sending an "assign resources request" communication message to the second DSC 144b. That is, in operation 284, the DPC may determine that the portion of the resources (e.g., in the pool of available resources) won by the first DSC 144a are fully available via the second network, and in response, only send the assign resources request message to the second network.

In operation 286, the DPC 146 may receive a "resources allocated" communication message from the second DSC 144b. In operation 288, the DPC 146 may send the "resources allocated" communication message to the first DSC 144a to inform the first network that the resources have been allocated for access and used by its wireless devices 102 and/or that the use of the allocated resources may begin. In operation block 290, the DPC 146 may record a transaction in a transaction database identifying these resources as being allocated for access and use by the first network.

In operation 292, the DPC 146 may receive a "release resources" communication message from the second DSC 144b that includes information indicating that the allocated resources have been consumed and/or information suitable for requesting that the allocated resources be released. In operation 294, the DPC 146 may send a resource consumed/release message to the first DSC 144a to cause the first network to terminate its use of the allocated resources.

FIGS. 3-7 illustrate an embodiment DSA method 300 for allocating and accessing resources in a communication system that includes a DPC 146 component, two DSC 144a, 144b components, and wireless devices 102. All or portions of DSA method 300 may be performed by processing cores in a DPC 146, DSCs 144a-b, and/or wireless device 102. In the various embodiments, any of all of the interactions and communications between the components 146, 144a, 144b, and 102 may be accomplished or facilitated by DSAAP components and/or using the DSAAP protocol. As such, all such interactions and communications may be included in the DSAAP protocol.

Figure 3:
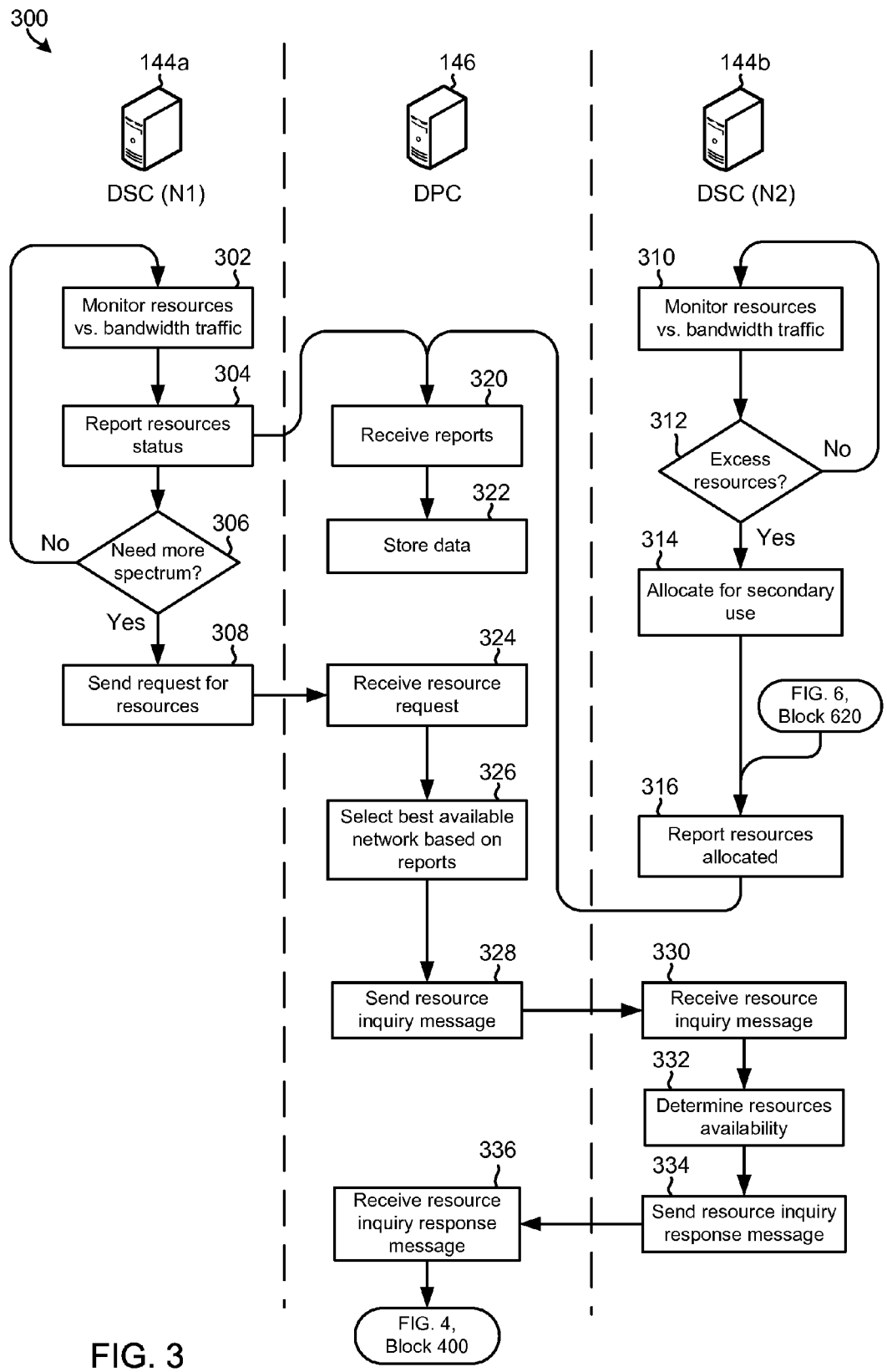
FIGS. 3 through 7 are process flow diagrams illustrating an embodiment DSA method of allocating and accessing resources in a communication system that includes a DPC, two dynamic spectrum controllers (DSCs), and a wireless device.

With reference to FIG. 3, in block 302, a first DSC 144a in a first network may monitor user traffic (e.g., call and data traffic, etc.) as compared to the total spectrum resources available to the first network. In block 304, the first DSC 144a may generate a resource status report based on a result of its monitoring, record/store the resource status report in memory, and send a resource status report to the DPC 146 via a resources status report communication message. In determination block 306, the first DSC 144a may determine, based on the received resource status reports, whether additional resources are required (and/or whether there is a high probability that additional resources will be required in the near future) to provide adequate service to the existing wireless devices 102 in the first network. In response to determining that additional resources are required (i.e., determination block 306="Yes"), in block 308, the first DSC 144a may send a "request for resources" communication message to the DPC 146. In response to determining that additional resources are not required (i.e., determination block 306="No"), the first DSC 144a may continue monitoring user traffic and/or perform other DSC operations in block 302.

In block 310, a second DSC 144b in a second network may monitor user traffic as compared to the total spectrum resources available to the second network, generate resource status reports, and/or perform any or all of the DSC operations discussed in this application. In determination block 312, the second DSC 144b may determine whether there is an excess amount of resources available in the second network. In response to determining that there are no excess resources available in the second network (i.e., determination block 312="No"), in block 310, the second DSC 144b may continue monitoring user traffic and/or performing other DSC operations.

In response to determining that there is an excess amount of resources available in the second network (i.e., determination block 312="Yes"), in block 314, the second DSC 144b may mark, designate, or allocate all or portions of its excess resources for access and use by other networks (e.g., the first network, etc.). In block 316, the second DSC 144b may generate a resource allocation report, and send the generated resource allocation report to the DPC 146 (e.g., via a resource communication message). The DSC 144b may be configured to generate the resource allocation report to include information identifying the resources (or portions or amounts of resources) that are available for allocation and/or that have been marked, designated, or allocated by the second network.

In block 320, the DPC 146 may receive various resource status and allocation reports from DSCs 144 in many different networks, including the first and second DSCs 144a, 144b in the first and second networks. These reports may include information identifying various characteristics, criteria, requirements, and conditions of the networks and their components, such as the ratio of the detected user traffic to the total available spectrum resources, the amount of resources that are required by a network, the amount of resources that are available for allocation in a network, the types and capabilities of the wireless devices 102 that will use the allocated resources, system requirements that must be met before the wireless devices 102 access the allocated resources, network rules and policies with respect to access and use of resources, and other similar information.

In block 322, the DPC 146 may store the received reports (e.g., resource status reports, resource allocation reports, etc.) in memory (e.g., a non-volatile memory). In block 324, the DPC 146 may receive a request for resources from DSCs 144 in different networks, including the first DSC 144a in the first network. In block 326, the DPC 146 may use the received/ stored information (e.g., information received in requests for resources, resource allocation reports, resource status reports, etc.) to identify and select the most suitable/best available network from which the first network may lease or purchase additional resources. In the example illustrated in FIG. 3, the DPC 146 identifies and selects the second network as the most suitable network to provide resources to the first network.

In block 328, the DPC 146 may send a resource inquiry communication message to the second DSC 1144b. In block 330, the second DSC 1144b may receive the resource inquiry communication message. In block 332, the second DSC 1144b may determine the availability, amounts, and/or quantity of the excess resources that are marked, designated, or allocated by the second network. In block 334, the second DSC 1144b may generate and send a "resource inquiry response" communication message to the DPC 146. The second DSC 1144b may generate resource inquiry response to include information suitable for use in identifying the availability and quantity of the resources that are marked, designated, or allocated for access and use by other networks (e.g., the first network). In block 336, the DPC 146 may receive the "resources inquiry response" communication message from the second DSC 1144b, and in response, perform the operations of determination block 400 illustrated in FIG. 4.

Figure 4:
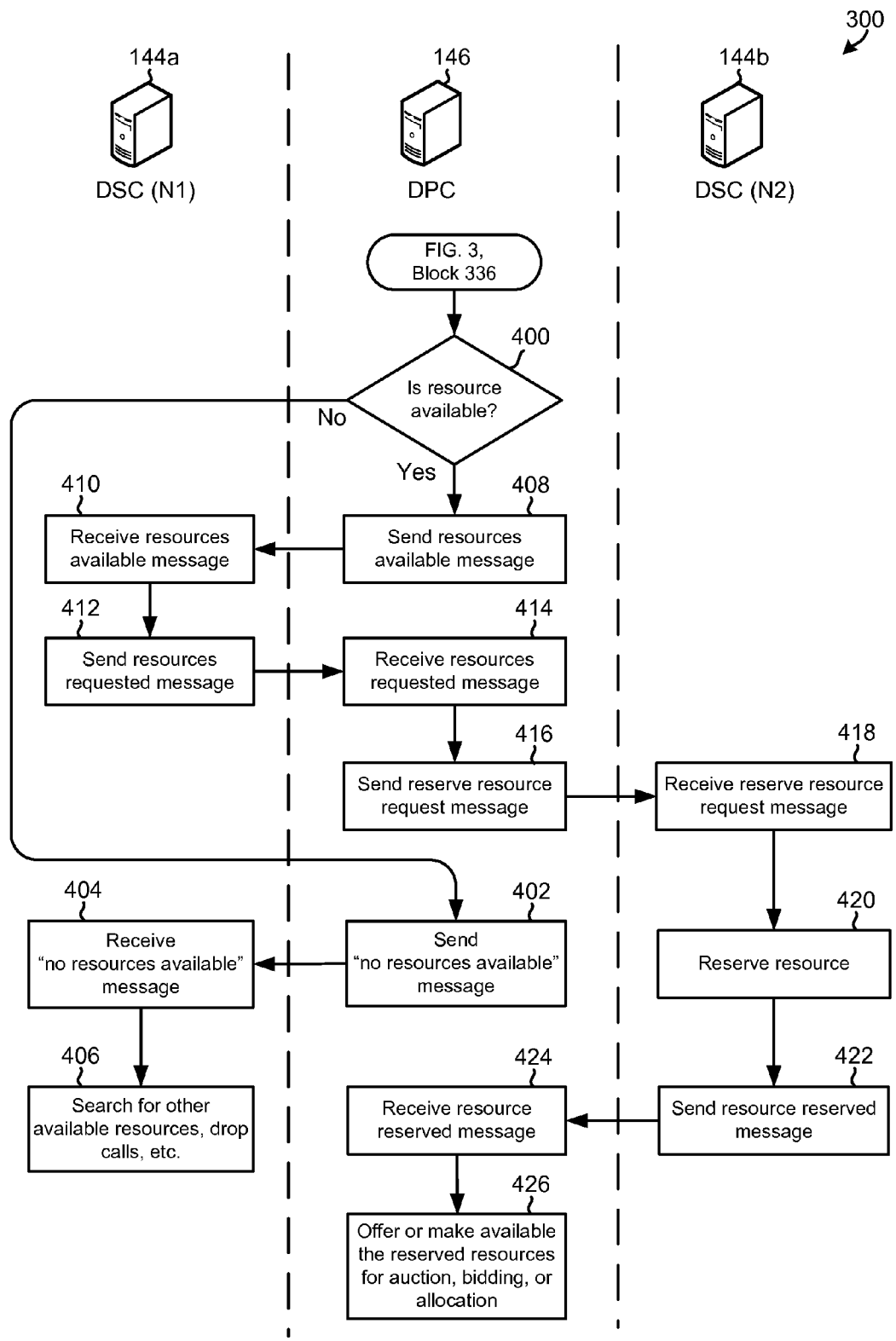

With reference to FIG. 4, in determination block 400, the DPC 146 may determine whether resources are available based on the data (e.g., resources inquiry response message) received from the second DSC 144b in the second network. For example, the DPC 146 may determine that the identified resources are not available in response to determining that all or a portion of the resources were purchased or won by other bidders before they were reserved.

In response to determining that the resources are not available (i.e., determination block 400="No"), in block 402, the DPC 146 may send a "no resources available" communication message to the first DSC 144a in the first network. In block 404, the first DSC 144a may receive the "no resources available" communication message. In block 406, the first DSC 144a may search (e.g., via the DPC 146) for other available resources, request resources from a different network, request different resources, terminate connections or communication sessions with users to free-up resources, or perform other similar operations to manage network traffic and congestion in the first network.

In response to determining that the resources are available (i.e., determination block 400="Yes"), in block 408, the DPC 146 may send a "resources available" communication message to the first DSC 144a. The resources available message may include information that may be used by the first DSC 144a to determine the quality and quantity of resources in the second network that may be used by wireless devices 102 in the first network.

In block 410, the first DSC 144a may receive the resources available communication message sent from the DPC 146. In block 412, the first DSC 144a may determine the amount/quantity of resources that the first network requires and/or will attempt to acquire, and send this and other resource information to the DPC 146 in a "request resources" communication message.

In block 414, the DPC 146 may receive the "request resources" message from the first DSC 144a. In block 416, the DPC 146 may use information included in received message to generate and send a "reserve resources request" communication message to the second DSC 144b in the second network.

In block 418, the second DSC 144b may receive the "reserve resource request" message from the DPC 146. In block 420, the second DSC 144b may use the information included in the received "reserve resources request" message to reserve the requested quantity of allocated resources for access and use by components in other networks. In block 422, the second DSC 144b may send a "resource reserved" communication message to the DPC 146 to confirm that the requested quantity of resources has been reserved and/or to identify the reserved resources.

In block 424, the DPC 146 may receive the "resource reserved" communication message from the second DSC 144b. In block 426, the DPC 146 may offer the reserved resources for auction and/or begin accepting resource bids on the reserved resources.

Figure 5:
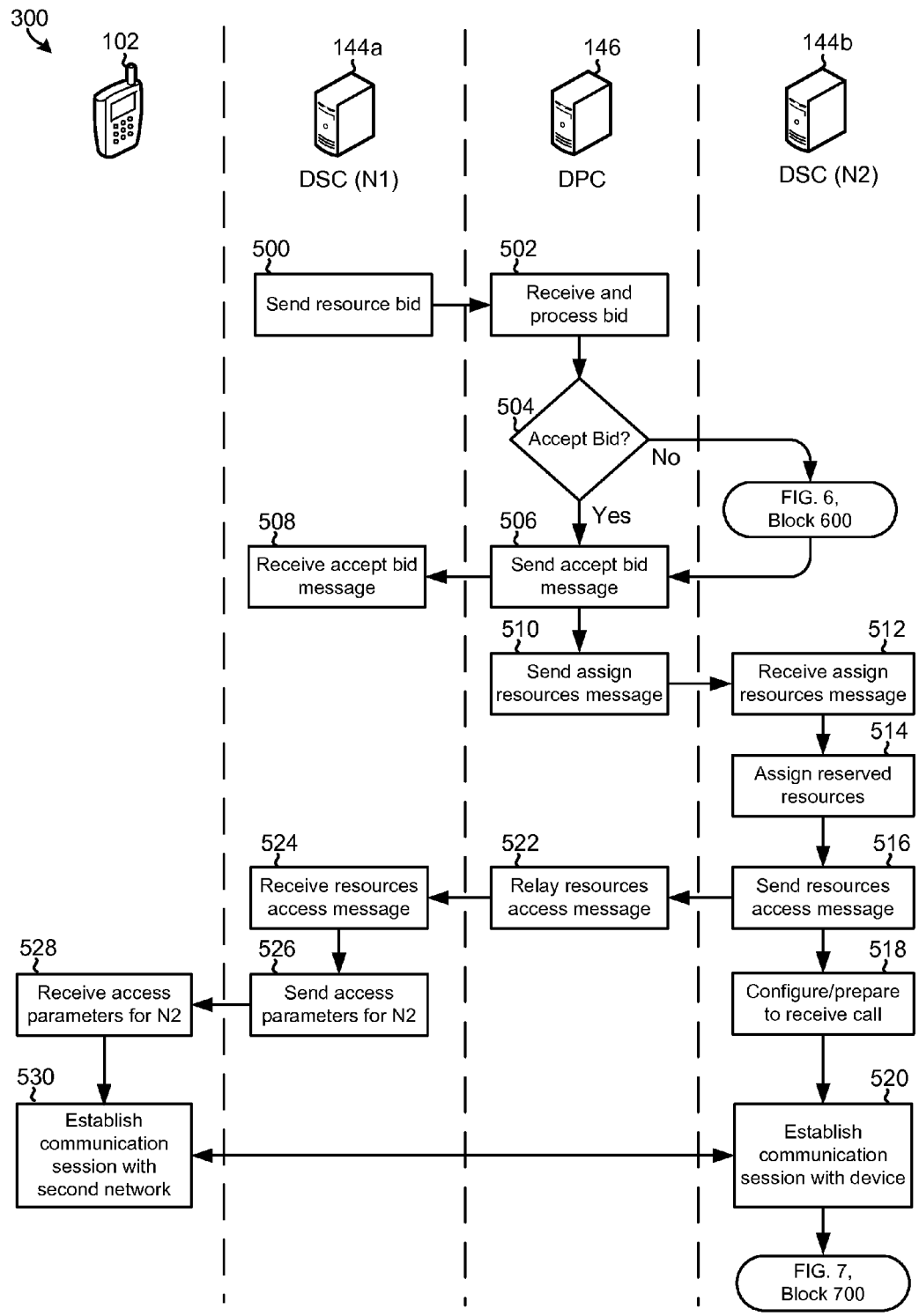

FIG. 5 illustrates a bidding procedure of the DSA method 300 that may be performed after the DPC 146 offers the reserved resources for auction and/or begins accepting resource bids on the reserved resources (e.g., after performing the operations of block 426 illustrated in FIG. 4).

With reference to FIG. 5, in block 500, the first DSC 144a in the first network may negotiate access to the reserved resources of second network by sending a resource bid (e.g., via a communication message) to the DPC 146. In block 502, the DPC 146 may receive the resource bid from the first DSC 144a.

In determination block 504, the DPC 146 may determine whether the received resource bid is to be accepted, which may be accomplished by determining whether the resource bid complies with the policies and rules of the DSA system and the requirements of the second network (e.g., is greater than a minimum amount, etc.). In response to determining that the resource bid received from the first DSC 144a is to be accepted (i.e., determination block 504="Yes"), in block 506, the DPC 146 may send an "accept bid" communication message to the first DSC 144a. In block 508, the first DSC 144a may receive the "accept bid" message and wait to receive resource access instructions. In block 510, the DPC 146 may send an "assign resources" communication message to the second DSC 144b in the second network.

In block 512, the second DSC 144b may receive the "assign resources" communication message from the DPC 146. In block 514, the second DSC 144b may use the information included in the received "assign resources" message to assign all or portions of its reserved resources for access and use by components in the first network. In block 516, the second DSC 144b may generate a "resources access" communication message that includes information (e.g., access parameters, etc.) that may be used by a wireless device 102 (i.e., in the first network) to access the assigned resources, and the send the "resources access" message to the DPC 146. In block 518, the second DSC 144b may perform various operations to prepare for establishing a communication session/link to wireless device 102 in the first network, such as by configuring or preparing to receive a voice or data call.

In block 522, the DPC 146 may receive the "resources access" communication message from the second DSC 144b, and relay the resources access message to the first DSC 144a. In block 524, the first DSC 144a may receive the "resources access" message from the DPC 146. The received "resource access" message may include access parameters that may be used by the wireless devices 102 to access the allocated resources of the second network. In block 526, the first DSC 144a may send access parameters to wireless devices 102 that have communication sessions with the first network and/or to the wireless devices 102 that the first network has designated/marked for migration to other networks.

In block 528, the wireless devices 102 may receive the access parameters of second network from the first DSC 144a. In blocks 530 and 520, the wireless devices 102 and/or second DSC 142b may perform various operations to establish a communication session/link between the wireless devices 102 and the second network. The second DSC 144b may then perform the operations of block 700 illustrated in FIG. 7 and discussed further below.

As mentioned above, in determination block 504, the DPC 146 may determine whether the resource bid received from the first DSC 144a is to be accepted. In response to determining that the resource bid received from the first DSC 144a is not to be accepted (i.e., determination block 504="No"), the DPC 146 may perform the operations of block 600 illustrated in FIG. 6.

Figure 6:
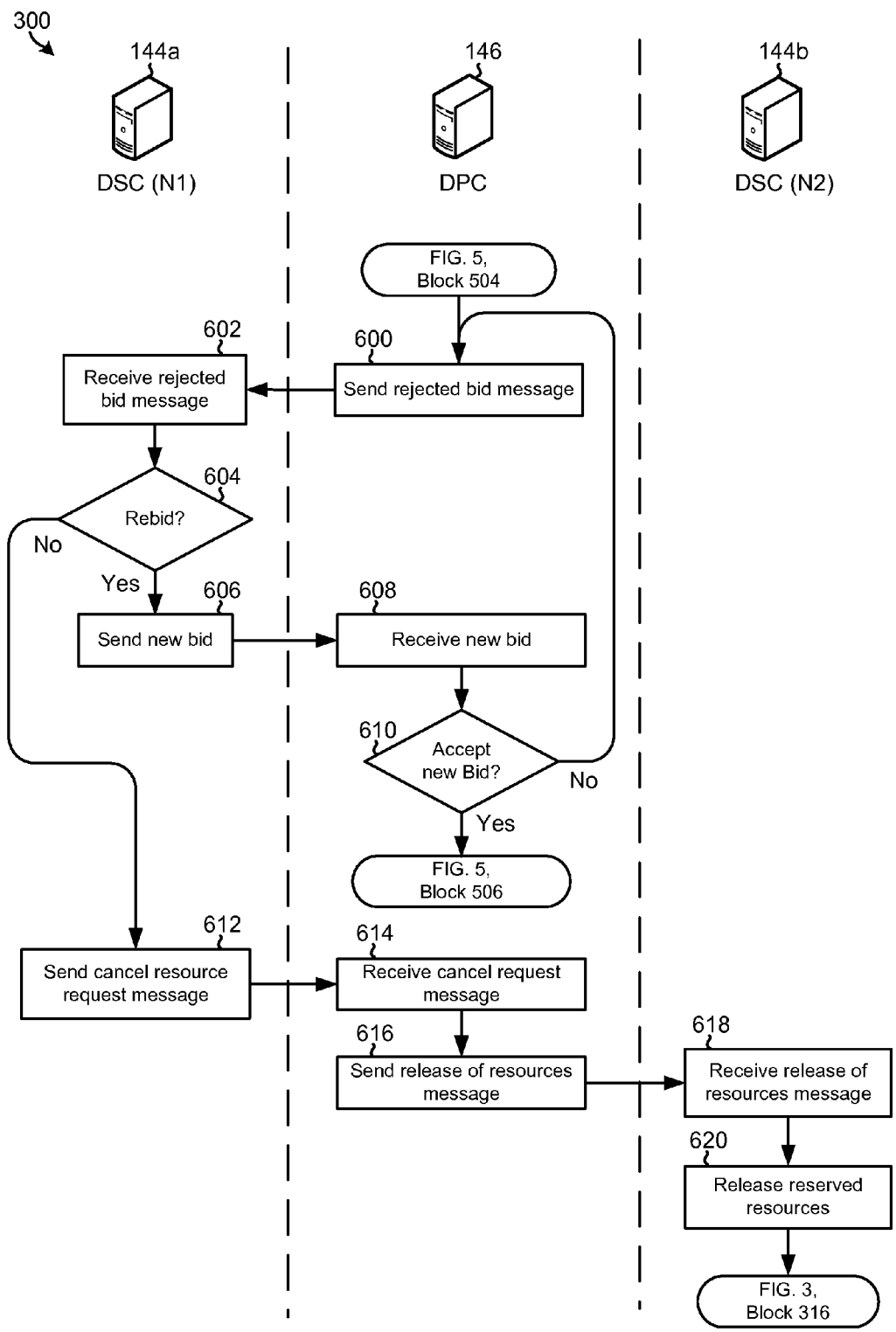

With reference to FIG. 6, in block 600, the DPC 146 may send a "rejected bid" communication message to the first DSC 144a. In block 602, the first DSC 144a may receive the "rejected bid" message from the DPC 146. In determination block 604, the first DSC 144a may determine whether the first network will/should rebid for the resources. In response to determining that the first network will/should rebid for the resources (i.e., determination block 604="Yes"), in block 606, the first DSC 144a may send a new resource bid (e.g., in a resource bid communication message) to the DPC 146.

In block 608, the DPC 146 may receive the new resource bid (or rebid) from the first DSC 144a. In determination block 610, the DPC 146 may determine whether to accept the new resource bid, such as by determining whether the new resource bid complies with the policies and rules of the DSA system and the requirements of the second network. In response to determining that the new resource bid is to be accepted (i.e., determination block 610="Yes"), the DPC 146 may perform the operations of block 506 illustrated in FIG. 5. In response to determining that the new resource bid is to not be accepted (i.e., determination block 610="No"), the DPC 146 may perform the operations of block 600.

In response to determining that the first network should rebid for the resources (i.e., determination block 604="No"), in block 612, the first DSC 144a may send a "cancel resource request" communication message to the DPC 146. In block 614, the DPC 146 may receive the "cancel resource request" message from the first DSC 144a. In block 616, the DPC 146 may send a "release of resources" communication message to the second DSC 144b.

In block 618, the second DSC 144b may receive the "release of resources" message from the DPC 146. In block 620, the second DSC 144b may release the reserved resources so that they may be used by other networks. The second DSC 144b may then report the status of the allocated resources to DPC 146, which may be accomplished by performing the operations of block 316, which is illustrated in FIG. 3 and discussed above.

Figure 7:
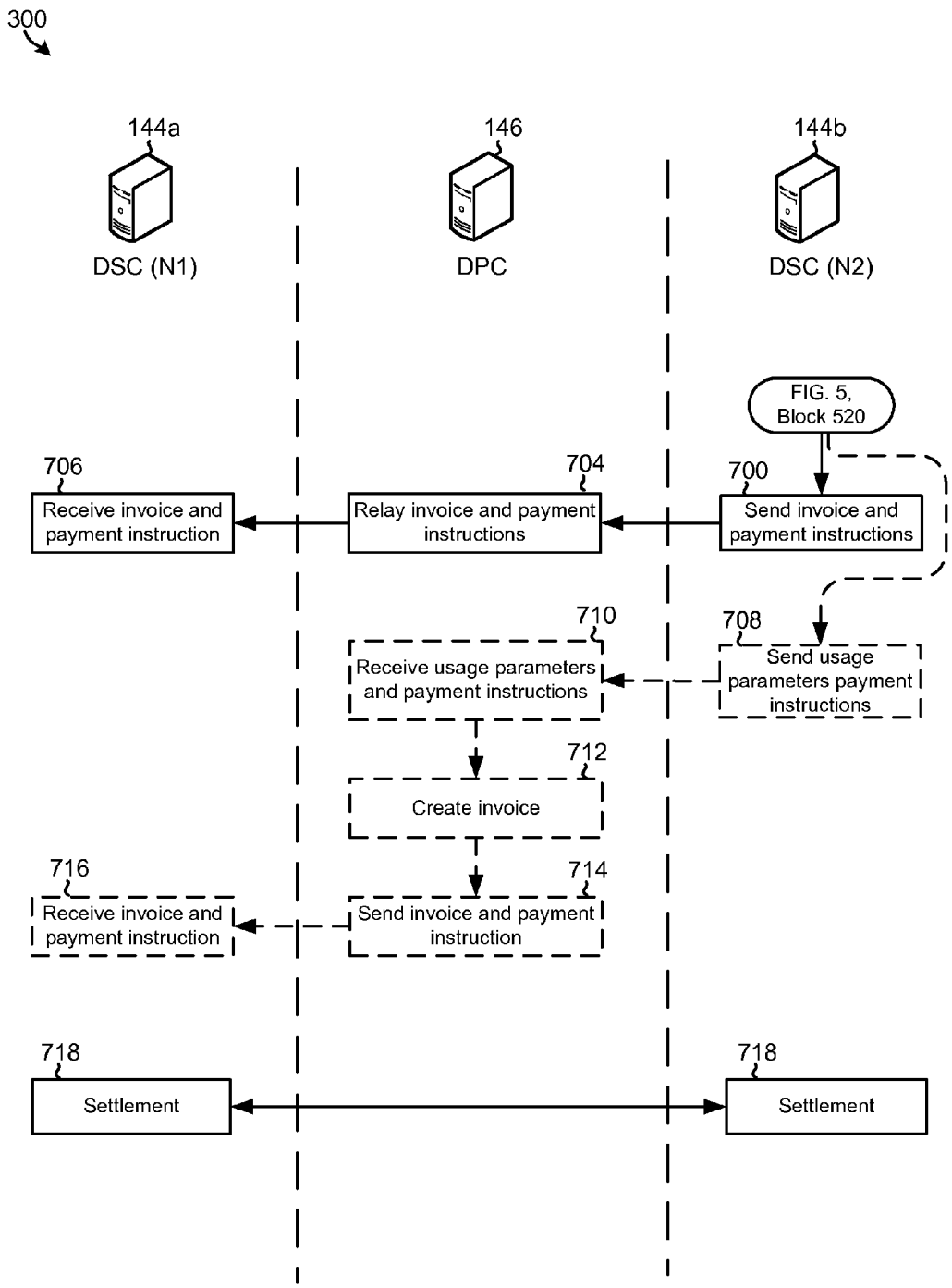

FIG. 7 illustrates settlement procedure of the DSA method 300 that may be performed after second network provides access to the secondary user wireless devices 102 in the first network (i.e., after performing the operations of block 520 illustrated in FIG. 5).

In block 700, the second DSC 144b may send invoices and payment instructions relating to the use of allocated resources by the first network to the DPC 146. In block 704, the DPC 146 may relay the received invoice and payment instructions to the first DSC 144a. In block 706, the first DSC 144a may receive the invoices and payment instructions, and settle the charges with the second network in block 718.

Optionally or alternatively, in block 708, the second DSC 144b may send usage parameters and payment instructions to the DPC 146. In block 710, the DPC 146 may receive the usage parameters and payment instructions from the second DSC 144b. In block 712, the DPC 146 may create an invoice for the access and use of the resources. In block 714, the DPC 146 may send the invoice to the first DSC 144a in the first network. In block 716, the first DSC 144a may receive the invoice and payment instructions, and perform various operations to settle the charges with second network in block 718.

In the various embodiments, the DPC 146 and DSC 144 components may be configured to communicate via an interface, which may be implemented in, or provided via, a dynamic spectrum arbitrage application part (DSAAP) protocol/module/component that is defined over the Xe and/or Xd reference points. The DSAAP may allow, facilitate, support, or augment communications between the DPC 146 and DSC 144 so as to improve the efficiency and speed of the DSA system and telecommunication network. In various embodiments, all or portions of the DSAAP module/component may be included in a DPC 146 component, a DSC 144 component, in a component that is independent of the DPC 146 and DSC 144 components, or any combination thereof. The DSAAP module/component may allow these and other DSA components to communicate information using the DSAAP protocol.

For example, the DSAAP may allow the DPC 146 and DSC 144 components to communicate specific information and/or perform operations that together provide various functions, including a DSC registration function, resource availability advertisement function, bidding and allocation of resources functions, handing off lessee users to lessor network function, backoff from lessor networks function, error handling function (e.g., reporting of general error situations for which function specific error messages are not defined, etc.), DSC de-registration function, error indication function, DSC bidding success and failure indication functions, and DSC resource allocation withdrawal function. In various embodiments, these functions may be provided, implemented, or accomplished by configuring the DPC 146 and/or DSC 144 components to perform one or a combination of the DSAAP methods discussed below with reference to FIGS. 8A-17B. Using the DSAAP protocol and performing the DSAAP methods may include communicating via one or more DSAAP messages.

In various embodiments, the DSAAP messages used to communicate information between the DSC 144 and DPC 146 may include a DSC REGISTER REQUEST message, DSC REGISTER ACCEPT message, DSC REGISTER REJECT message, DSC DE-REGISTER message, DSC RESOURCE REGISTER REQUEST message, DSC RESOURCE REGISTER ACCEPT message, DSC RESOURCE REGISTER REJECT message, AVAILABLE BIDS REQUEST message, AVAILABLE BIDS RESPONSE message, AVAILABLE BIDS REJECT message, DSC BID REQUEST message, DSC BID ACCEPT message, DSC BID REJECT message, DSC BID OUTBID message, DSC BID WON message, DSC BID LOST message, DSC BID CANCELLED message, DSC BUY REQUEST message, DSC BUY ACCEPT message, DSC BUY REJECT message, DSC RESOURCES ALLOCATED message, DSC RESOURCES WITHDRAWN message, and/or DSC BACKOFF COMMAND message. Each of these messages may include, or may be associated with, criticality information, presence information, range information, and assigned criticality information. These messages and their contents are discussed in detail further below.

In various embodiments, the DSAAP methods may be performed in a DSA system that includes a first DSC server in a first telecommunication network (e.g., a lessee network), a second DSC server in second telecommunication network (e.g., a lessor network), and a DPC server that is outside of the first and second telecommunication networks. The first DSC may include first DSC processor coupled to the DPC via a first communication link, and the second DSC may include a second DSC processor coupled to the DPC via a second communication link. The second DSC may be coupled to an eNodeB in the second telecommunication network via third communication link. The first and second communication links may be defined over the Xd interface, and the third communication link is defined over the Xe interface.

Figure 8A:
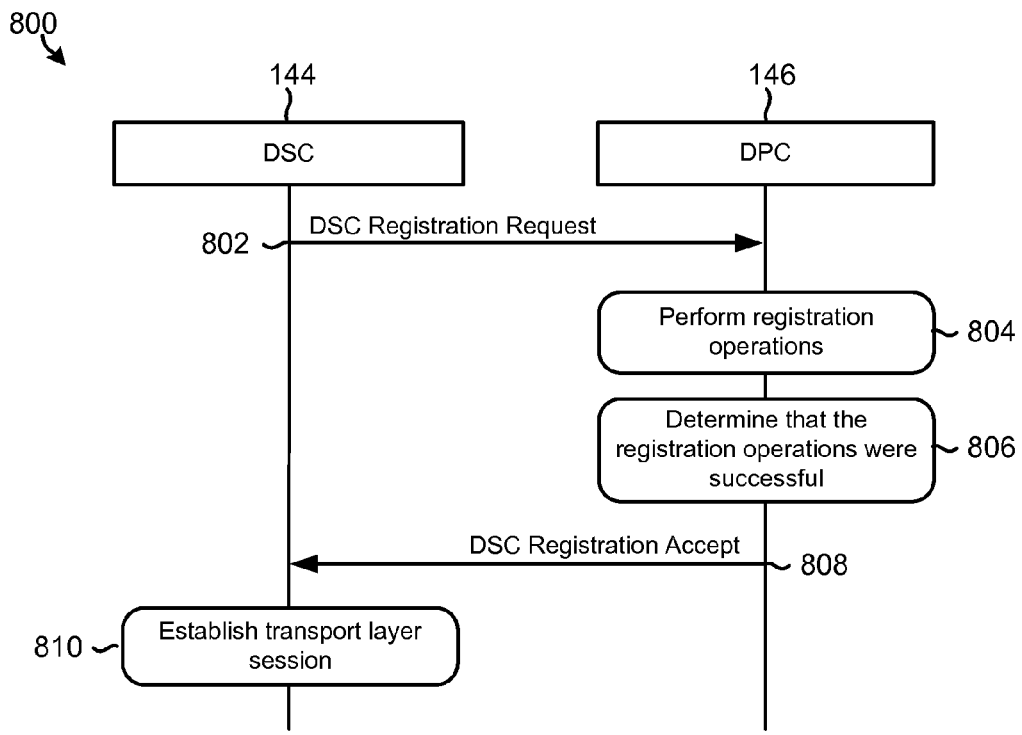
FIGS. 8A through 8C are message flow diagrams illustrating an embodiment dynamic spectrum arbitrage application part (DSAAP) registration method.
Figure 8B:
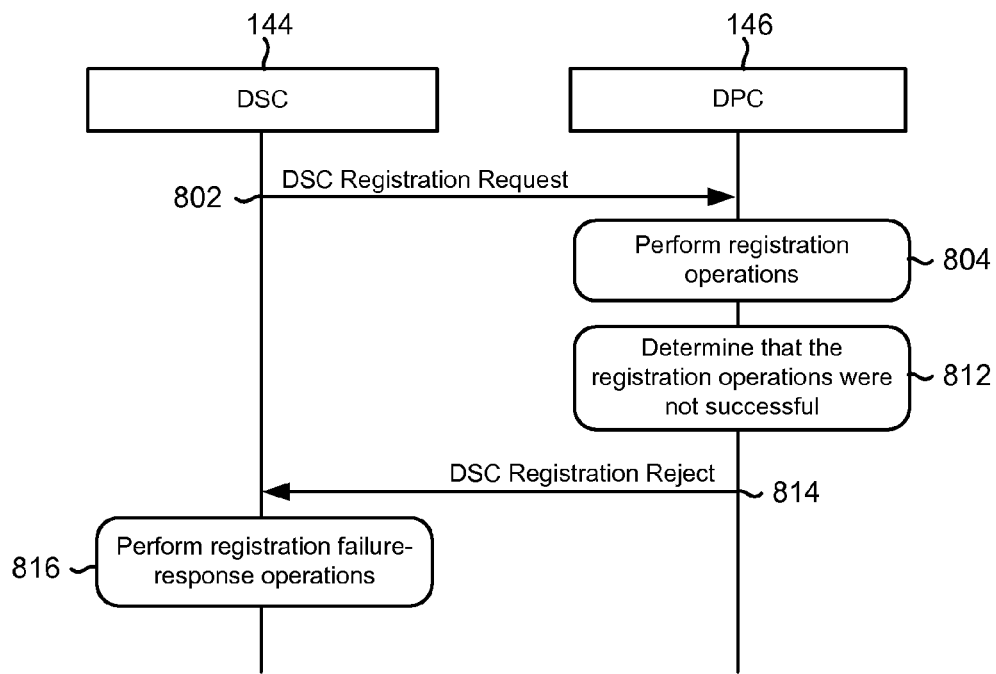
Figure 8C:
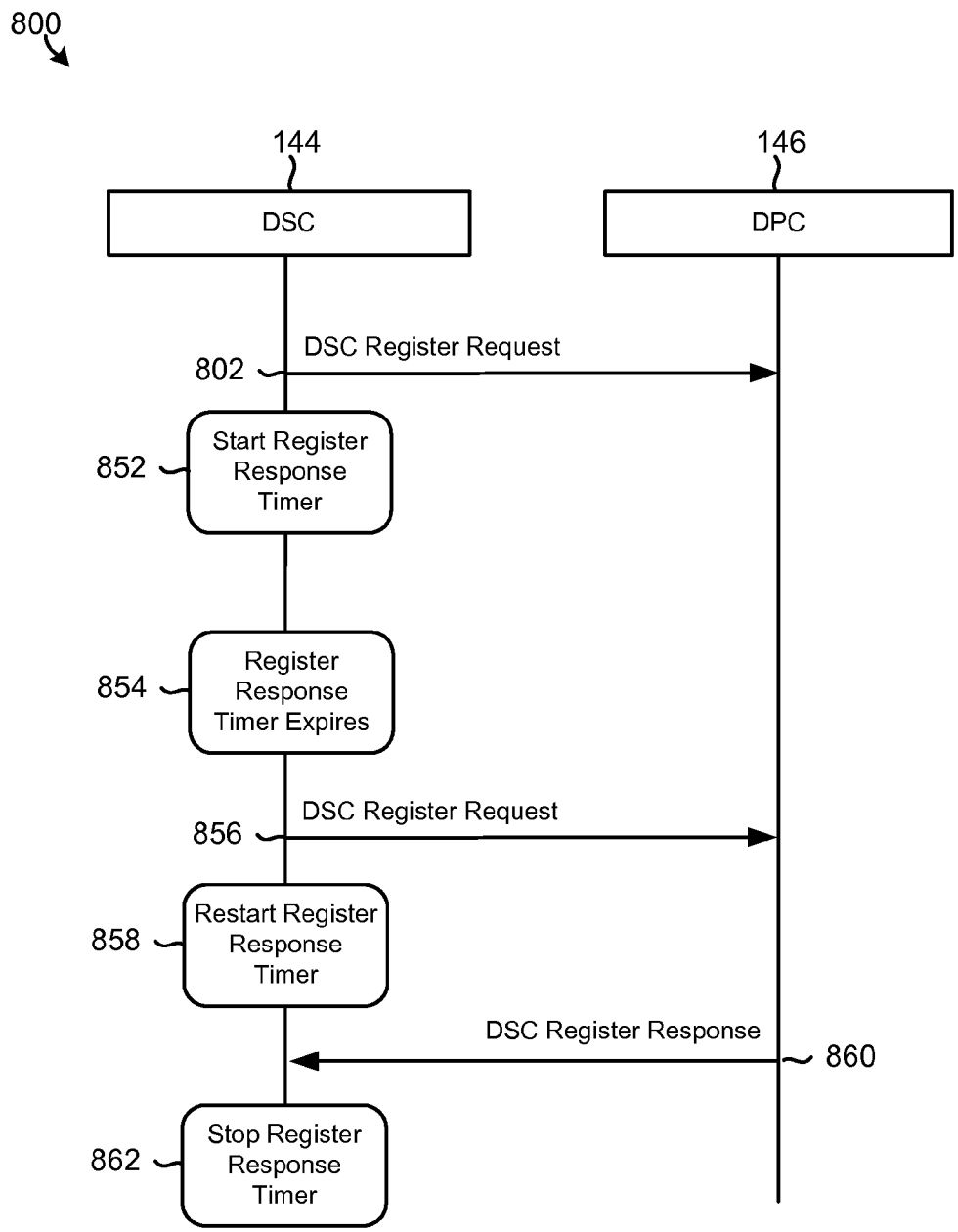

FIGS. 8A through 8C illustrate an embodiment DSAAP registration method 800 for registering a DSC 144 component with a DPC 146 so as to allow the DPC 146 to provide various services to the DSC 144 (e.g., advertizing a lessor DSC's 144 resources for bidding, allowing a lessee DSC 144 to bid for resources provided by other networks, etc.). In the examples illustrated in FIGS. 8A through 8C, the DSAAP registration method 800 is performed by processing cores in a DPC 146 component and a DSC 144 component, each of which may include all or portions of a DSAAP module/component. The operations DSAAP registration method 800 may be performed after, or in response to the DSC 144 or DPC 146 detecting that, an XE signaling transport or communication link has been established.

In operation 802 illustrated in FIGS. 8A through 8C, the DSC 144 may initiate DSAAP registration method 800 by generating and sending a DSC REGISTER REQUEST message to the DPC 146. In an embodiment, the DSC 144 may be configured to generate and/or send the DSC REGISTER REQUEST message in response to determining that it requires services from the DPC 146. For example, the DSC 144 may be configured to generate the DSC REGISTER REQUEST message in response to determining that its corresponding network (i.e., the network represented by the DSC) includes excess resources that may be allocated to other networks. As another example, the DSC 144 may be configured to generate the DSC REGISTER REQUEST message in response to determining that its network requires additional resources to provide adequate service to its existing wireless devices 102 in view of the current or expected future user traffic, network congestion, etc.

In various embodiments, the DSC 144 may be configured to generate the DSC REGISTER REQUEST message to include any or all of a message type information element (IE), a message ID IE, a DSC identity IE, a DSC Internet protocol (IP) address IE, a DSC type IE, a DSC PLMN-ID IE, PLMN type IE, and DSC resource update timer IE. The DSC PLMN-ID IE may include a PLMN ID that is suitable for use in identifying the network (e.g., E-UTRAN) that is associated with, or represented by, the DSC 144. The PLMN type IE may include information that is suitable for use in determining the type of network (e.g., public safety, commercial, etc.) that is represented by the DSC 144. The DSC IP address IE may include the IP address of a DSC 144 that is responsible for managing, maintaining, or providing the XE interface of the DSAAP.

In operation block 804 illustrated in FIGS. 8A and 8B, the DPC 146 may perform various registration operations (i.e., authenticating the DSC, storing DSC identifier information in memory, etc.) to register the DSC 144 with the DPC 146. In an embodiment, as part of these registration operations, the DPC 146 may overwrite/override an existing registration with a new registration, such as in response to receiving a duplicate DSC REGISTER REQUEST message (i.e. for an already registered DSC identified by the same unique DSC identity).

In operation block 806 illustrated in FIG. 8A, the DPC 146 may determine that the registration operations were successful. In operation 808, the DPC 146 may generate and send a DSC REGISTER ACCEPT message to the DSC 144 to indicate the acceptance and registration of the DSC 144. In various embodiments, the DPC 146 may generate the DSC REGISTER ACCEPT message to include any or all of a message type information element (IE), a message ID IE, a DPC ID IE, a XEh signaling transport network layer (TNL) address IE, and a tunneling information IE. The XEh signaling TNL address IE may include an address value that is suitable for use in establishing to transport layer session. The tunneling information IE may include information that may used to encapsulate a different payload protocol, establish a secured communication through an untrusted or unverified network, carry a payload over an incompatible delivery-network, and/or to perform other similar tunneling operations.

To support XEh connectivity via/to the DPC 146, in operation block 810, the DSC 144 may use the address value included in the XEh signaling TNL address IE of the DSC REGISTER ACCEPT message establish a transport layer session. In an embodiment, the DSC 144 may be configured to establish the transport layer session in response to determining that the DSC REGISTER ACCEPT message includes an address value in the XEh signaling TNL address information element. In an embodiment, the DSC 144 may be configured to determine that the XEh connectivity via/to the DPC 146 is not supported or not required in response to determining that the XEh signaling TNL address information element is not present, null, empty, or not valid.

With reference to FIG. 8B, in operation block 812, the DPC 146 may determine that the registration operations performed as part of operation 804 failed. The DPC 146 may determine that registration failed in response to detecting any of a variety of conditions/events, including the failure to authenticate or authorize the DSC, network or component overload, DSC parameter mismatch, etc. In operation 814, the DPC 146 may generate and send a DSC REGISTER REJECT message to the DSC 144 to inform the DSC 144 that the registration failed and/or that the DPC 146 cannot register the DSC 144. In various embodiments, the DPC 146 may generate the DSC REGISTER REJECT message to include any or all of a message type information element (IE), a message ID IE, a cause IE, a criticality diagnostics IE, and a backoff timer IE. The cause IE may include information suitable for identifying a specific reason for the failure (e.g., overloaded, etc.) or for indicating that the reason for the failure is not known or is unspecified.

In operation block 816, the DSC 144 may perform various registration failure-response operations based on the information included in the received REGISTER REJECT message. For example, the DSC 144 may wait for a duration indicated in the backoff timer IE of the received REGISTER REJECT message before reattempting registration with that same DPC 146 in response to determining that the value of the cause IE in the received REGISTER REJECT message is set to "overload."

With reference to FIG. 8C, in operation block 852, the DSC 144 may start a register response timer in response to sending a DSC REGISTER REQUEST message to the DPC 146 (e.g., as part of operation 802). In operation block 854, the DSC 144 may determine that the register response timer expired before the DSC 144 received a DSC REGISTER RESPONSE message. In operation 856, the DSC 144 may resend the DSC REGISTER REQUEST message to the DPC 146 in response to determining that the timer expired before it received a corresponding DSC REGISTER RESPONSE message. In operation block 858, the DSC 144 may restart or reset the register response timer. In operation 860, the DPC may send a DSC REGISTER RESPONSE message to the DSC 144. In operation block 862, the DSC 144 may stop the register response timer in response to receiving the DSC REGISTER RESPONSE message.

Figure 9A:
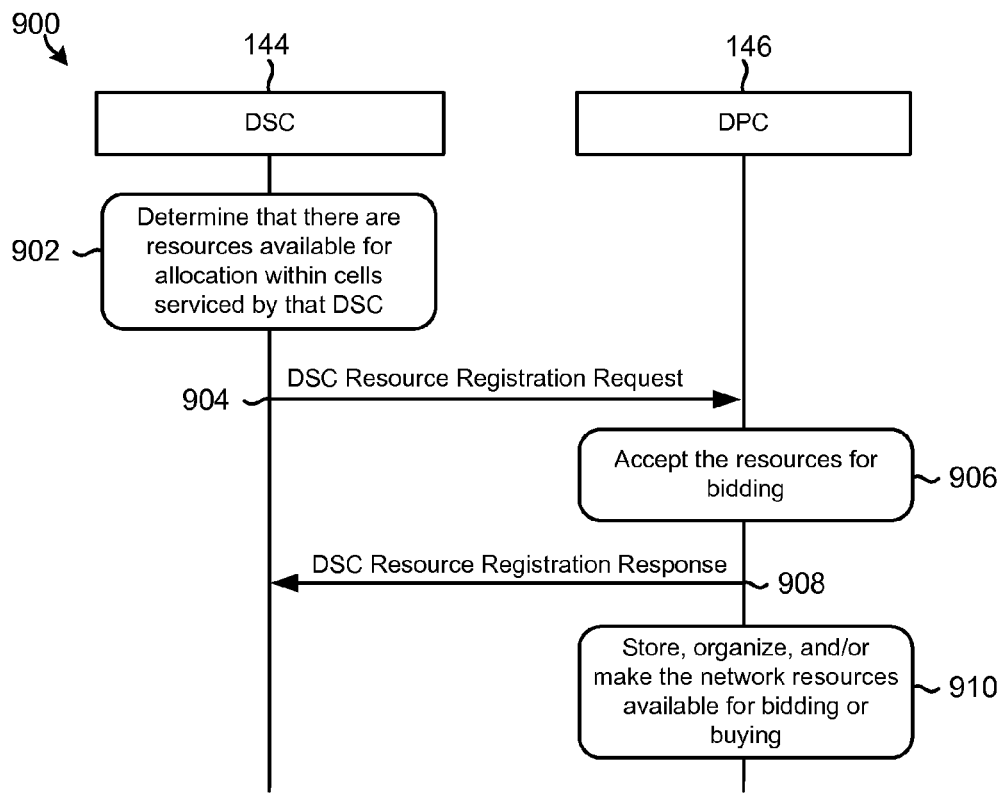
FIGS. 9A and 9B are message flow diagrams illustrating an embodiment DSAAP advertizing method.
Figure 9B:
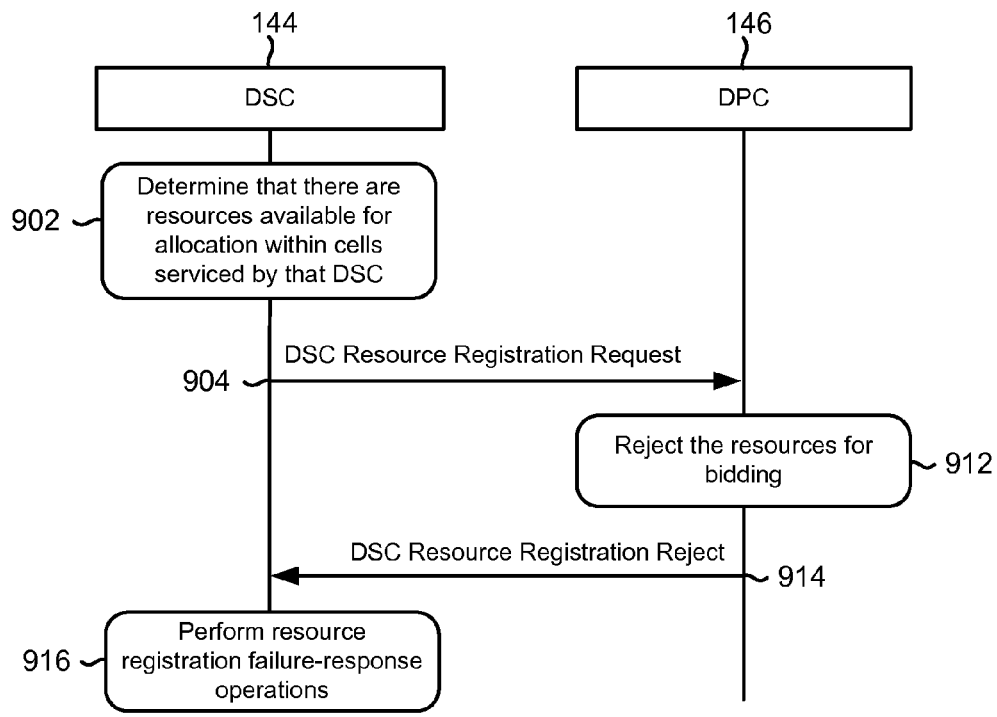

FIGS. 9A and 9B illustrate a DSAAP advertizing method 900 for advertizing resources that are available for bidding/buying so as to allow the DPC 146 to store, organize, and/or make those resources available for bidding/allocation via a financial brokerage platform. In the examples illustrated in FIGS. 9A and 9B, the DSAAP advertizing method 900 is performed by processing cores in a DPC 146 component and a DSC 144 component, each of which may include all or portions of a DSAAP module/component.

In operation block 902 illustrated in FIGS. 9A and 9B, the DSC 144 may determine that there are resources available for allocation within cells serviced by that DSC 144. In operation block 904, the DSC 144 may generate and send a DSC RESOURCE REGISTER REQUEST message to the DPC 146. In various embodiments, the DSC 144 may generate the DSC RESOURCE REGISTER REQUEST message to include any or all of a message type information element (IE), a message ID IE, a DSC identity IE, a DSC type IE, a PLMN-ID list IE, resource availability IE, resource availability start time IE, a data bandwidth IE, a list of grids IE, a bid or buy IE, a minimum bid amount IE, resource availability end time IE, a time of the day IE, a time duration IE, megabits per second (MBPS) IE, and a cell identity IE.

The DSC identity IE may include information that may be used by the DPC 146 to determine the identity of DSC 144. For example, the DSC identity IE may include a DSC pool ID, DSC instance information, and a PLMN ID of the network that the DSC is managing or representing. The DSC pool ID may be a unique identifier of a pool of available resources and/or may be the same as or similar to MME pool IDs and MME IDs in 3GPP EPC architecture.

The message ID IE may include a message identifier for the specific DSC RESOURCE REGISTER REQUEST message sent from the DSC 144. The DSC 144 and DPC 146 may be configured to use the message ID IE as a sequence number to identify and correlate DSC RESOURCE REGISTER REQUEST, DSC RESOURCE REGISTER ACCEPT and/or DSC RESOURCE REGISTER REJECT messages.

The resource availability IE may include information suitable for use by the DPC 146 in determining the PLMN ID of the network that is advertising resources for allocation and use by other networks. The DPC 146 may be configured to receive, store, and/or maintain resource availability IEs for multiple DSCs and/or for multiple different networks (i.e. different PLMN IDs). As such, each resource availability IE may include information suitable for identifying one or more of the networks that are advertising resources.

The time of the day IE may include information suitable for use by the DPC 146 in determining the time of the day that the DSC 144 transmitted the DSC RESOURCE REGISTER REQUEST message. The time duration IE may include information that is suitable for use in determining a time period during which the resources are to be made available for bidding or buying.

The data bandwidth IE may include information suitable for use in determining the available bandwidth (e.g., in MBPS) for the time duration specified in the optional time duration IE. The DPC 146 may determine that the bandwidth specified in the MBPS IE is to be made available until that bandwidth is consumed by the winning bidder or buyer in response to determining that the time duration IE is not included in the received DSC RESOURCE REGISTER REQUEST message (or in response to determining that the time duration IE does not include a valid value).

The list of grids IE may include information suitable for use in determining grid identifiers for the locations of the network bandwidth that is to be made available for bidding or buying. The cell identity IE may include information suitable for use in determining the individual cells within each grid (identified by grid ID and cell ID) that have available resources offered for bidding or buying as part of the offer in the DSC RESOURCE REGISTER REQUEST message. The minimum bid amount IE may include a monetary amount in a denomination or currency, such as in United States Dollars (USD).

In operation block 906 illustrated in FIG. 9A, the DPC 146 may accept the DSC's 144 resources for bidding. In operation 908, the DPC 146 may generate and send a DSC RESOURCE REGISTER RESPONSE or DSC RESOURCE REGISTER ACCEPT message to the DSC 144 to acknowledge that the resources were accepted. In various embodiments, the DPC 146 may generate the DSC RESOURCE REGISTER message to include any or all of a message type information element (IE), a bid ID IE, and a message ID IE. The message ID IE may include the same message identifier value that is included in the received DSC RESOURCE REGISTER REQUEST message. The DPC 146 and/or DSC may be configured to use the value of the message ID IE to identify and correlate the DSC RESOURCE REGISTER REQUEST and DSC RESOURCE REGISTER ACCEPT messages. In operation block 910, the DPC 146 may store, organize, and/or make the network resources available for bidding or buying via the financial brokerage platform.

In operation 912 illustrated in FIG. 9B, the DPC 146 may reject the DSC RESOURCE REGISTER REQUEST message and/or reject for bidding the resources identified in the received DSC RESOURCE REGISTER REQUEST message. The DPC 146 may reject the message/resources for a variety of reasons and/or in response to detecting any of a variety of events or conditions. For example, the DPC 146 may reject the resources in response to determining that the DPC 146 is not accepting resources from any operator, is not accepting resources for the specific operator identified in the received message, is not accepting the resources identified in the message, that the DPC is overloaded, that there is insufficient memory to store and service the resources available for bidding, etc. The DPC 146 may also reject the resource available message in response to determining that an administrator of the DPC 146 has disabled further bidding from the specific PLMN ID included in the DSC RESOURCE REGISTER REQUEST message, from all the networks (e.g., all the PLMN IDs), etc.

In operation 914 illustrated in FIG. 9B, the DPC 146 may generate and send a DSC RESOURCE REGISTER REJECT message to the DSC 144. In various embodiments, the DPC 146 may generate the DSC RESOURCE REGISTER REJECT message to include any or all of a message type information element (IE), a message ID IE, a cause IE, and a criticality diagnostics IE. The DPC 146 may also generate the DSC RESOURCE REGISTER REJECT message to include a message ID IE that includes a value that is the same as the message identifier included in the DSC RESOURCE REGISTER REQUEST message received from DSC 144. The DPC 146 and/or DSC 144 may be configured to use the value of the message ID IE to identify and correlate the DSC RESOURCE REGISTER REQUEST and DSC RESOURCE REGISTER REJECT messages.

In operation block 916, the DSC 144 may perform various resource registration failure response operations based on information included in the received DSC RESOURCE REGISTER REJECT message. For example, the DSC 144 may use the information included in the DSC RESOURCE REGISTER REJECT message to determine whether to reattempt resource registration with the DPC 146, attempt to register the resources with another DPC, reattempt the registration with different resources, or perform any of the other DSC operations discussed in this application.

Figure 10A:
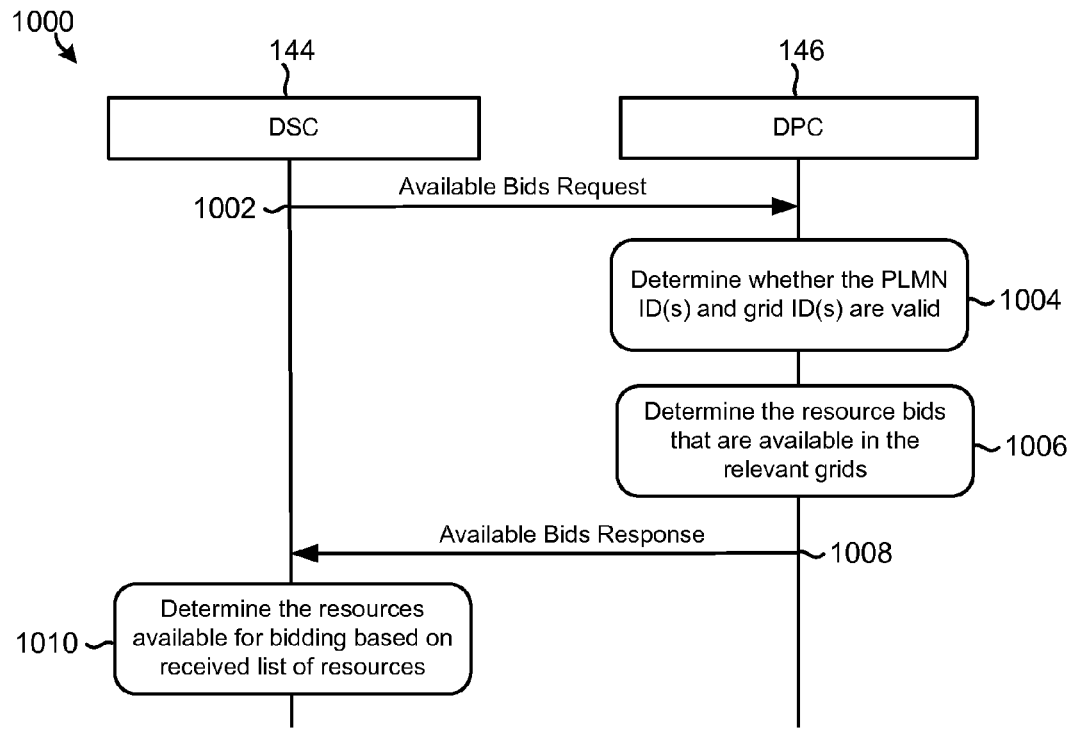
FIGS. 10A and 10B are message flow diagrams illustrating an embodiment DSAAP method for communicating a list of available resources.
Figure 10B:
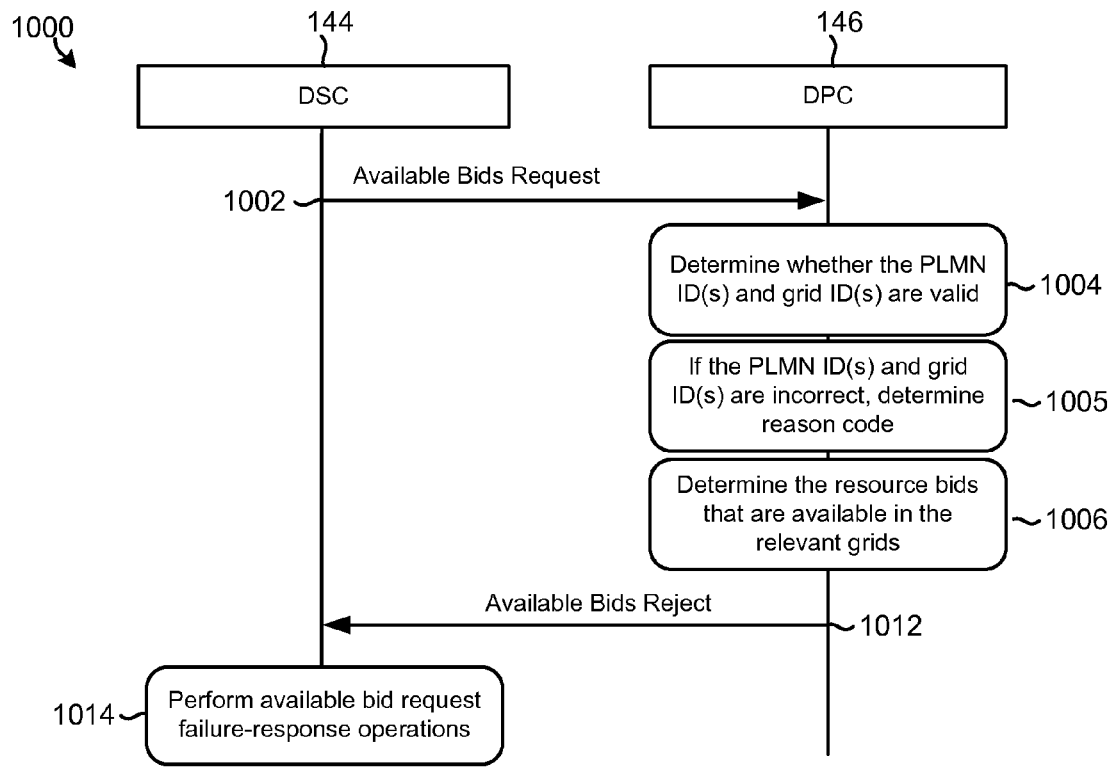

FIGS. 10A and 10B illustrate a DSAAP method 1000 for communicating a list of available resources in accordance with an embodiment. DSAAP method 1000 may be performed to inform lessee networks of the resource bids or resources that are available for bidding/buying. In the examples illustrated in FIGS. 10A and 10B, the DSAAP method 1000 is performed by processing cores in a DPC 146 component and a DSC 144 component, each of which may include all or portions of a DSAAP module/component. In an embodiment, a lessee DSC 144 may be configured to perform DSAAP method 1000 to retrieve/receive a list of available resources prior to that DSC 144 bidding on, or requesting to lease or purchase, resources from the DPC 146.

In operation 1002 illustrated in FIGS. 10A and 10B, a lessee DSC 144 may generate and send an AVAILABLE BIDS REQUEST message to the DPC 146 to request information on the resource bids that are available for allocation from lessor network(s) for bidding or buying. In various embodiments, the lessee DSC 144 may generate the AVAILABLE BIDS REQUEST message to include any or all of a sequence number information element (IE), a message type IE, a PLMN list IE that includes one or more PLMN ID IEs, a grid ID list IE that includes one or more Grid ID IEs.

In an embodiment, the lessee DSC 144 may be configured to request specific resources from a specific network by generating the AVAILABLE BIDS REQUEST message to include the PLMN ID of the desired network, which may be included in the PLMN ID IE of the PLMN list IE in the AVAILABLE BIDS REQUEST message.

In an embodiment, the lessee DSC 144 may be configured to request resources from any available network by not populating the PLMN list IE in the generated AVAILABLE BIDS REQUEST message and/or by generating the AVAILABLE BIDS REQUEST message to not include a PLMN list IE and/or PLMN ID value.

In an embodiment, the lessee DSC 144 may be configured to request resources from a specific grid within a lessor network by generating the AVAILABLE BIDS REQUEST message to include the grid IDs of the desired grids, which may be included in the grid ID IE of the grid ID list IE in the AVAILABLE BIDS REQUEST message.

In an embodiment, the lessee DSC 144 may be configured to request resources from any or all grids within a specified PLMN ID in PLMN ID IE grid by not populating the grid ID list IE in the generated AVAILABLE BIDS REQUEST message and/or by generating the AVAILABLE BIDS REQUEST message to not include a grid ID.

In operation block 1004 illustrated in FIGS. 10A and 10B, the DPC 146 may determine whether the PLMN ID(s) and grid ID(s) included in the received AVAILABLE BIDS REQUEST message are valid. If the PLMN ID(s) and grid ID(s) are incorrect, in operation block 1005, the DPC 146 may determine a reason code for the error/incorrect values. In operation block 1006, the DPC 146 may determine whether there are resources/bids available for each grid identified in the received AVAILABLE BIDS REQUEST message or for all the available grids (e.g., when the grid ID list IE in the received AVAILABLE BIDS REQUEST message not include valid values).

In operation 1008 illustrated in FIG. 10A, the DPC 146 may generate and send an AVAILABLE BIDS RESPONSE message to the DSC 144. The DPC 146 may be configured to generate the AVAILABLE BIDS RESPONSE message to include any or all of a message type information element (IE), a message ID IE, a DSC identity IE, a PLMN-ID grid cell bid info list IE, a sequence number IE, a PLMN list IE that includes one or more PLMN ID IEs, and a grid list IE. In an embodiment, the PLMN list IE and grid list IE may be included in the PLMN-ID grid cell bid info list IE. In an embodiment, the grid list IE may include one or more cell ID list IEs that include one or more cell ID IEs.

In various embodiments, the DPC 146 may generate the AVAILABLE BIDS RESPONSE message to also include any or all of an absolute radio-frequency channel number (ARFCN) IE, a channel bandwidth IE, a megabit or megabyte IE for identifying total available bandwidth, a MBPS IE for identifying the peak data rate for the resource, a resource available time IE, a resource expiration time IE, a bid/buy IE, a bid/buy expiry time IE, a minimum bid amount IE, and a buy price IE. The DPC 146 may generate the AVAILABLE BIDS RESPONSE message to include such information for each PMLN, each resource, each grid, and/or each cell identified in the message.

In an embodiment, the DPC 146 may be configured to generate the AVAILABLE BIDS RESPONSE message to include the list of PLMN ID, lists of grid ID(s) within each PLMN, and the available resources/bids within each grid in response to determining that there are bids for resources available for auction.

In an embodiment, the DPC 146 may be configured to generate the AVAILABLE BIDS RESPONSE message to include the message type and sequence number IEs (or valid values for these IEs) in response to determining that there no resources/bids for resources available for auction by that DPC 146 for the relevant networks/PLMN IDs. In an embodiment, the DPC 146 may be configured to generate the AVAILABLE BIDS RESPONSE message to include a sequence number IE having the same value as in the sequence number IE included in the received AVAILABLE BIDS REQUEST message. In an embodiment, the DSC 144 may be configured to use the sequence number IEs in these request and response messages to correlate the messages.

In an embodiment, the DPC 146 may be configured to generate the AVAILABLE BIDS RESPONSE message to include a PLMN list IE that includes a PLMN ID and grid ID list IE. The grid ID list IE may include a list of cells available for auction within the grid. The cell ID list IE may include a cell ID, and for each cell, the ARFCN, channel bandwidth, total available bandwidth, peak data rate allowed, the time of day (e.g., in UTC) when the resources are available and when they expire/end, whether it's a bid or buy type auction, minimum bid amount or buy price, bid expiry time (e.g., in UTC), and other similar information.

In operation block 1010, the DSC 144 may use the information included in the AVAILABLE BIDS RESPONSE message to identify the resources that are available for bidding, determine whether the DSC 144 will submit a bid for the available resources, determine the resources for which the DSC 144 will submit bids, and/or perform other similar operations.

With reference to FIG. 10B, in operation 1012, the DPC 146 may reject the AVAILABLE BIDS REQUEST message received from lessee DSC 144 by generating and sending a AVAILABLE BIDS REJECT message to the DSC 144. The DPC 146 may be configured to reject the AVAILABLE BIDS REQUEST message in response to determining (e.g., as part of operation 1004 or 1006) that one or more of the PLMN IDs supplied in the request message is not from any of the known networks, that one or more of the Grid IDs supplied in the request message is not valid with respect to the supplied PLMN ID, and/or that there are no resources/bids available in the relevant grids.

In an embodiment, the DPC 146 may be configured to generate the AVAILABLE BIDS REJECT message to include a message type information element (IE), a message ID IE, a cause IE, a criticality diagnostics IE, and a sequence number IE. The cause IE may include a reason code (e.g., Invalid PLMN ID, Invalid Grid ID, etc.) for the rejection of the available bids request, which may be determined in operation block 1005. The sequence number IE may include the same sequence number value that was included in the AVAILABLE BIDS REQUEST message received from lessee DSC 144. As such, the DPC 146 and/or DSC 144 may be configured to use sequence number IEs in the request and response messages to correlate those messages.

In operation block 1014, the DSC 144 may use the information included in the received AVAILABLE BIDS REJECT message to perform various failure-response operations. For example, the DSC 144 may determine whether to send another AVAILABLE BIDS REQUEST message to the DPC 146, determine whether to send another AVAILABLE BIDS REQUEST message to a different DPC, etc.

Figure 11A:
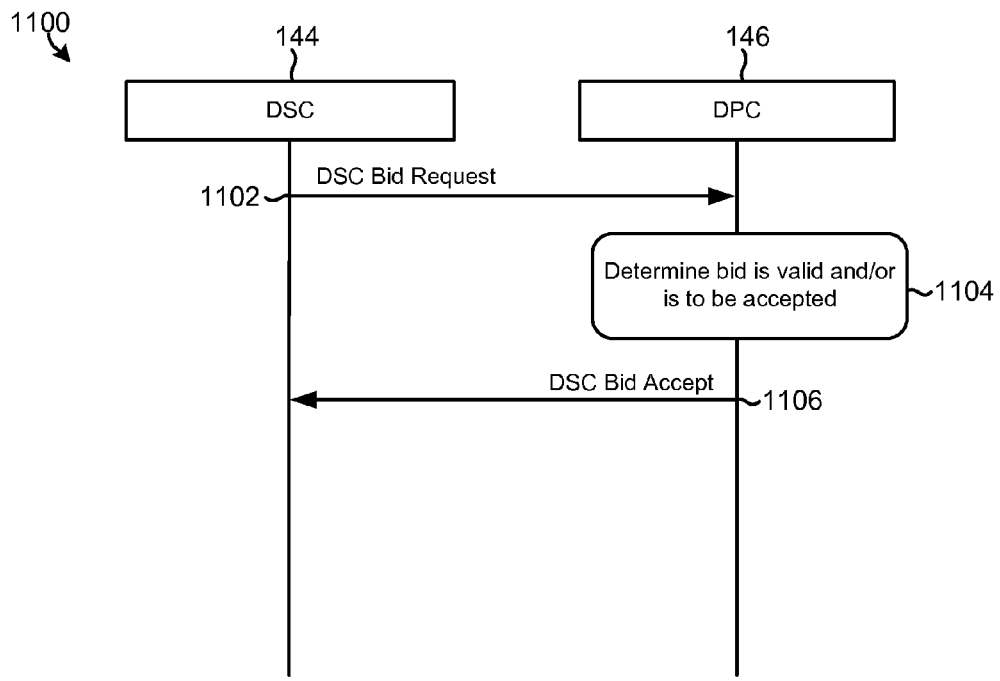
FIGS. 11A and 11B are message flow diagrams illustrating an embodiment DSAAP bidding method.
Figure 11B:
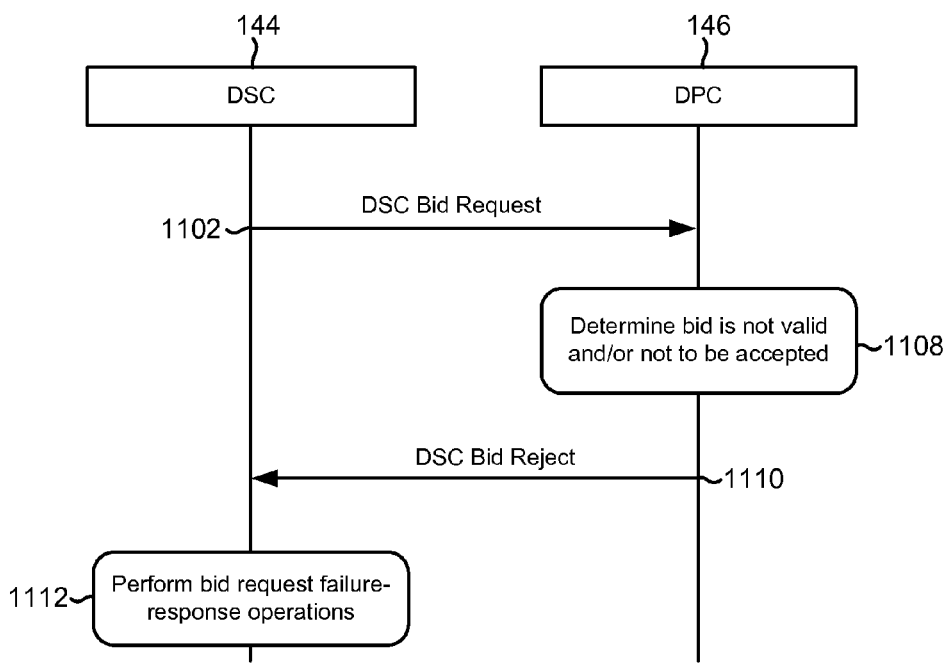

FIGS. 11A and 11B illustrate a DSAAP bidding method 1100 of bidding for DSC resources, which allows different lessee networks to bid for resources that are available from lessor networks. In the examples illustrated in FIGS. 11A and 11B, the DSAAP method 1100 is performed by processing cores in a DPC 146 component and a DSC 144 component, each of which may include all or portions of a DSAAP module/component.

In an embodiment, the DSC 144 and/or DPC 146 may be configured to perform DSAAP method 1100 after the DSC 144 retrieves the list of resources that are available for bidding (e.g., after performing DSAAP method 1000). In various embodiments, the DSC 144 and/or DPC 146 may be configured to perform DSAAP method 1100 continuously or repeatedly until the expiration of a bidding time. In an embodiment, the DPC 146 may be configured to select a winning bid (i.e., bid highest bid value) at the expiry of a bidding time.

In operation 1102 of method 1100 illustrated in FIGS. 11A and 11B, the lessee DSC 144 may generate and send a DSC BID REQUEST message to the DPC 146 to bid for one or more of the resource that are determined to be available from a lessor network, (i.e., one or more of resources included the list of resources obtained via the performance of method 1000). The lessee DSC 144 may be configured to generate the DSC BID REQUEST message to include any or all of a message type information element (IE), a message ID IE, a DSC identity IE, a DSC type IE, bid ID IE, a PLMN ID IE, and a bid amount IE. The bid ID IE may include information suitable for identifying a specific resource for which the lessee DSC 144 places a bid. The PLMN ID IE may include information suitable for use in identifying the PLMN ID of the network associated with the resources identified in the bid ID IE. The bid amount IE may include a monitory amount in a currency (e.g., USD), or the bid value.

In an embodiment, the lessee DSC 144 may be configured to generate the DSC BID REQUEST message to include a bid amount IE value that is greater than a minimum bid amount specified in a bid listing for the specific resource/bid ID. In an embodiment, the lessee DSC 144 may be configured to obtain the minimum bid amount and/or bid listing from the received AVAILABLE BIDS RESPONSE message (e.g., the message sent as part of operation 1008 illustrated in FIG. 10A).

In operation block 1104 illustrated in FIG. 11A, the DPC 146 may use the information included in the received DSC BID REQUEST message to determine whether the bid (resource bid) is valid and is to be accepted, such as by determining whether the bid complies with the policies and rules of the DSA system and the requirements of the lessor network. In operation 1106, the DPC 146 may generate and send DSC BID ACCEPT message to the DSC in response to determining that the bid is valid and/or is to be accepted. The DPC 146 may be configured to generate the DSC BID ACCEPT message to include any or all of a message type information element (IE), a message ID IE, a bid ID IE, and other information suitable for informing the DSC 144 that the bid has been determined to be valid and/or has been accepted.

It should be noted that, in the example discussed above, the DSC BID ACCEPT message informs the DSC 144 that the bid is valid/accepted, not that lessee DSC 144 has won the bid. The winning lessee DSC may be informed via DSC BID WON message when the DPC 146 determines that the bid time has expired and that lessee DSC is the highest bidder at the time of bid expiry. Similarly, the DPC 146 may inform lessee DSC(s) who participated in the bidding process but submitted losing bids that they did not submit a winning bid via a DSC BID LOST message. The DSC BID WON message and DSC BID LOST message are discussed in more detail further below.

With reference to FIG. 11B, in operation block 1108, the DPC 146 may use the information included in the received DSC BID REQUEST message to determine that the bid is not valid and is not to be accepted. For example, the DPC 146 may use the received information to determine that the bid does not comply with the policies/rules of the DSA system and/or does not comply with the requirements of the lessor network (e.g., does not meet the minimum asking price, etc.). As further examples, the DPC 146 may be configured to determine that the bid is not valid or is not to be accepted in response to determining that the bid amount specific in bid amount IE in the BID REQUEST message is not higher than the minimum bid, that the bid amount is not the highest among currently offered bids, that the bid id included in the bid ID IE is invalid, or that the bid/resource is no longer available for bidding (e.g., due to expiry, end of auction, bid withdrawn or invalid bid id).

In operation 1110, the DPC 146 may generate and send a DSC BID REJECT message to the DSC 144. The DPC 146 may be configured to generate the DSC BID REJECT message to include any or all of a message type information element (IE), a message ID IE, a bid ID IE, a cause IE, and a criticality diagnostics IE. The bid ID IE in the DSC BID REJECT message may include the same value as the bid identifier included in the received DSC BID REQUEST message. The cause IE may include a reason code identifying a reason for the rejection of the bid (e g, minimum bid not met, outbid, bid not found, etc.). In operation block 1112, the DSC 144 may use information included in the received DSC BID REJECT message to perform various bid request failure-response operations, such as operations to determine whether to rebid for the resources, to generate a new DSC BID REQUEST message that includes a valid bid ID, etc.

FIGS. 12A through 12D illustrate a DSAAP notification method 1200 of informing participating networks of the results of the bidding operations. That is, DSAAP notification method 1200 may be performed to inform DSCs 144 of a result of an auction (e.g., that they submitted a winning bid, that they have been outbid, that they submitted a losing bid, that the auction was cancelled, etc.). In the examples illustrated in FIGS. 12A-12D, the DSAAP notification method 1200 is performed by processing cores in a DPC 146 component and a DSC 144 component, each of which may include all or portions of a DSAAP module/component.

DSAAP notification method 1200 may be performed after the DPC 146 notifies the DSC 144 that the bid has been accepted (e.g., after operation 1106 illustrated in FIG. 11). The DSAAP notification method 1200 also may be performed after the expiry of a bidding time and/or in response to the DPC 146 detecting an event or condition (e.g., new bid received, outbid, etc.).

Figure 12A:
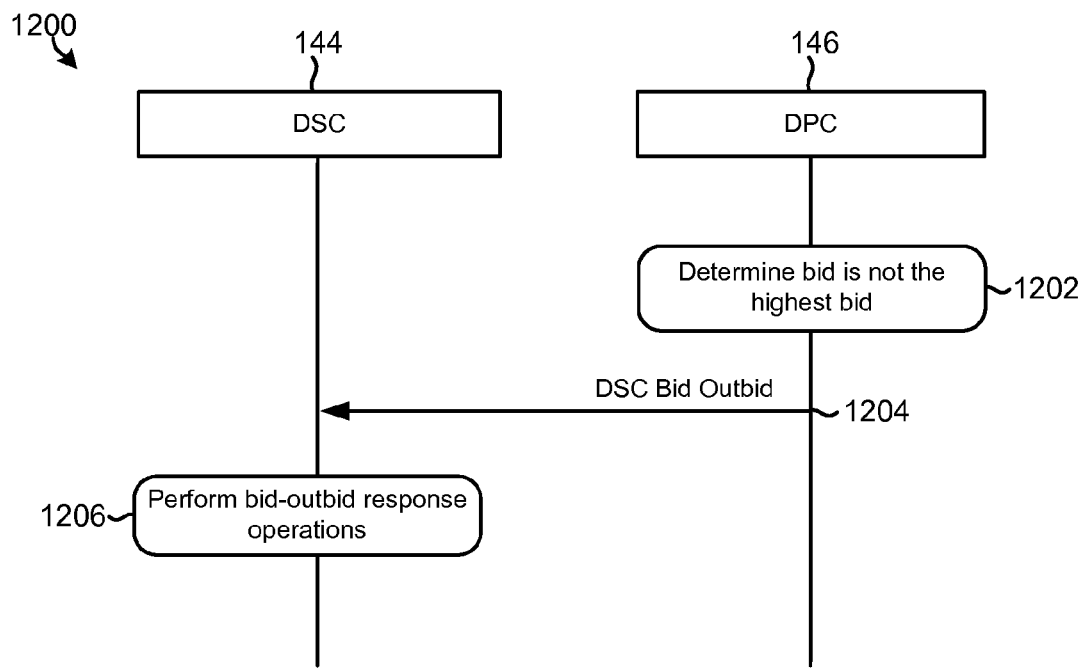
FIGS. 12A through 12D are message flow diagrams illustrating an embodiment DSAAP notification method for informing participating networks of the results of the bidding operations.

In operation block 1202 illustrated in FIG. 12A, the DPC 146 may determine that the bid amount specific in bid amount IE in the last, latest, or most current BID REQUEST message accepted from the DSC 144 is not the highest among the current bids. In operation 1204, the DPC 146 may generate and send a DSC BID OUTBID message to the DSC 144 to inform the lessee DSC 144 that its earlier bid was outbid by a higher bid from another lessee DSC and/or that their earlier bid is no longer valid. In various embodiments, the DPC 146 may generate the DSC BID OUTBID message to include any or all of a message type information element (IE), a message ID IE, a cause IE, a bid info IE, a criticality diagnostics IE, a DSC ID IE and a BID ID IE.

The DSC ID IE may include information that is suitable for use in identifying the specific lessee DSC 144. The BID ID IE may include a bid ID suitable for use in identifying the submitted bid that has been outbid. In operation block 1206, the lessee DSC 144 may perform various bid-outbid failure-response operations, such as by determining whether to submit a higher bid for the resources to that DPC 146, to submit a bid to a different DPC 146, to drop existing calls to free bandwidth, etc.

Figure 12B:
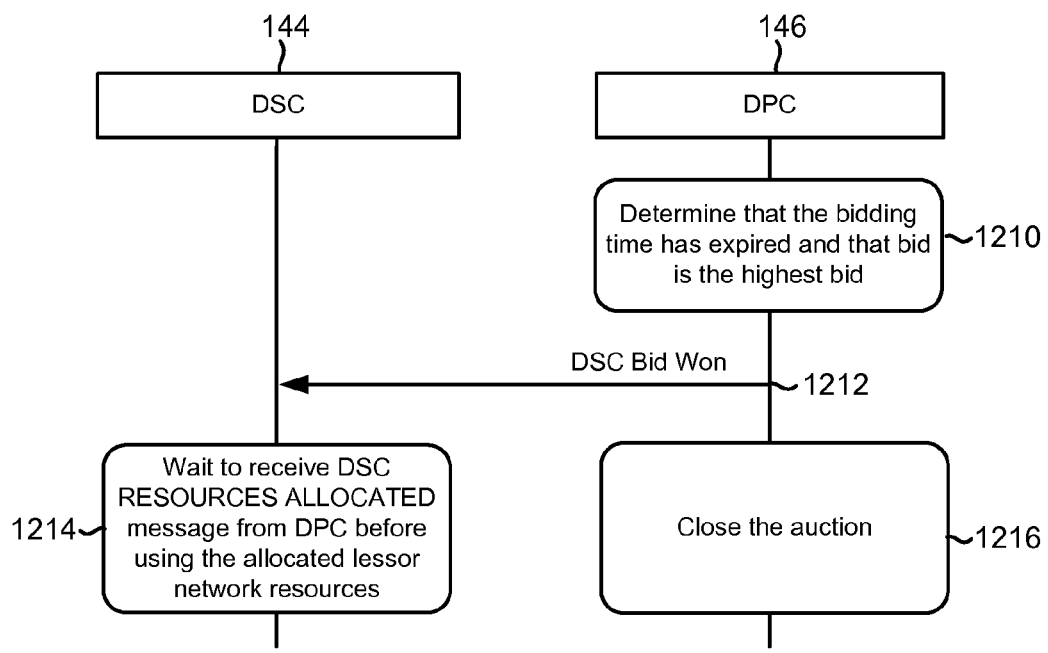

With reference to FIG. 12B, in operation block 1210, the DPC 146 may determine that the bidding time has expired and that the bid amount specific in bid amount IE in the last, latest, or most current BID REQUEST message accepted from the DSC 144 is the highest among the current bids. In operation 1212, the DPC 146 may generate and send a DSC BID WON message to the DSC 144 to inform the lessee DSC 144 that their earlier bid is the winning bid. In various embodiments, the DPC 146 may generate the DSC BID WON message to include any or all of a message type information element (IE), a message ID IE, a bid ID IE, a bid info IE, a DSC ID IE, and a original bid details such as bandwidth, MBPS, duration and the winning bid amount, etc. The DSC ID IE may include information that is suitable for use in identifying the specific lessee DSC 144. The bid ID IE may include a bid identifier suitable for identifying the bid that won the resource auction/bidding operations.

In operation block 1214, the winning lessee DSC 144 may wait to receive DSC RESOURCES ALLOCATED message from the DPC 146 before scheduling its network equipment and device (e.g., wireless devices) to start using the resources and/or for the resources to be made available for use (i.e. scheduling for the time of day when the resources will be ready for use by the winning lessee network). In operation block 1216, the DPC 146 may close the auction, such as by rejecting further bids from other networks for the resources won by the bid submitted by lessee DSC 144.

Figure 12C:
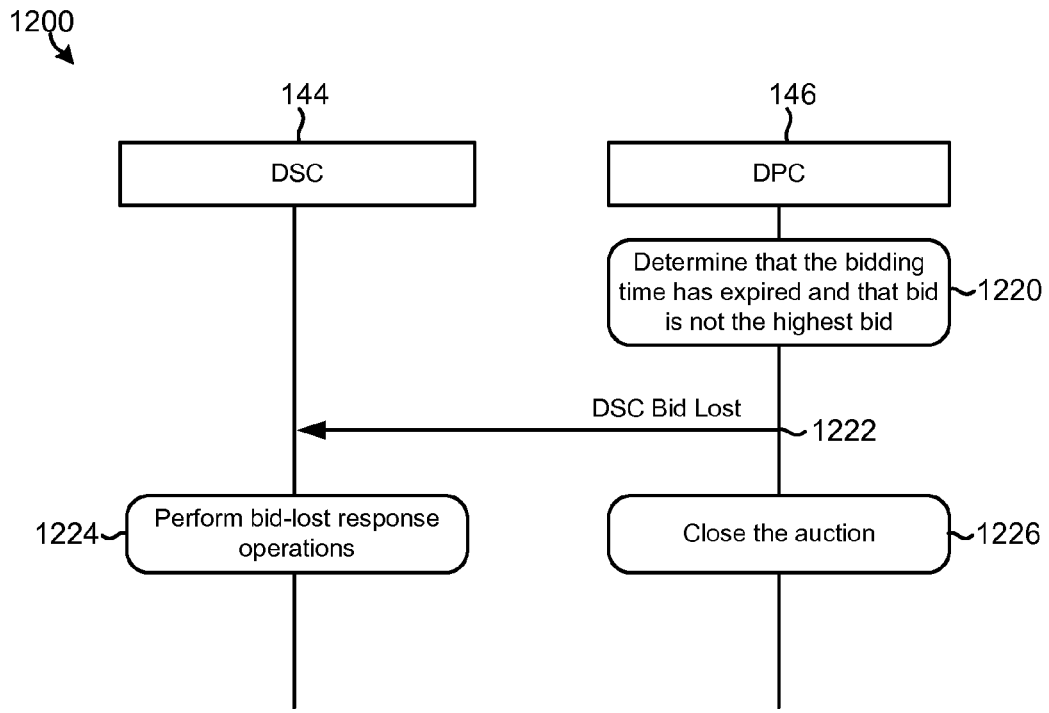

With reference to FIG. 12C, in operation block 1220, the DPC 146 may determine that the bidding time has expired and that the bid amount specific in bid amount IE in the last, latest, or most current BID REQUEST message accepted from the DSC 144 is not the highest among the current bids. In operation 1222, the DPC 146 may generate and send a DSC BID LOST message to the DSC 144 to inform the lessee DSC 144 that its earlier bid has not won the bid and the auction/bid is closed due to another lessee DSC winning the auction. In various embodiments, the DPC 146 may generate the DSC BID LOST message to include any or all of a message type information element (IE), a message ID IE, a bid ID IE, and a DSC ID IE. The DSC ID IE may include information that is suitable for use in identifying the specific lessee DSC 144 that submitted the losing bid and/or to which the DSC BID LOST message is sent. The bid ID IE may include a bid identifier suitable for use in identifying the submitted bid.

In operation block 1224, the lessee DSC 144 may perform various failure response operations, such as determining whether to submit a bid to for other available resources, whether to drop existing calls to free up resources, etc. In operation block 1226, the DPC 146 may close the auction and/or allow the losing lessee DSCs to bid for other available resources.

Figure 12D:
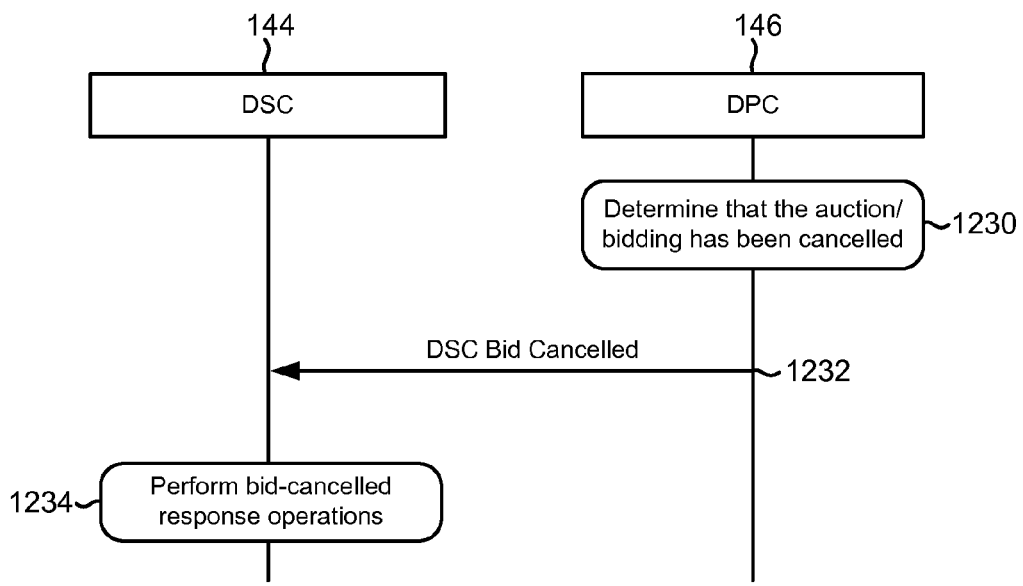

With reference to FIG. 12D, in operation block 1230, the DPC 146 may determine that the auction for a network resource that the DSC 144 previously submitted a bid has been cancelled. For example, the DPC 146 may determine that the auction has been withdrawn by lessor network operator or that the auction has been cancelled by DPC operator for administrative reasons. In operation 1232, the DPC 146 may generate and send a DSC BID CANCELLED message to the DSC 144 to inform the lessee DSC 144 that the auction has been cancelled. In various embodiments, the DPC 146 may generate the DSC BID CANCELLED message to include any or all of a message type information element (IE), a message ID IE, a bid ID IE, a DSC ID IE, and a cause IE. The DSC ID IE may include information that is suitable for use in identifying the specific lessee DSC 144. The bid ID IE may include a bid identifier suitable for use in identifying the resource/bid for which the auction has been cancelled. The cause IE may include a reason code for the bid's cancellation (e.g., auction withdrawn, auction cancelled, etc.). In operation block 1234, the lessee DSC 144 may perform various failure-response operations, such as by determining whether to submit a bid to a different DPC 146, to drop calls, etc.

Figure 13A:
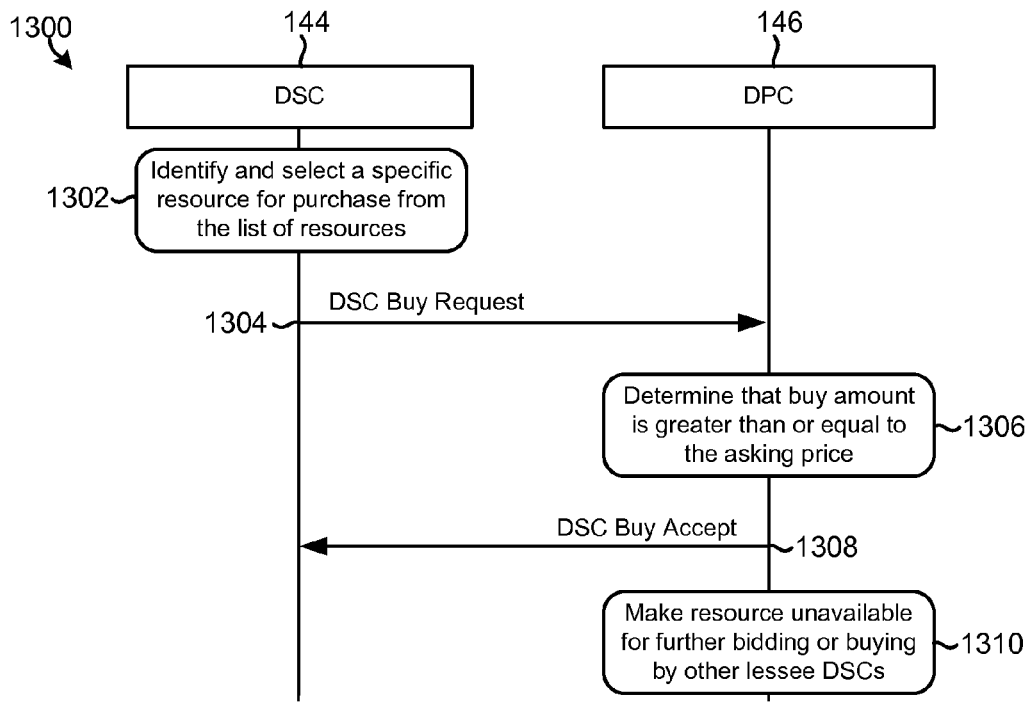
FIGS. 13A and 13B are message flow diagrams illustrating an embodiment DSAAP purchase method for immediately (or near immediately) purchasing a resource.
Figure 13B:
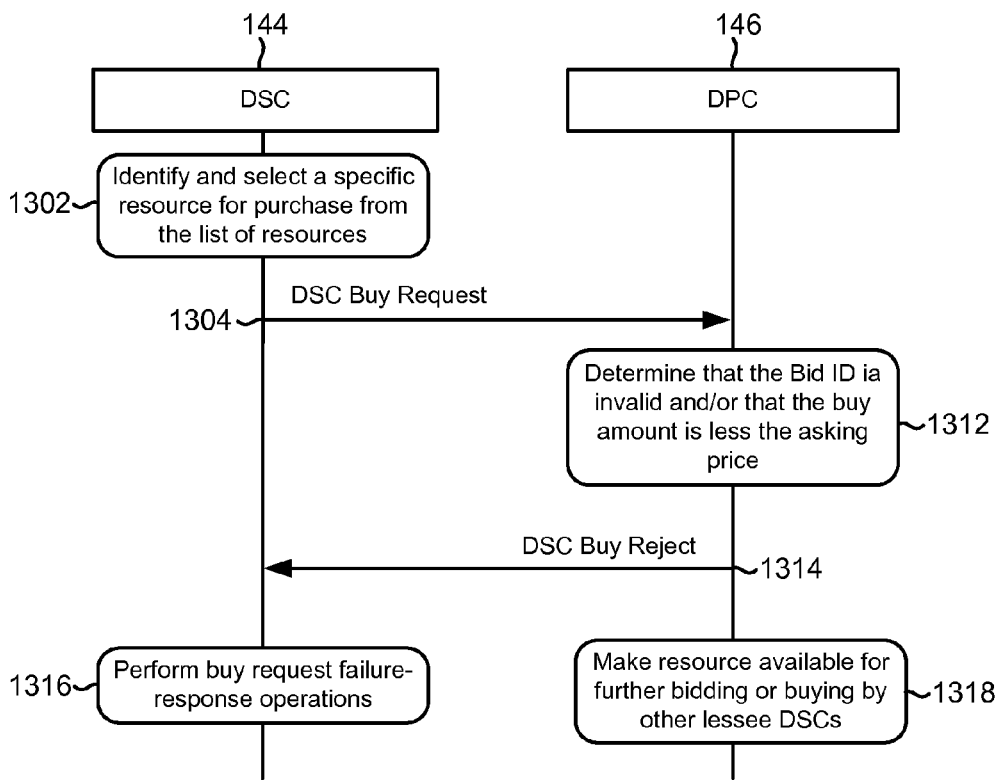

FIGS. 13A and 13B illustrate a DSAAP purchase method 1300 of allowing a lessee network to make an immediate (or near immediate) purchase and/or claim of use for a resource that is made available for allocation by a lessor network. In the examples illustrated in FIGS. 13A and 13B, the DSAAP purchasing method 1300 is performed by processing cores in a DPC 146 component and a DSC 144 component, each of which may include all or portions of a DSAAP module/component. In an embodiment, the DSC 144 and DPC 146 may be configured to perform DSAAP method 1300 after the DSC 144 retrieves/receives a list of resources that are available for purchase (e.g., after performing DSAAP method 1000 discussed above with reference to FIG. 10).

In operation block 1302 illustrated in FIGS. 13A and 13B, the lessee DSC 144 may identify and select a specific resource for immediate purchase from the list of resources (e.g., list of resources obtained from performing DSAAP method 1000 discussed above). In various the embodiments, the lessee DSC 144 may select a resource that is scheduled for bidding, that is currently being auctioned, that is only made available for immediate purchase, etc. In operation 1304, the DSC 144 may generate and send DSC BUY REQUEST message to the DPC 146 to request to buy the identified/selected resources from a lessor network.

In various embodiments, the DSC 144 may generate the DSC BUY REQUEST message to include any or all of a message type information element (IE), a message ID IE, a DSC identity IE, a DSC type IE, a bid ID IE, a buy amount IE, and a PLMN ID IE. The PLMN ID IE may include information suitable for use in identifying the PLMN ID of the network associated with the bid, which may identified via the bid ID IE. The buy amount IE may include the amount (e.g., in USD) of the bid (i.e., bid value) submitted by the lessee DSC 144.

In an embodiment, the DSC 144 may be configured to generate the DSC BUY REQUEST message to include a buy amount value that is equal to an amount identified via a buy amount IE in a listing for the bid ID included in a received AVAILABLE BIDS RESPONSE message (which is discussed above with reference to FIG. 10).

In operation block 1306 illustrated in FIG. 13A, the DPC 146 may use the information included in the received DSC BUY REQUEST message to identify the requested resource, the network associated with the request resource, whether the requested resource is currently being auctioned, whether the requested resource has been made available for immediate purchase, a minimum purchase amount requested for the immediate purchase of that resource, and/or whether the buy amount included in the received DSC BUY REQUEST message is equal to (or greater than) the requested purchase amount. In the example illustrated in FIG. 13A, as part of operation block 1306, the DPC 146 determines that the buy amount included in the received DSC BUY REQUEST message is greater than or equal to the requested purchase amount.

In operation 1308, the DPC 146 may generate and send a DSC BUY ACCEPT message to the DSC 144 to inform the lessee DSC 144 that it has successfully purchased/leased the resource for use. In various embodiments, the DPC 146 may generate the DSC BUY ACCEPT message to include any or all of a message type information element (IE), a message ID IE, and a bid ID IE. In operation block 1310, the DPC 146 may terminate, stop, or close an active auction for that resource and/or perform similar operations so that the resource is no longer available for bidding or buying by other lessee DSCs.

With reference to FIG. 13B, in operation block 1312, the DPC 146 may use the information included in the received DSC BUY REQUEST message (e.g., as part of operation 1304) to determine that the bid (buy request) is to be rejected. For example, the DPC 146 may determine that the buy amount specific in buy amount IE in the received DSC BUY REQUEST message is less than the requested purchase amount. As another example, the DPC 146 may determine that the bid ID value included in the bid ID IE is invalid, or that the resource/bid is no longer available for bidding (due to expiry, end of auction, bid withdrawn, invalid bid ID, etc.).

In operation 1314, the DPC 146 may generate and send a DSC BUY REJECT message to the DSC 144. In various embodiments, the DPC 146 may generate the DSC BUY REJECT message to include any or all of a message type information element (IE), a message ID IE, a bid ID IE and a cause IE. The value of the bid ID IE may be the same as the bid identifier included in the DSC BUY REQUEST message received as part of operation 1304. The cause IE may include a reason code for the rejection of the buy request (e.g., requested purchase price not met, bid not found, etc.). In operation block 1316, the DSC 1316 may perform various failure-response operations, such as determining whether to submit a new purchase request with a higher bid amount. In operation block 1318, the DPC 146 perform various operations so to make that resource available for bidding or buying by other lessee DSCs.

Figure 14A:
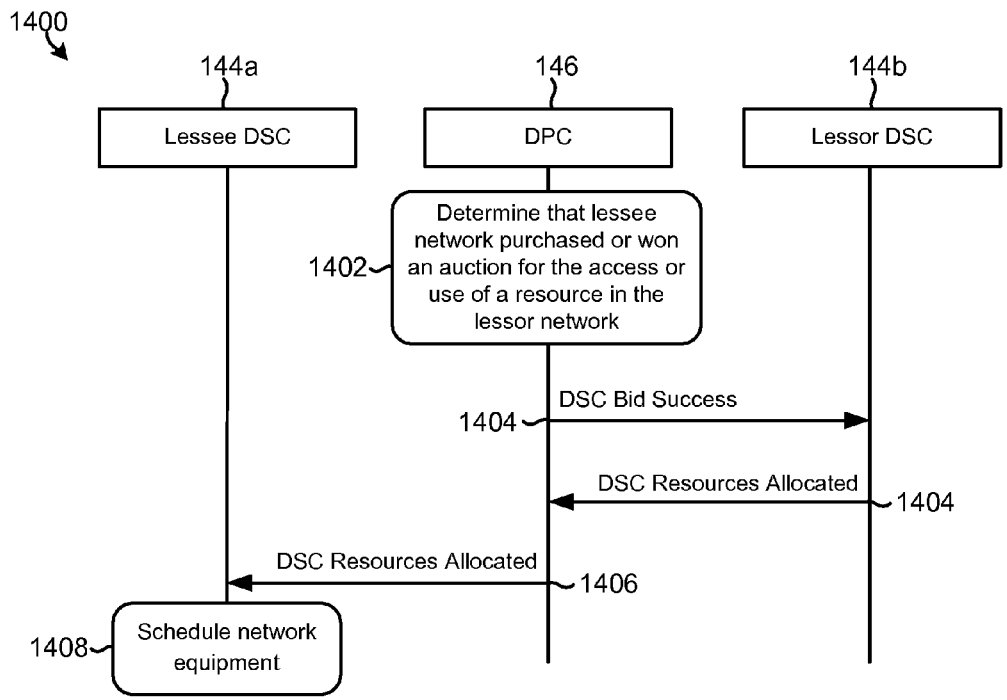
FIGS. 14A and 14B are message flow diagrams illustrating an embodiment DSAAP allocation method for allocating resources in a lessor network for access and use by components in a lessee network.
Figure 14B:
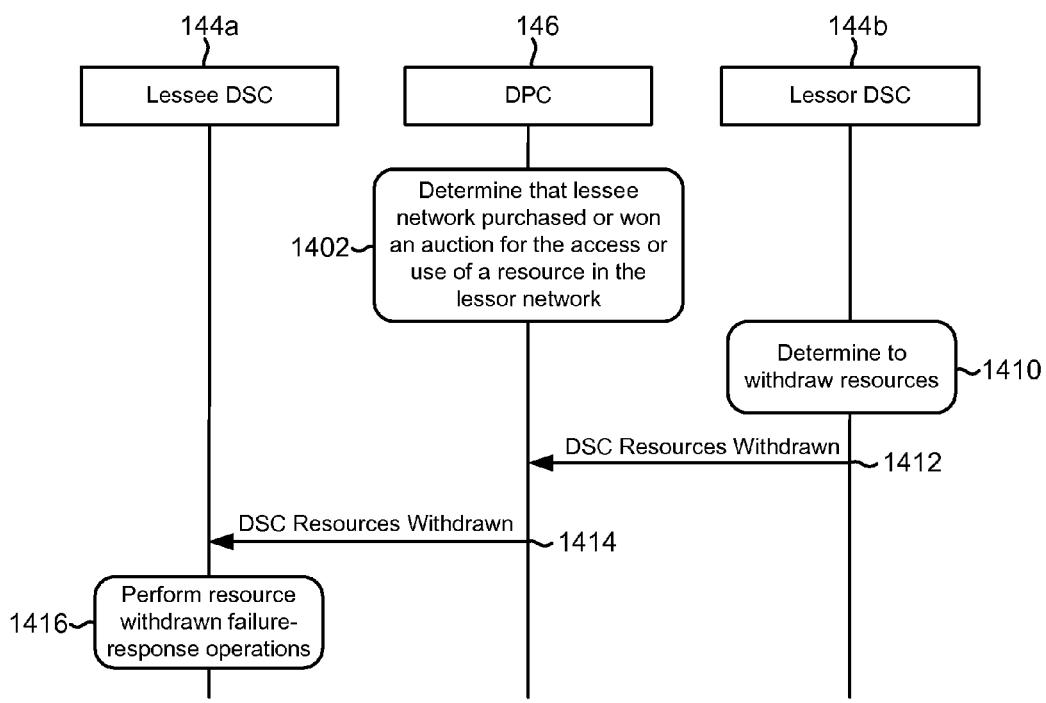

FIGS. 14A and 14B illustrate a DSAAP resource allocation method 1400 of allocating resources in a lessor network for access and use by components in a lessee network. In the examples illustrated in FIGS. 14A and 14B, the DSAAP resource allocation method 1400 is performed by processing cores in a DPC 146 component, a lessee DSC 144a component, and a lessor DSC 144b component, each of which may include all or portions of a DSAAP module/component.

In operation block 1402 illustrated in FIGS. 14A and 14B, the DPC 146 may determine that the lessee DSC 144a has successfully purchased or won an auction for a resource in a lessor network represented by the lessor DSC 144b. In operation 1404 illustrated in FIG. 14A, the DPC 146 may generate and send a DSC BID SUCCESS message to the lessor DSC 144b to inform the lessor network that one or more of its allocated resources/bids has been won by the lessee DSC 144a.

In various embodiments, the DPC 146 may generate the DSC BID SUCCESS message to include any or all of a message type information element (IE), a message ID IE, a cause IE, and a criticality diagnostics IE. In a further embodiment, the DPC 146 may be configured to generate the DSC BID SUCCESS message to also include any or all of a bid ID IE, a DSC ID IE, and a bid value IE. These additional information elements may be used to communicate information regarding the winning bid. For example, the bid ID IE may include a bid ID that corresponds to the bid that successfully participated in and won the auction for the resources. The DSC ID IE may include the DSC ID of the auction winner (i.e., the lessee DSC 144a). The bid value IE may include the winning bid amount and/or the purchase price of the resources.

In operation 1404, the lessor DSC 144b may generate and send DSC RESOURCES ALLOCATED message to the DPC 146 to allocate/commit the resources for access and use by components in the lessee network. The lessor DSC 144b may be configured to generate DSC RESOURCES ALLOCATED message to include any or all of a message type information element (IE), a message ID IE, a bid iD, a PLMN-ID Grid ID Cell ID list IE, a PLMN ID IE, a grid ID IE, list of cell IDs IE, and various auction/resource details (e.g., bandwidth, MBPS, duration, etc.). In an embodiment, the PLMN ID IE, a grid ID IE, and list of cell IDs IE may be included in the PLMN-ID Grid ID Cell ID list IE. The PLMN ID IE may include the PLMN ID of the lessor network allocating the resources, which may be the same PLMN ID/network identified in the winning bid. The grid ID IE and list of cell IDs IE may include information suitable for identifying the grid/cells associated with the resources. These values may be the same as the grid/cell values included in the winning bid.

In operation 1406, the DPC 146 may forward the received DSC RESOURCES ALLOCATED message to the winning lessee DSC 144a to enable the lessee DSC 144a to start using the allocated resources of lessor network resources. In operation block 1408, the lessee DSC 144a may schedule its network equipment to start using lessor network resources from the time of day specified as part of the bid and/or included in the received DSC RESOURCES ALLOCATED message.

With reference to FIG. 14B, in operation block 1410, the lessor DSC 144b may determine that the resources submitted for auction should be withdrawn and/or to forego allocating the submitted resources to a winner of the auction. The lessor DSC 144b may determine to withdraw the resources after the DPC 146 determines that lessee network purchased or won an auction for those resources and/or for any of a variety of reasons (e.g., unforeseen or administrative reasons, etc.).

In operation 1412, the lessor DSC 144*b* may generate and send a DSC RESOURCES WITHDRAWN message to the DPC 146 to withdraw the resources. The lessor DSC 144*b* may generate the DSC RESOURCES WITHDRAWN message to include any or all of a message type information element (IE), a message ID IE, a bid ID IE, a cause IE, and a PLMN-ID Grid ID Cell ID list IE. The bid ID IE may include information that is suitable for use in identifying the bid. The cause IE may include a reason code that describes the reason for withdrawal of resource allocations (e.g., resources not available, resources withdrawn, administrative, etc.).

In operation 1414, the DPC 146 may forward the received DSC RESOURCES WITHDRAWN message to the lessee DSC 144*a*, which may have submitted a winning bid for the withdrawn resources. In operation block 1416, the lessee DSC 144*a* may perform various failure-response operations, such as determining whether to participate in another auction, whether to bid on a different resource, determining whether to drop calls to free up resources, etc.

Figure 15A:
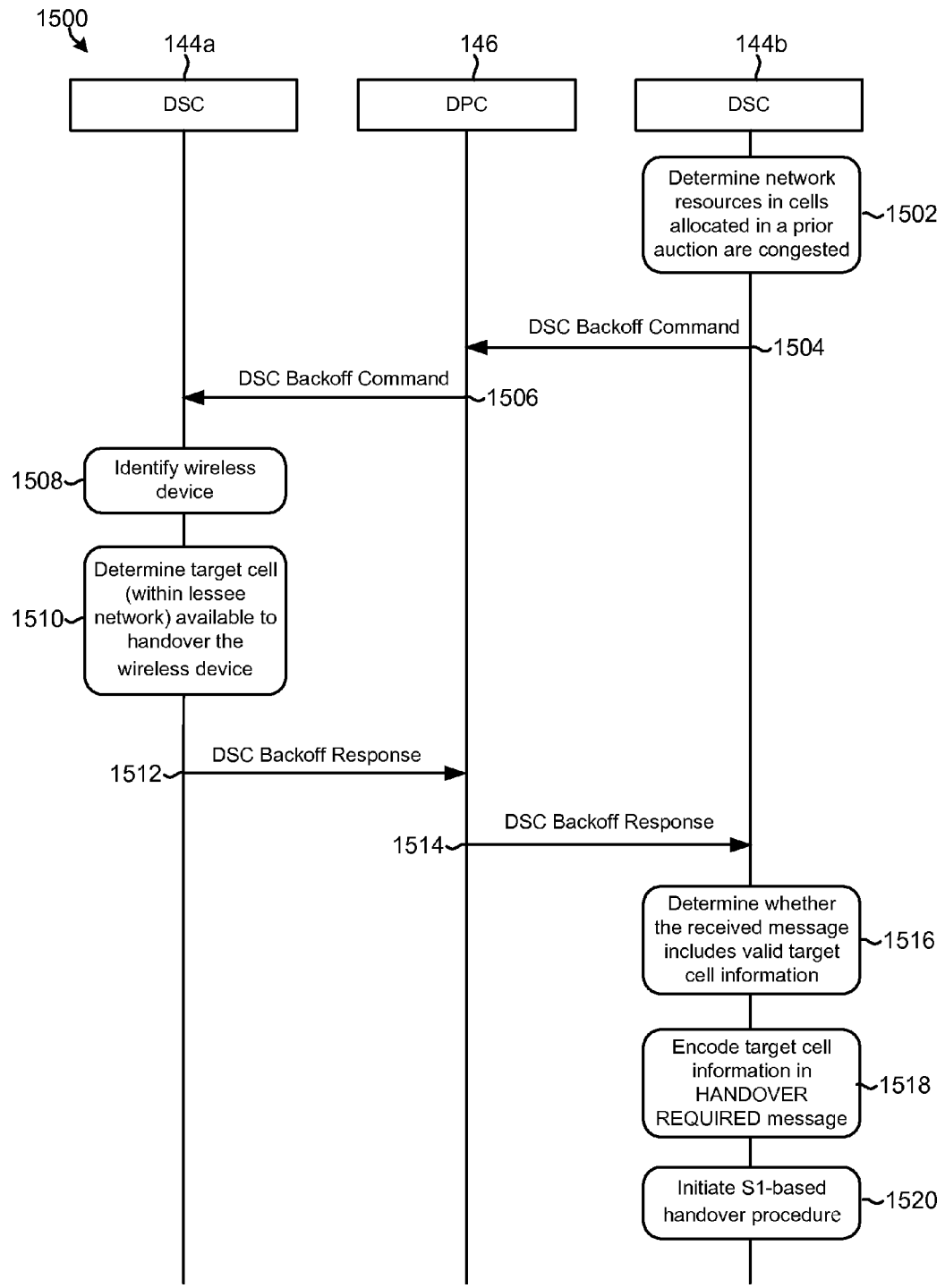
FIGS. 15A and 15B are message flow diagrams illustrating an embodiment DSAAP backoff method of selectively handing over a wireless device from a lessor network back to the lessee's network (i.e. its home PLMN).
Figure 15B:
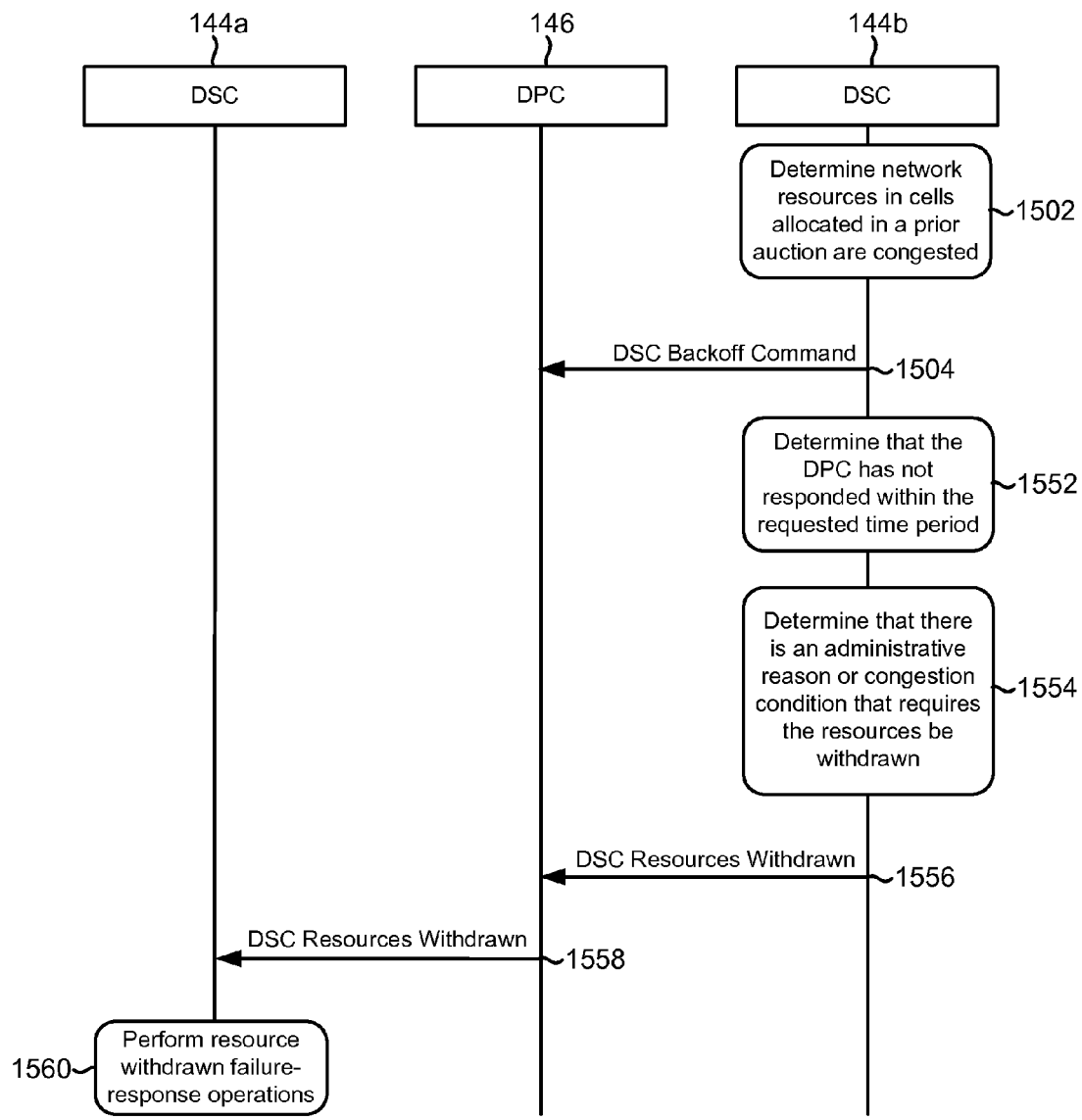

FIGS. 15A and 15B illustrate an embodiment DSAAP backoff method 1500 of selectively handing over a wireless device from a lessor network back to the lessee's network to which the wireless device subscribes (i.e. its home PLMN). In the examples illustrated in FIGS. 15A and 15B, the DSAAP backoff method 1500 is performed by processing cores in a DPC 146 component, a lessee DSC 144*a* component, and a lessor DSC 144*b* component, each of which may include all or portions of a DSAAP module/component.

In operation block 1502 illustrated in FIGS. 15A and 15B, the lessor DSC 144*b* may determine that its network resources from the cells that are part of a prior auction are in congestion. That is, the lessor DSC 144*b* may determine that it requires access or use of its allocated resources. In operation 1504, the lessor DSC 144*b* may generate and send a DSC BACKOFF COMMAND message to the DPC 146 to selectively handover wireless device(s) that are using the allocated resources of the lessor network back to the lessee network (i.e. its home PLMN).

The lessor DSC 144*b* may be configured to generate the DSC BACKOFF COMMAND message to include any or all of a message type information element (IE), a message ID IE, a bid ID IE, a UE identity IE, a measurement report IE, handoff cell information IE, a cause IE, and a DSC backoff response timer IE.

The UE identity IE may include information suitable for use in determining identity related information for the wireless device (or UE), such as the international mobile subscriber identity (IMSI) of the wireless device or its network.

The measurement report IE may include the latest, last, or most recent measurement report E-UTRAN RRC message received by the lessor network for the identified wireless device (i.e., the wireless devices that are requested to backoff to lessee network).

The bid ID IE may include a bid ID value corresponding to the bid that successfully participated in and completed/won the auction. The bid ID may be used to identify the auction/contract associated with the backoff operations (i.e., the auction/contract for which the resources were allocated).

In an embodiment, the lessor DSC 144*b* may be configured to determine whether there are multiple bid IDs that correspond to a congested cell. In an embodiment, the lessor DSC 144*b* may be configured to select the bid ID value from a plurality of bid IDs in response to determining that there are multiple bid IDs that correspond to a congested cell. In various embodiments, the lessor DSC 144*b* may be configured to select the bid ID value based on an operator policy provisioned at the lessor DSC 144*b*, based on a previous agreement, based on a policy/rule previously negotiated by lessor and lessee network operators, etc.

In operation 1506, the DPC 146 may forward the received DSC BACKOFF COMMAND message to the lessee DSC 144*a*. In operation block 1508, the lessee DSC 144*a* may use the information in the UE identity IE of the received DSC BACKOFF COMMAND message identify wireless device(s) that are to be subjected to the backoff operations (i.e., the wireless devices that are to be handed back).

In operation block 1510, the lessee DSC 144*a* may use the information included in the measurement report IE of the received DSC BACKOFF COMMAND message to determine, identify, and/or select a target cell (within lessee network) to which the identified wireless device(s) are to be handed over (the lessor network may have previously enabled measurement reporting from the wireless devices, such as when they attached, or were handed over, to the lessor network.)

In operation 1512, the lessee DSC 144*a* may generate and send a DSC BACKOFF RESPONSE message to the DPC 146. The lessee DSC 144*a* may be configured to generate the DSC BACKOFF RESPONSE message to include any or all of a message type information element (IE), a message ID IE, a bid ID IE, a UE identity IE, a handoff cell information IE, and a cause IE. In an embodiment, the lessee DSC 144*a* may be configured to generate the DSC BACKOFF RESPONSE message to include the cause IE (or a value for the cause IE) in response to determining that a suitable target cell (within lessee network) could not be identified or selected for the handed over. The value of the cause IE may identify a cause of the failure, such as network overload, no appropriate target cell found, or unknown wireless device/UE. In an embodiment, the lessee DSC 144*a* may be configured to generate the DSC BACKOFF RESPONSE message to include a value (e.g., target cell information) for the handoff cell information IE in response to successfully identifying a target cell (within lessee network) to which the wireless device may be handed over.

In operation 1514, the DPC 146 may identify the lessor DSC 144*a* based on the bid id IE included in the received DSC BACKOFF RESPONSE message, and forward the received DSC BACKOFF RESPONSE message to the lessor DSC 144*b*. In operation block 1516, the lessor DSC 144*b* may determine whether the received DSC BACKOFF RESPONSE message includes a handoff cell information IE (or a valid value for the handoff cell information IE). In response to determining that the received DSC BACKOFF RESPONSE message includes a handoff cell information IE (or a valid value for the handoff cell information IE), in operation block 1518, the lessor DSC 144*b* may use the target cell information included in the handoff cell information IE to encode a HANDOVER REQUIRED message. In operation block 1520, the lessor DSC 144*b* may and initiate 51 based handover procedure to handover the wireless device from lessor network to lessee network.

With reference to FIG. 15B, in operation block 1552, the lessor DSC 144*b* may determine that the DPC 146 has not responded to the DSC BACKOFF COMMAND message (sent as part of operation 1504) within a time period identified in the DSC backoff response timer IE included in the DSC BACKOFF COMMAND message. Alternatively or additionally, in operation block 1554, the lessor DSC 144*b* may determine that there is significant or severe network congestion or administrative reasons that require withdraw of the allocation of all remaining network resources pertaining to the resources/bid id included or identified in the DSC BACKOFF COMMAND message.

In operation 1556, the lessor DSC 144b may generate and send a DSC RESOURCES WITHDRAWN message to the DPC 146. In operation 1558, the DPC 146 may forward the received DSC RESOURCES WITHDRAWN message to the lessee DSC 144a to withdraw the allocation of the remaining network resources. In operation block 1560, the lessee DSC 144a may perform various resource withdrawn failure-response operations, such as dropping calls, determining whether to bid for new resources, etc.

Figure 16A:
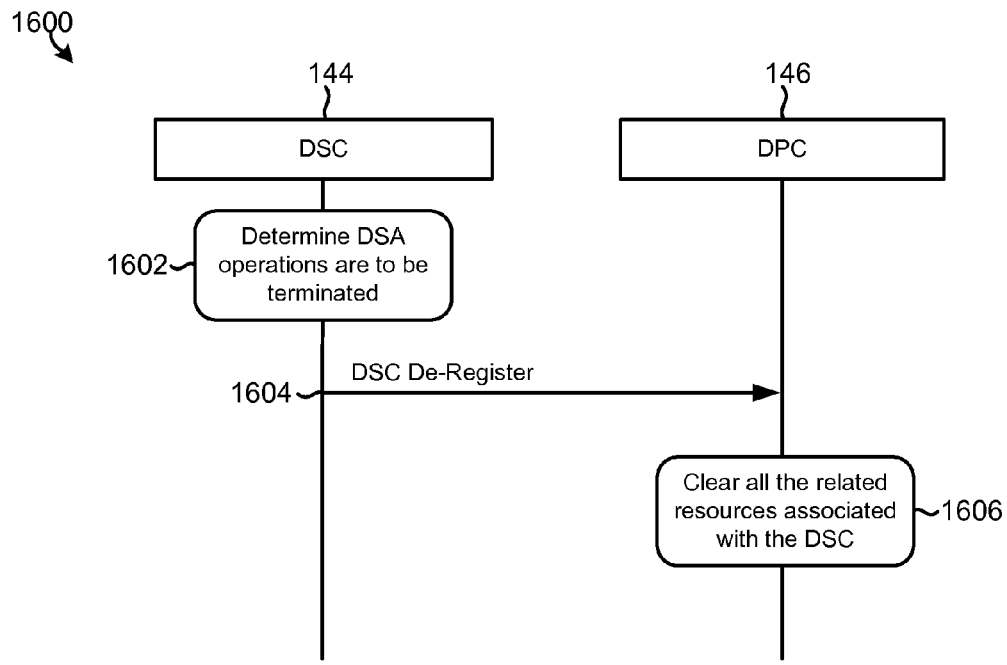
FIG. 16A is a message flow diagram illustrating an embodiment DSC initiated DSAAP de-registration method for terminating DSA operations.

FIG. 16A illustrates an embodiment DSC initiated DSAAP de-registration method 1600 for terminating operations. In the example illustrated in FIG. 16A, the DSC initiated DSAAP de-registration method 1600 is performed by processing cores in a DPC 146 component and a DSC 144 component, each of which may include all or portions of a DSAAP module/component.

In operation block 1602, the DSC 144 may determine that it needs to terminate DSA operations. In operation 1604, the DSC 144 may generate and send a DSC DE-REGISTER message to the DPC 146. The DSC 144 may be configured to generate the DSC DE-REGISTER message to include any or all of a message type information element (IE), a message ID IE, a backoff timer IE, and a cause IE that identifies a cause for the termination of operations. In operation block 1606, the DPC 146 may clear all the related resources associated with the DSC 144 and/or perform other similar operations to de-register the DSC 144 in response to receiving the DSC DE-REGISTER message.

Figure 16B:
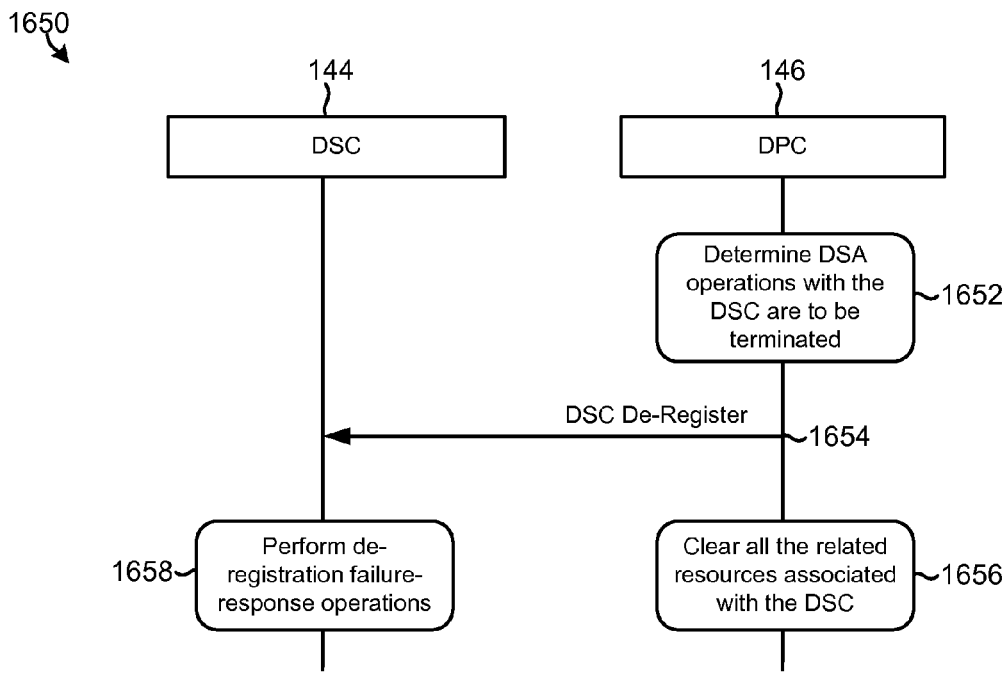
FIG. 16B is a message flow diagram illustrating an embodiment DPC initiated DSAAP de-registration method for terminating DSA operations.

FIG. 16B illustrates an embodiment DPC initiated DSAAP de-registration method 1650 for terminating operations. In the example illustrated in FIG. 16B, the DPC initiated DSAAP de-registration method 1650 is performed by processing cores in a DPC 146 component and a DSC 144 component, each of which may include all or portions of a DSAAP module/component.

In operation block 1652, the DPC 146 may determine that it needs to terminate DSA operations with the DSC 144. In operation 1654, the DPC 146 may generate and send a DSC DE-REGISTER message to the DSC 144. The DPC 146 may be configured to generate the DSC DE-REGISTER message to include any or all of a message type information element (IE), a message ID IE, a backoff timer IE, and a cause IE that identifies a cause for the termination of operations (e.g., overload, unspecified, etc.). In operation block 1656, the DPC 146 may clear all the related resources associated with the DSC 144 and/or perform other similar operations to de-register the DSC 144.

In operation block 1658, the DSC 144 may perform various de-registration failure response operations based on the information included in the received DSC DE-REGISTER message. For example, the DSC 144 may be configured to not retry registration to the same DPC 146 for at least the duration indicated in the backoff timer IE included in the received DSC DE-REGISTER message when the value of the cause IE in the DSC DE-REGISTER message is set to "overload."

Figure 17A:
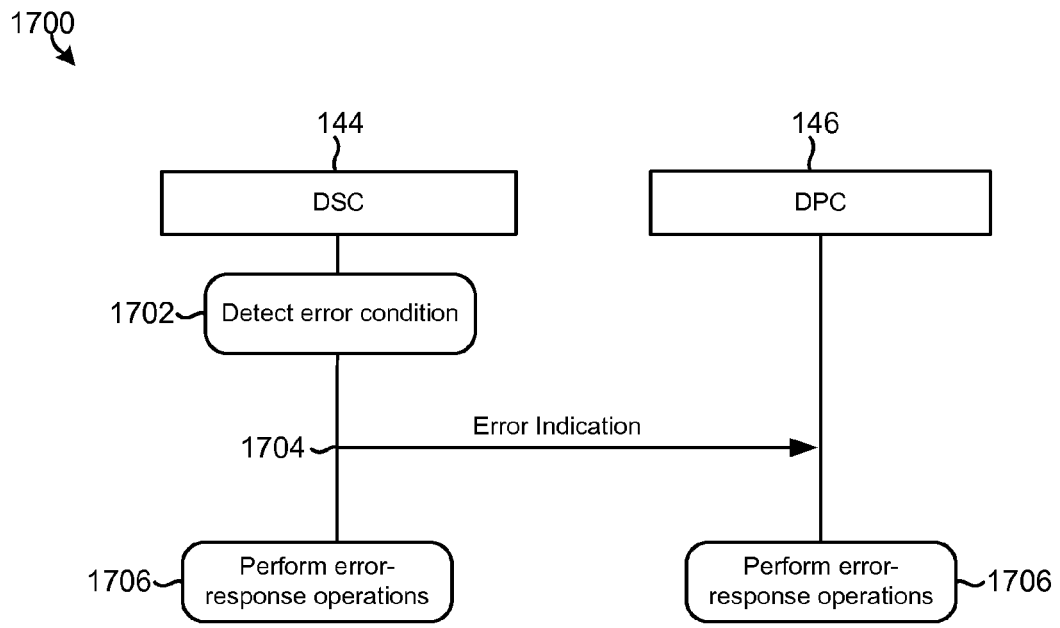
FIG. 17A is a message flow diagram illustrating a DSC initiated DSAAP error indication method for reporting errors.

FIG. 17A illustrates a DSC initiated DSAAP error indication method 1700 for reporting errors in accordance with an embodiment. In the example illustrated in FIG. 17A, method 1700 is performed by processing cores in a DPC 146 component and a DSC 144 component, each of which may include all or portions of a DSAAP module/component.

In operation block 1702, the DSC 144 may detect an error or error condition (e.g., a protocol error, etc.). In operation 1704, the DSC 144 may generate and send an ERROR INDICATION message to the DPC 146. The DSC 144 may be configured to generate the ERROR INDICATION message to include any or all of a message type information element (IE), a message ID IE, cause IE, and a criticality diagnostics IE. The cause IE may include information suitable for use in identifying a cause or type of the error (e.g., transfer syntax error, abstract syntax error, logical error, etc.). The criticality diagnostics IE may include a procedure code IE, a triggering message IE, and a procedure criticality IE. In operation block 1706, the DSC 144 and/or DPC 146 may perform various error-response operations based on the detected error or information included in the received ERROR INDICATION message. The error detection and response operations are discussed in detail further below.

Figure 17B:
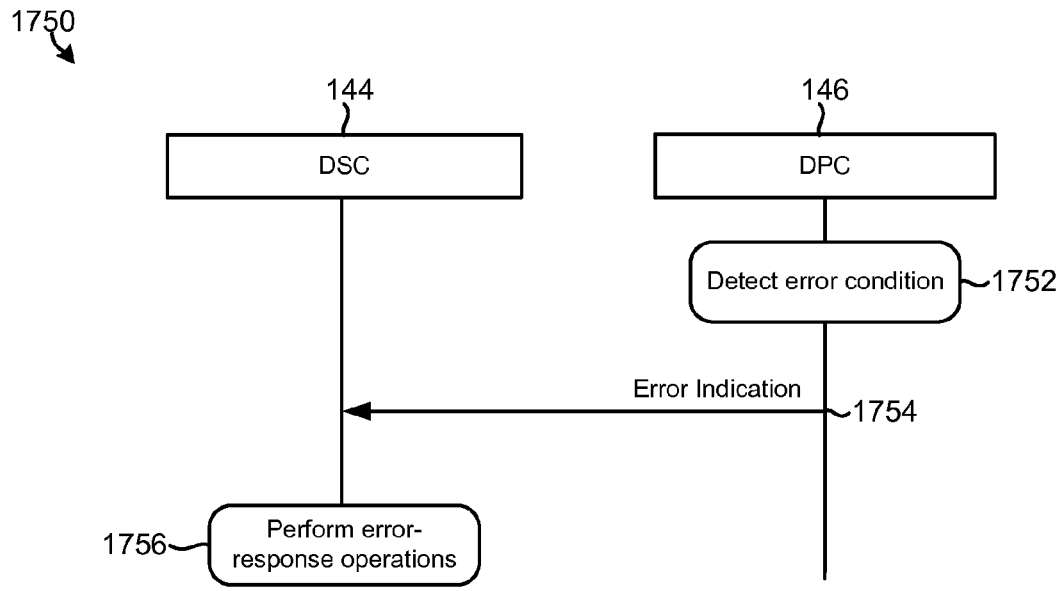
FIG. 17B is a message flow diagram illustrating a DPC initiated DSAAP error indication method for reporting errors.

FIG. 17B illustrates an embodiment DPC initiated DSAAP error indication method 1750 for reporting errors in accordance with another embodiment. In the example illustrated in FIG. 17B, method 1750 is performed by processing cores in a DPC 146 component and a DSC 144 component, each of which may include all or portions of a DSAAP module/component.

In operation block 1752, the DPC 146 may detect an error condition. In operation 1754, the DPC 146 may generate and send an ERROR INDICATION message to the DSC 144. The DPC 146 may be configured to generate the ERROR INDICATION message to include a cause information element (IE) that identifies a cause for the error. In operation block 1756, the DSC 144 and/or DPC 146 may perform various error-response operations based on the information included in the received ERROR INDICATION message.

As mentioned above, the DSC 144 and DPC 146 may be configured perform various error-response or failure response operations in response to detecting an error or failure condition. As part of these operations, the DSC 144 and/or DPC 146 may identify the type or cause of the error/failure condition, and tailor their responses based on the identified type or cause. For example, the DSC 144 and/or DPC 146 may be configured to determine whether a detected error is a protocol error, and tailor their responses accordingly.

Protocol errors include transfer syntax errors, abstract syntax errors, and logical errors. A transfer syntax error may occur when the receiving functional DSAAP entity (e.g., DSC, DPC, etc.) is not able to decode the received physical message. For example, transfer syntax errors may be detected while decoding ASN.1 information in a received message. In an embodiment, the DSC 144 and DPC 146 components may be configured to retransmit or re-request a DSAAP message in response to determining that a detected error is a transfer syntax error (e.g., as part of the error-response operations).

An abstract syntax error may occur when the receiving functional DSAAP entity (e.g., DSC, DPC, etc.) receives information elements (IEs) or IE groups that cannot be comprehended or understood (i.e., an unknown IE id). An abstract syntax error may also occur when the entity receives an information element (IE) for which a logical range (e.g., allowed number of copies) is violated. The DSC 144 and DPC 146 components may be configured to detect or identify these types of abstract syntax errors (i.e., cannot comprehend abstract syntax error), and in response, perform error-response operations based on criticality information included in the corresponding DSAAP message. Additional details regarding these operations and the criticality information are provided further below.

An abstract syntax error may also occur when the receiving functional DSAAP entity does not receive IEs or IE groups, but according to the specified presence of the object, the IEs or IE groups should have been present in the received message. The DSC 144 and DPC 146 components may be configured to detect or identify these particular types of abstract syntax errors (i.e., missing IE or IE group), and in response, perform error-response operations based on criticality information and presence information for the missing IE/IE group. Additional details regarding these operations, criticality information, and presence information are provided further below.

An abstract syntax error may also occur when the receiving entity receives IEs or IE groups that are defined to be part of that message in wrong order or with too many occurrences of the same IE or IE group. In addition, an abstract syntax error may also occur when the receiving entity receives IEs or IE groups, but according to the conditional presence of the concerning object and the specified condition, the IEs or IE groups should not have been present in the received message. The DSC 144 and DPC 146 components may be configured to detect or identify such abstract syntax errors (i.e., wrong order, too many occurrences, erroneously present, etc.), and in response, reject or terminate a procedure or method associated with the error (e.g., the method that caused the error). The DSC 144 and DPC 146 components may reject or terminate the procedure/method as part of the error-response operations.

In the various embodiments, the DSC 144 and DPC 146 components may be configured to continue to decode, read, or process a DSAAP message after detecting, identifying, or determining that an abstract syntax error occurred for that message. For example, the DSC 144 and DPC 146 components may skip a portion of the message that includes an error, and continue processing the other portions of the message. As part of this continued processing, the DSC 144 and DPC 146 components may detect or identify additional abstract syntax errors.

In an embodiment, the DSC 144 and DPC 146 components may be configured to perform error-response operations for each detected abstract syntax error and/or based on the criticality information and presence information for the IE/IE group associated with the abstract syntax error.

As mentioned above, each DSAAP message may include, or may be associated with, criticality information, presence information, range information, and assigned criticality information. In the various embodiments, a receiving functional DSAAP entity (e.g., DSC, DPC, etc.) may be configured to use any or all of such information (e.g., criticality information, presence information, etc.) when detecting an error, identifying the type of the error, or the specific error-response that are to be performed. That is, the entity may perform different operations depending on the values of the criticality information, presence information, range information, and/or assigned criticality information.

In an embodiment, the receiving functional DSAAP entity (e.g., DSC, DPC, etc.) may be configured to use the presence information included in a DSAAP message when identifying the type of error and the specific error-response operations that are to be performed for the identified error type. For example, the entity may use the presence information to determine whether the presence of an information element (IE) is optional, conditional, or mandatory (e.g., with respect to RNS application) for that message or communication. The entity may determine that an abstract syntax error has occurred when a received message is missing one or more information elements that are determined to be mandatory (or conditional when the condition is true).

In an embodiment, the receiving functional DSAAP entity (e.g., DSC, DPC, etc.) may be configured use the criticality information when identifying the specific error-response operations that are to be performed. That is, each DSAAP message may include criticality information for each individual information element (IE) or IE group included in that message. The values of criticality information for each IE or IE group may include "Reject IE," "Ignore IE and Notify Sender," and "Ignore IE." The receiving entity (e.g., DSC, DPC, etc.) may use this criticality information to determine that an IE, an IE group, or an EP is incomprehensible, identify the condition as an abstract syntax error (i.e., a cannot comprehend abstract syntax error), and/or to identify the error-response operations that are to be performed (e.g., reject, ignore, notify, etc.).

In an embodiment, the receiving entity (e.g., DSC, DPC, etc.) may be configured to reject a method/procedure and initiate a DSAAP error indication method (discussed above with reference to FIGS. 17A-B) in response to determining that an information element (IE) included in a message received during the performance of that method/procedure is incomprehensible, and that value of the criticality information for that IE is set to "Reject IE."

For example, when a message that initiates a method/procedure (e.g., a DSC REGISTER REQUEST message, etc.) is received, determined to include one or more IEs/IE groups that are incomprehensible and marked as "Reject IE," the receiving entity may the reject the method/procedure by not executing any of the functional requests included in that message. The receiving entity may also report the rejection of one or more IEs/IE groups using the message normally used to report unsuccessful outcome of the procedure. When the information in the received initiating message is insufficient and cannot be used to determine a value for all IEs that are required to be present in the message used to report the unsuccessful outcome of the procedure, the receiving entity may terminate the procedure and initiate a DSAAP error indication method/procedure.

As a further example, when a message initiating a method/procedure that does not have a message to report unsuccessful outcome is received, and that message includes one or more IEs/IE groups marked with "Reject IE" which the receiving entity does not comprehend, the receiving entity may terminate the method/procedure and initiate a DSAAP error indication method/procedure.

As yet another example, when a response message (e.g., a DSC REGISTER RESPONSE message, etc.) is received that includes one or more IEs marked with "Reject IE" which the receiving entity does not comprehend, the receiving entity may consider the method/procedure as being unsuccessfully terminated, and initiate a local error handling method.

In an embodiment, the receiving entity (e.g., DSC, DPC, etc.) may be configured to ignore or skip a method/procedure and initiate an DSAAP error indication method (discussed above with reference to FIGS. 17A-B) in response to determining that an information element (IE) included in a message received during the performance of that method/procedure is incomprehensible, and that value of the criticality information for that IE is set to "Ignore IE and Notify Sender."

As an example, when a message initiating a method/procedure is received containing one or more IEs/IE groups marked with "Ignore IE and Notify Sender" which the receiving entity does not comprehend, the receiving entity may ignore the content of the incomprehensible IEs/IE groups, continue with the method/procedure as if the incomprehensible IEs/IE groups were not received (except for the reporting) using the comprehended IEs/IE groups, and report in the response message of the method/procedure that one or more IEs/IE groups have been ignored. When the information received in the initiating message is insufficient to determine a value for all IEs that are required to be present in the response message, the receiving entity may terminate the method/procedure and initiate a DSAAP error indication method/procedure.

As a further example, when a message initiating a method/procedure that does not have a message to report the outcome of the method/procedure is received containing one or more IEs/IE groups marked with "Ignore IE and Notify Sender" which the receiving entity does not comprehend, the receiving entity may ignore the content of the not comprehended IEs/IE groups, continue with the method/procedure as if the not comprehended IEs/IE groups were not received (except for the reporting) using the understood IEs/IE groups, and initiate a DSAAP error indication method/procedure to report that one or more IEs/IE groups have been ignored.

As yet another example, when a response message is received containing one or more IEs/IE groups marked with "Ignore IE and Notify Sender" which the receiving entity does not comprehend, the receiving entity may ignore the content of the not comprehended IE/IE groups, continue with the method/procedure as if the not comprehended IEs/IE groups were not received (except for the reporting) using the understood IEs/IE groups and initiate a DSAAP error indication method/procedure.

In an embodiment, the receiving entity (e.g., DSC, DPC, etc.) may be configured to ignore or skip a method/procedure in response to determining that an information element (IE) included in a message received during the performance of that method/procedure is incomprehensible, and that value of the criticality information for that IE is set to "Ignore IE."

As an example, when a message initiating a method/procedure is received containing one or more IEs/IE groups marked with "Ignore IE" which the receiving entity does not comprehend, the receiving entity may ignore the content of the not comprehended IEs/IE groups and continue with the method/procedure as if the not comprehended IEs/IE groups were not received using only the understood IEs/IE groups.

As a further example, when a response message is received that includes one or more IEs/IE groups marked with "Ignore IE" which the receiving entity does not comprehend, the receiving entity may ignore the content of the not comprehended IEs/IE groups and continue with the method/procedure as if the not comprehended IEs/IE groups were not received using the understood IEs/IE groups.

When reporting not comprehended IEs/IE groups marked with "Reject IE" or "Ignore IE and Notify Sender" using a response message defined for the method/procedure, the Information Element Criticality Diagnostics IE may be included in the Criticality Diagnostics IE for each reported IE/IE group.

In an embodiment, the receiving entity (e.g., DSC, DPC, etc.) may be configured to initiate a DSAAP error indication method (discussed above with reference to FIGS. 17A-B) in response to determining that it cannot decode a type of message IE in a received message. In an embodiment, the entity may be configured to only consider the IEs specified in the specification version used by the component when determining the correct order for the IE included in a message.

In an embodiment, the receiving entity (e.g., DSC, DPC, etc.) may be configured to treat the missing IE/IE group according to the criticality information for the missing IE/IE group in the received message specified in the version of the present document used by the receiver.

As an example, the receiving entity (e.g., DSC, DPC, etc.) may be configured to not execute any of the functional requests of a received initiating message in response to determining that the received message is missing one or more IEs/IE groups with specified criticality "Reject IE." The receiving entity may reject the method/procedure and report the missing IEs/IE groups using the message normally used to report unsuccessful outcome of the method/procedure. When it is determined that the information received in the initiating message was insufficient to determine a value for all IEs that are required to be present in the message used to report the unsuccessful outcome of the method/procedure, the receiving entity may terminate the method/procedure and initiate a DSAAP error indication method/procedure.

As a further example, when a received message initiating a method/procedure that does not have a message to report unsuccessful outcome is missing one or more IEs/IE groups with specified criticality "Reject IE", the receiving entity may terminate the method/procedure and initiate a DSAAP error indication method/procedure.

As yet another example, when a received response message is missing one or more IEs/IE groups with specified criticality "Reject IE, the receiving entity may consider the method/procedure as unsuccessfully terminated and initiate a local error handling method/procedure.

As another example, when a received message initiating a method/procedure is missing one or more IEs/IE groups with specified criticality "Ignore IE and Notify Sender", the receiving entity may ignore that those IEs are missing and continue with the method/procedure based on the other IEs/IE groups present in the message and report in the response message of the method/procedure that one or more IEs/IE groups were missing. When the information received in the initiating message is insufficient to determine a value for all IEs that are required to be present in the response message, the receiving entity may terminate the method/procedure and initiate a DSAAP error indication method/procedure.

As another example, when a received message initiating a method/procedure that does not have a message to report the outcome of the method/procedure is missing one or more IEs/IE groups with specified criticality "Ignore IE and Notify Sender", the receiving entity may ignore that those IEs are missing and continue with the method/procedure based on the other IEs/IE groups present in the message and initiate a DSAAP error indication method/procedure to report that one or more IEs/IE groups were missing.

As another example, when a received message a received response message is missing one or more IEs/IE groups with specified criticality "Ignore IE and Notify Sender", the receiving entity may ignore that those IEs are missing and continue with the method/procedure based on the other IEs/IE groups present in the message and initiate a DSAAP error indication method/procedure to report that one or more IEs/IE groups were missing.

As another example, when a received message initiating a method/procedure is missing one or more IEs/IE groups with specified criticality "Ignore IE", the receiving entity may ignore that those IEs are missing and continue with the method/procedure based on the other IEs/IE groups present in the message.

As another example, when a received response message is missing one or more IEs/IE groups with specified criticality "Ignore IE", the receiving entity may ignore that those IEs/IE groups are missing and continue with the method/procedure based on the other IEs/IE groups present in the message.

The receiving entity (e.g., DSC, DPC, etc.) may be configured to respond to messages that include IEs or IE groups that received in wrong order, include too many occurrences, or are erroneously present (i.e., are included and marked as "conditional" when the condition is not met) in various ways. For example, the receiving entity (e.g., DSC, DPC, etc.) may be configured to not execute any of the functional requests of a received initiating message in response to determining that the received message includes IEs or IE groups in wrong order, includes too many occurrences of an IE, or includes erroneously present IEs. The receiving entity may reject the method/procedure and report the cause value "Abstract Syntax Error (Falsely Constructed Message)" using the message normally used to report unsuccessful outcome of the method/procedure. When the information received in the initiating message is insufficient to determine a value for all IEs that are required to be present in the message used to report the unsuccessful outcome of the method/procedure, the receiving entity may terminate the method/procedure and initiate a DSAAP error indication method/procedure.

As another example, when a message initiating a method/procedure that does not have a message to report unsuccessful outcome is received containing IEs or IE groups in wrong order or with too many occurrences or erroneously present, the receiving entity may terminate the method/procedure, and initiate a DSAAP error indication method/procedure using the cause value "Abstract Syntax Error (Falsely Constructed Message)".

As another example, when a response message is received containing IEs or IE groups in wrong order or with too many occurrences or erroneously present, the receiving entity may consider the method/procedure as unsuccessfully terminated and initiate local error handling.

As mentioned above, protocol errors include transfer syntax errors, abstract syntax errors, and logical errors. A logical error occurs when a message is comprehended correctly, but the information contained within the message is not valid (i.e. semantic error), or describes a method/procedure which is not compatible with the state of the receiving entity.

In an embodiment, a receiving entity (e.g., DSC, DPC, etc.) may be configured to perform error response operations based on the class of the method/procedure and irrespective of the criticality information of the IE's/IE groups containing the erroneous values in response to determining/detecting an logical error.

For example, when a logical error is detected in a request message of a class 1 method/procedure, and the method/procedure has a message to report this unsuccessful outcome, this message may be sent with an appropriate cause value (i.e., in the clause IE), such as "semantic error" or "message not compatible with receiver state." When a logical error is detected in a request message of a class 1 method/procedure, and the method/procedure does not have a message to report this unsuccessful outcome, the method/procedure may be terminated and a DSAAP error indication method/procedure may be initiated with an appropriate cause value. Where the logical error exists in a response message of a class 1 procedure, the procedure may be considered as unsuccessfully terminated and local error handling may be initiated.

When a logical error is detected in a message of a class 2 procedure, the procedure may be terminated and a DSAAP error indication procedure may be initiated with an appropriate cause value.

In the various embodiments, the receiving entity (e.g., DSC, DPC, etc.) may be configured to perform a local error handling method/procedure (as opposed to a DSAAP error indication method/procedure) when a protocol error is detected in the ERROR INDICATION message. In case a response message or error indication message needs to be returned, but the information necessary to determine the receiver of that message is missing, the procedure may be considered as unsuccessfully terminated and local error handling may be initiated. When an error that terminates a procedure occurs, the returned cause value may reflect the error that caused the termination of the procedure even if one or more abstract syntax errors with criticality "ignore and notify" have earlier occurred within the same procedure.

Using the DSA/DSAAP methods described above, the DSA system may provide dynamic and real-time access to spectrum resources. As such, spectrum resources may be available at networks which are not listed on the wireless device's home network, PLMN, or preferred roaming list.

In an embodiment, a wireless device may be programmed in advance with an appropriate PLMN list and provisioned over-the-air on the secondary home network list. The over-the-air provisioning may provide instructions to one or a group of wireless devices to reinitiate the cell selection process with an updated PLMN list or updated list of preferred networks. Alternatively or in addition, the wireless device may be configured with a client application which upon receipt of a WAP/SMS message enables the wireless device to search for a PLMN that has been made available in the DSA process.

Several methods may be used to allow the wireless devices to access available resources on different networks. In the DSA communication system, there are at least two types of networks or source systems: virtual or existing networks. Virtual networks may include networks that utilize the Radio Access Network (RAN) of the primary network. When connecting to virtual networks, the DPC 146 may control the access of the secondary wireless devices, and access RF spectrum resources and the subscriber records of the primary system to allow the secondary users to appear as roamers on the primary network. The secondary user wireless devices may use a list of preferred networks to access virtual networks.

Alternatively, when originating using existing networks, the secondary user wireless device may make a cell selection based upon a priority list of networks participating in the DSA communication system. Once the secondary user wireless device is authenticated, the DPC 144 may validate the secondary user to access resources on the primary network. If authentication or validation is not successful, the DPC may send a request to the secondary wireless device (e.g., via a client in the device) to re-originate onto the proper system.

In an embodiment, the wireless devices may include a universal subscriber identity module or USIM. The USIM may be a single or dual USIM. Critical information such as data required to select the correct network may be stored on the USIM. By using a USIM, a wireless device may be enabled to no longer use a PLMN. USIM may have stored upon it information such as home International Mobile Subscriber Identity, or IMSI (HPLMN), prioritization list of permitted VPLMNs and forbidden PLMNs list.

If a wireless device uses a dual USIM, it may be enabled to immediately access spectrum resources available in an alternative network. The dual USIM may further enable a multi-band, multimode wireless device to access a variety of networks in the DSA as well as using standard roaming arrangements.

Figure 18:
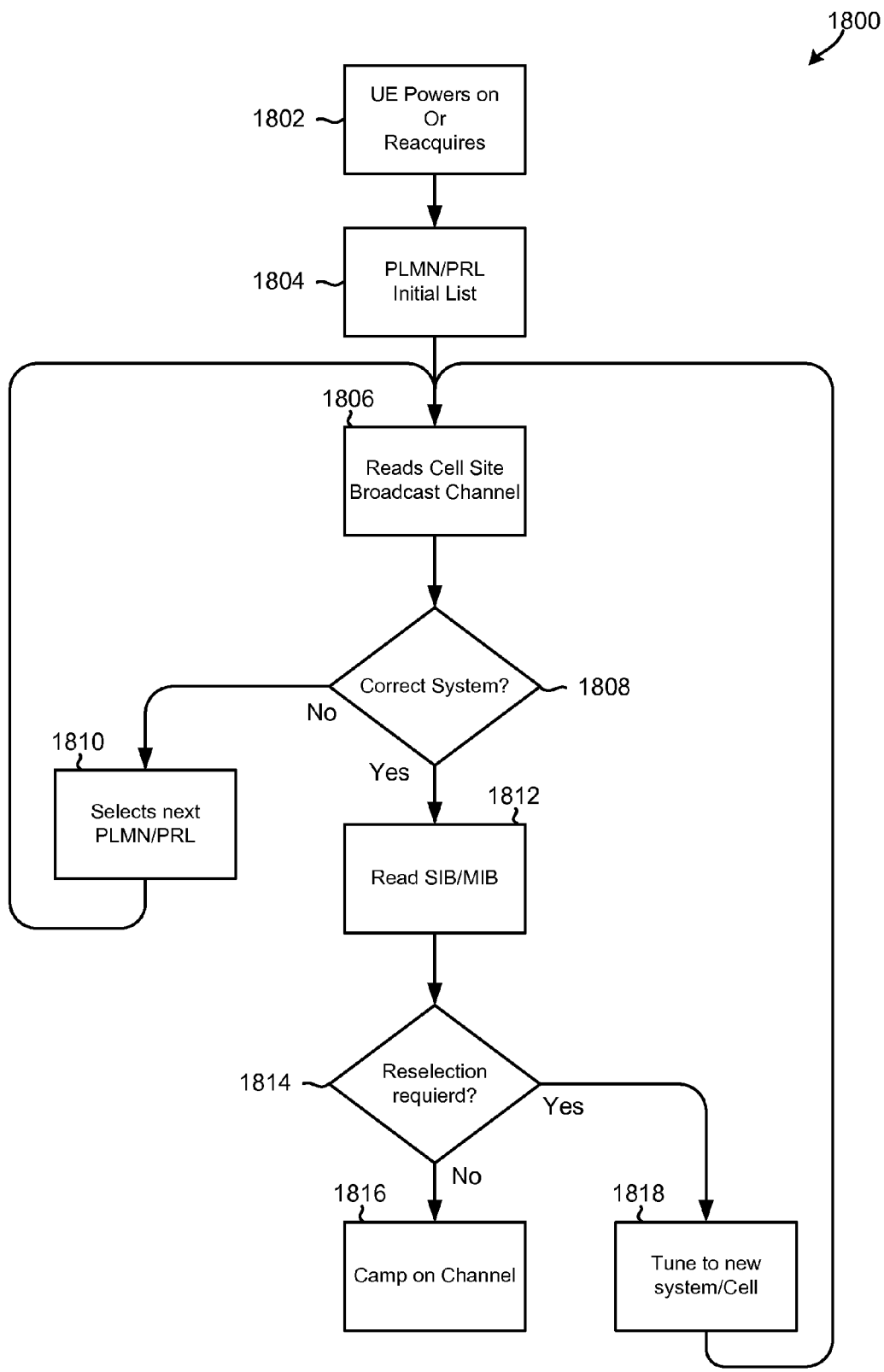
FIG. 18 is a process flow diagram illustrating an embodiment method for network selection and reselection in a DSA communication system.

FIG. 18 illustrates an embodiment method 1800 for network and cell initialization by a wireless device in the DSA system. Method 1800 may be performed in a processing core of a wireless device 102.

In block 1802, a wireless device is powered on and attempts to establish connectivity (or the wireless device attempts reestablish connectivity) by initiating the initial network and cell selection operations. In block 1804, the wireless device 102 may search the preferred networks list (e.g., PLMN/PRL list) that is stored on the device. In block 1806, the wireless device may select a cell by receiving, reading, and determining the signal strengths of nearby cell site broadcast channels.

In determination block 1808, the wireless device may read the cell site broadcast channel and determine whether the cell site offers the correct network, system, or technology. The wireless device may select and establish a connection to the best cell site available, which may be identified via the wireless device measuring the adjacent cells based upon the access technology to determine which cell is the best to utilize. In response to determining that the selected network/cell is not correct or available (i.e., determination 1808="No"), in block 1810, the wireless device may use the Any Cell Selection process/stage and continue to search for a suitable cell site by selecting the next PLMN/PRL listing until it finds a site that allows normal access following the access protocol in the appropriate PLMN list.

In response to determining that the selected network/cell is correct and available (i.e., determination 1808="Yes"), in block 1812, the wireless device may request and/or receive a System Information Block (SIB)/Master Information Block (MIB) transmitted from the selected cell site. The SIB/MIB may include information about the network that the cell site is serving and available services through that network, such as PLMN ID(s), Cell ID, closed subscriber groups IDs, traffic allocation identifiers (TAI) (routing area), an LTE neighbor list, a list of LTE non system sites, GSM Cells, UMTS cells, CDMA cells, etc. This information may be used by the wireless device for various different purposes.

For example, when the wireless device moves from eNodeB to eNodeB, it may use the SIB/MIB information sent from the new eNodeB to determine that a change has occurred in the serving eNodeB. To detect the change in eNodeB, the wireless device may identify the change in SIB/MIB information which may include a change in change in the PLMN availability and TAI parameters. The TAI parameters may define specific routing areas that can further be used to refine a geographic region in which the wireless device can use available resources.

The cell site may receive the SIB/MIB and network information via the HSS 132 of the network. In addition to the data transmitted through the SIB, the HSS 132 of the network may also provide the information as to which PGW(s) the wireless device may use to access resources on the network.

In determination block 1814, the wireless device may determine whether reselection is required. If no reselection is required (i.e., determination block 1814="Yes"), in block 1816, the wireless device may camp on the cell channel. If system reselection is required (i.e., determination block 1814="No"), in block 1818, the wireless device may be instructed to reselect a new cell or system based on the cell selection/reselection process.

While camping on the selected cell site, the wireless device may receive additional information and instructions over the air from the selected network, such as updated list of public land mobile network or PLMN/PRL. The wireless device may also continue to monitor the SIB/MIB for any changes or additional information.

In an embodiment, the SIB/MIB may provide a Secondary Access Class which may enable the wireless device to determine which channels based on the DSA process it can use for access through the reselection process. The SIB/MIB may also include data to enable the camping wireless device to reselect another radio access technology (IRAT) and attempt to acquire a control channel on the new Radio Access Terminal (RAT). The information in the SIB/MIB may, thus, be used to instruct a wireless device to reselect another RAT that is associated with the same or another network which may be on another frequency band.

Cell reselection, which may trigger PLMN selection, may be controlled via specific parameters. For example, the DSA communication system may employ barred PLMN-id to prevent a wireless device using resources from one network to attempt to roam on to other networks. For example, the DSA communication system may prevent a secondary user wireless device using resources of a primary host network to roam back to or establish connection with the secondary home network. Similarly, the DSA communication system using a PLMN id prioritization scheme that is over the air (OTA), client activated or dual USIM driven may also prevent a wireless device using resources of a network to reestablish connection with other networks unless the DSA communication system rules permit.

In an embodiment, a wireless device that is camping at a cell site may be instructed to perform cell reselection when the capacity of the current cell reaches a predetermined level. In such a scenario, the DSC 144 of the current camping network may change the SIB/MIB of the current network to include instructions the camping wireless device to perform a cell reselect and search for another TAI area or system. The instructions to perform a cell reselect may also be forwarded by the WAP/SMS message to the wireless device.

The wireless device may be configured to perform cell reselection operations based on changes in the TAI. When using a network, different wireless devices may be assigned different TAI's depending on their particular uses and device types. For example, a network may assign one TAI to DSA communication system users. The network may also assign another TAI to devices which do not use the DSA communication system. The advantage of using multiple and layered TAI's may enable the TAI assigning network to selectively tailor usage traffic. The multiple and layered TAI's may further enable the TAI assigning networks to prevent the wireless devices that may have correct PLMN-id but are not supposed to use the selected area from selecting the cells but may be denied service or may be forced into cell reselection.

In an embodiment, a special client may be installed on DSA communication system compatible wireless devices to enable the wireless devices to determine which system and RAT is supposed to use on secondary bases. The PLMN/PRL list of the client application may be updated by receiving an SMS or WAP that may be transmitted to the handset via a text message or through a data (IP) session. The updated client application may instruct the wireless device to go to the proper channel for accessing allocated resources of a primary network.

Using a client application may facilitate the implementation of the DSA communication system in legacy networks and systems which may or may not possess the ability (e.g., due to software load) to have a secondary access channel defined in the SIB.

In idle mode, the wireless device may be instructed to perform intra and inter frequency measurements in the cell reselection process. Using information in the SIB/MIB or from the client application, the wireless device may perform intra-frequency search, inter-frequency, or inter-radio access tech (iRAT). This process may be controlled by UTRAN. The Intra and Inter frequency measurements or inter-radio access technologies may be on a region or cell/sector bases, depending on configuration of the wireless device.

Once the wireless device selects the appropriate cell site and before it enters an idle mode, the wireless device may need to be authenticated by the system on which it is camping.

The selected network requires validation and authentication of the wireless device to ensure that the device possesses the required permissions to access the network.

The DSA communication system may authenticate a wireless device using different methods. Authentication of the wireless device with the DSA may depend on the business arrangements between different providers and the DSA system. For example, authentication may be based on general or prioritization levels. The authentication process may be followed using the DPC 146 HSS 132 as the anchor and this may be accessed by the AAA/AuC of the 3G/2.5G networks of the PCRF in LTE or similar platform. The Host Network may authenticate the secondary users by using standard MAP/IS-41 signaling.

Upon authentication, each entrant may be assigned: (a) defined usage level allowed on host network; duration permitted on system; purchase type (e.g., wholesale or a range of IMI's); HSS would allow redirecting of inbound calls; applications would continue where they relied on a server which is accessible from the backend.

In an embodiment, the initial cell selection and origination for DSA may follow that which is identified in the 3GPP specifications. The initial cell selection may include the wireless device selecting the appropriate network and cell for use. The Initial cell selection and origination process may not be required for the license area or regional area spectrum allocation, since these may effectively be the home network (home PLMN) and the initial cell selection that takes place may be transparent to the end user wireless device.

In an embodiment, the DSA process may include utilizing a network/cell access algorithm so that the wireless device acquires the correct network. The initial network and cell selection may begin when the wireless device is either powered on or is trying to reestablish connectivity. The wireless device may be programmed to search form a preferred list of networks (PLMN) and radio carriers it is authorized to utilize. The wireless device may begin this process through examination of an existing PLMN/PRL list that is programmed into the wireless device, and which identifies authorized networks (PLMN id's) and carriers that the wireless device is to use in a rank order. The wireless device may be programmed in advance with the appropriate PLMN list (i.e., preferred list of networks). The wireless device may also be provisioned Over the Air (OTA) on the home network, thereby instructing the wireless device or group of wireless device's to reinitiate the cell selection process with an updated PLMN list. Alternatively the wireless device can have a client app that has been pre-installed on the device which upon receipt of a WAP/SMS message is able to begin searching for a PLMN that has been made available due to the DSA process.

In an embodiment, the wireless device may include a USIM card or memory. The USIM in the wireless device may be a single USIM or a dual USIM. The USIM may include information suitable for use when selecting the correct network and/or when determining that a PLMN should not be used. In an embodiment, the USIM may include a Home IMSI (HPLMN), a prioritized list of permitted VPLMNs, and a list of forbidden PLMNs. The use of a dual USIM may facilitates the immediate use of an alternative network, and may enable a multimode, multiband wireless device to access a variety of networks using DSA in addition to standard roaming arrangements.

After the carrier, network and cell are determined/selected, the wireless device may make the initial selections, receive the required information, and camp on the cell unit until further action is required. In the process, the cell site to which the wireless device is attached or communicating initially may provide various different types of network information and services, any or all of which may be made available through communication with the HSS. The HSS may also provide the information as to the PGW that wireless device can use.

In an embodiment, a closed subscriber group (CSG) identifier may be provided as part of the information sent to the wireless device. The CSG id may define a specific CSG or hybrid cells that can further be used to refine a geographic region that the wireless device is allowed to utilize. In addition, when the wireless device moves from first eNodeB to second eNodeB, the MIB information sent from the eNodeB can change to indicate a change in PLMN availability as well as CSG id differences. In addition to PLMN and CSG id information, the wireless device may receive a list of alternative LTE sites that can be utilized in addition to other radio access technologies and the associated neighbor lists. All of this information may be made available on the System Information Broadcast information (SIB) messages.

As discussed above, when the wireless device is powered on, it searches for strongest cell in preferred PLMN/PRL list. The wireless device searches for the strongest cell then performs the PLMN/PRL selection and cell selection process. During the cell selection process the wireless device reads the System Information Block (SIB) information which is sent from the cell site. If at initiation a suitable cell is not available, the wireless device may utilize the Any Cell Selection process/stage and continue to hunt (e.g., using heuristics and trial and error) until it finds a site that allows normal access—following the access protocol for the wireless device using the appropriate PLMN list. After initial acquisition the wireless device camps on the cell that matches the correct PLMN and scans for other cells to determine which cell is the best serving cell. This may be achieved by the wireless device measuring the adjacent cells based on the access technology to determine which cell is the best to utilize.

Based on the SIB information, the wireless device may camp on the cell or be instructed to reselect a new cell or system based on the cell selection/reselection process. Additionally the SIB can also instruct the wireless device to reselect another Radio Access Technology (RAT) that is associated with the same or another network which may be on a another frequency band.

Once the wireless device is camped on the channel, it can receive additional information and instructions. While camping on the channel the wireless device can have its PLMN/PRL list (e.g., preferred list of networks) updated over the air. The SIB may also be monitored for additional information. A Secondary Access Class may also be defined, which may enable the wireless device to determine a channel for use in the reselection process. The SIB can also inform the wireless device to reselect another radio access technology (RAT) and have the wireless device then attempt to acquire a control channel on the new RAT.

As discussed above, a wireless device may include a single or dual USIM configured to facilitate the proper acquisition of the network matching the DSA process. In addition the wireless device may include a client software application that identifies the lessor networks/cells that are to be used as a secondary basis. Based on the client software, the wireless device will be able to determine which system and RAT it is supposed to utilize. The updated PLMN/PRL list using a client application can be obtained from a SMS or WAP, pushed to the handset or done via a text message or through a data (IP) session for the information.

Cell reselection, which will trigger PLMN selection is controlled via specific parameters. The use of barred PLMN-id may be used as part of the DSA process to prevent a wireless device with home network coverage attempting to roam on a visited network, in some cases the true home network. The DSA process using a PLMN id prioritization scheme that is OTA or client activated or dual USIM driven will also prevent the wireless device when it moves out of a coverage area of the cell from trying to reacquire the true home network unless the DSA rules permit.

Additionally through DSA cell reselection can be invoked when capacity situations occur at the cell being camped, or the network the wireless device is instructed to use. The DSC will then uses the OMC change the MIB/SIB information for the effected cells or network instructing the wireless device to look for another CSG area or system. The instructions can also be forwarded by a WAP/SMS message the wireless device.

Figure 19:
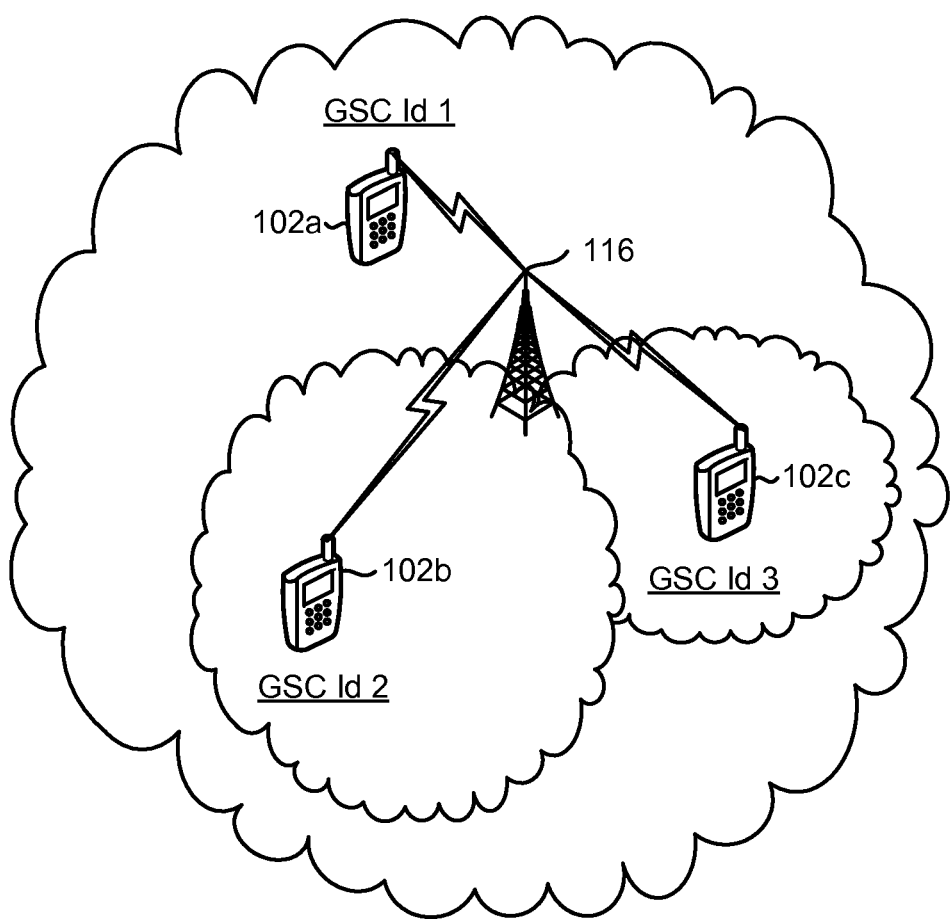
FIG. 19 is a component block diagram illustrating that virtual bid areas may be determined based on closed subscriber groups in an embodiment.

FIG. 19 is a component block diagram illustrating that virtual bid areas may be determined based on closed subscriber groups (CSGs) or CSG Ids. In the example illustrated in FIG. 19, each of wireless devices 102a, 102b, 102c is attached to an eNodeB 116 in a lessor network. The first wireless device 102a is a subscriber to the lessor network, and is assigned CSG Id 1. The second and third wireless devices are subscribers of a lessee network, and assigned CSG Id 2 and CSG Id 3 respectively. Thus, each of the wireless devices 102a, 102b, 102c may be assigned a different CSG Id, which may be based on a specific bid offered by lessor network and won/purchased by the lessee network.

That is, in the example illustrated in FIG. 19, the lessor network is using CSG Id1 for its home network and for its home users while all the lessor cells are operating in hybrid access mode. This allows the lessor users (e.g., wireless devices 102) to be prioritized, and all other lessee users (CSG Id 2 and CSG Id 3) treated as secondary users with secondary priority of access. Also, different QoS may be applied to primary vs. secondary users.

It should be understood that, in example illustrated in FIG. 19, wireless devices 102b, 102c are not provided with a separate routing areas or virtual cells. Rather, these devices/CSG ids allow the lessor network to identify lessee wireless devices that are specific to a bid. This allows the lessor network to filter/categorize the wireless devices 102a, 102b, 102c, and apply differentiated services based on the bid specific policies and/or apply bid specific charging. As such, the use of CSG Ids in this manner may allow the lessor network to manage the access and use of its resources by the wireless devices on a per-user and per-bid basis.

Figure 20:
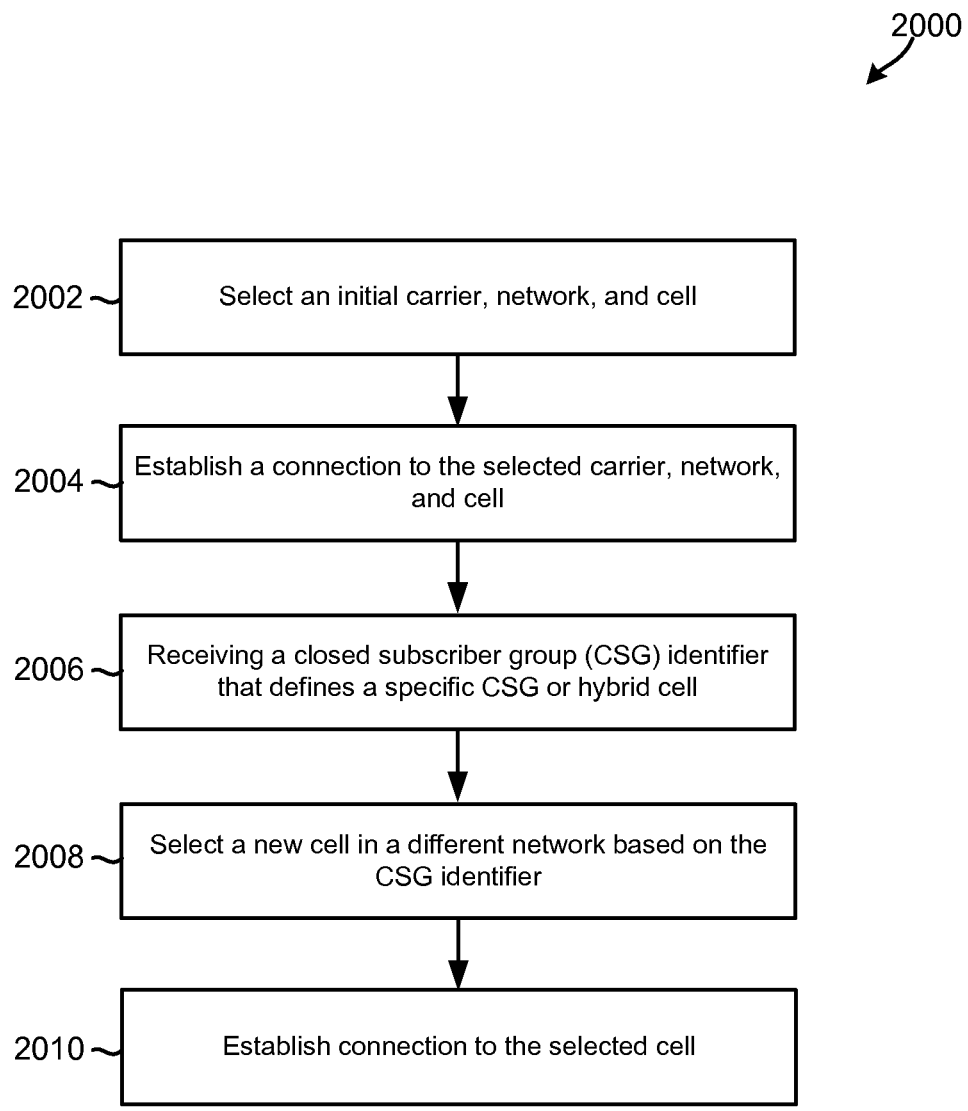
FIG. 20 is a process flow diagram illustrating an embodiment DSA method for using closed subscriber group identifiers as part of the network selection and reselection operations.

FIG. 20 illustrates an embodiment cell selection method 2000 for selecting a carrier, network, and/or cell based on CSG Ids. Method 2000 may be performed in a processing core of a wireless device.

In block 2002, the processing core may select an initial carrier network and cell. In block 2004, the processing core may establish a connection or communication link to the selected carrier, network, and cell. In block 2006, the processing core may receive a CSD Id that defines a specific CSG or hybrid cell. In block 2008, the processing core may select a new cell in a different network based on the CSG identifier. In block 2010, the processing core may establish connection to the selected cell.

The various embodiments may include or use a dynamic spectrum arbitrage application part (DSAAP) protocol and/or component that is configured to allow, facilitate, support, or augment communications between two or more DSA components (e.g., DPC, DSC, eNodeB, MME, HSS, etc.) so as to improve the efficiency and speed of the DSA system. A DSA component may be any component discussed in this application and/or any component that participates in any of the DSA operations, communications, or methods discussed in this application. As such, the DSAAP component(s) may be configured to allow, facilitate, support, or augment communications between any of the components discussed in this application, including the communications between a DPC component and a DSC component, between the DSC component and a eNodeB component, between the DSC component and an MME component, between the DSC component and an HSS component, between the MME component and the HSS component, between the eNodeB component and a wireless device, etc.

To facilitate the communications between two or more DSA components, the DSAAP component(s) may publish application programming interfaces (API) and/or include client modules that facilitate communications between the DSA components. In addition, the DSAAP component(s) may be configured to allow the DSA components to communicate specific information, use specific communication messages, and/or perform specific operations that together provide various DSA functions that further improve the efficiency and speed of the DSA system and participating networks.

As an example, the DSAAP component(s) may be configured to allow an eNodeB to communicate with a DSC component (e.g., via the Xe interface), with other eNodeBs (e.g., via an X2 interface), and with various other components (e.g., via the S1 interface). As a further example, the DSAAP component(s) may be configured to allow, facilitate, support, or augment communications between the DSC component and the DPC component so as to allow the DPC and/or DSC components to better pool resources across the different networks, better monitor traffic and resource usage in the various networks, to more efficiently communicate bids and bidding information, to quickly and efficiently register and deregister components, and better perform backoff operations. The DSAAP component(s) may also improve the DSA resource auctioning operations by improving the performance and efficiency of the procedures for bidding, generating invoices, advertizing resources, requesting resources, purchasing resources, validating bid credentials, etc.

In the various embodiments, all or portions of the DSAAP component may be included in one or more DSA components, such as a DPC component, a DSC component, an eNodeB component, an MME component, and an HSS component. The DSAAP component may be implemented in hardware, software, or a combination of hardware and software. In an embodiment, the DSAAP component may be configured to implement a DSAAP protocol, which may be defined over the Xe, Xd, and/or X2 reference points. In various embodiments, the Xe reference point between DSC and eNodeB may use the DSAAP protocol, TR-069 protocol, and/or TR-192 data model extensions to support listing available resources at the eNodeB and notifying the eNodeB of bid/buy confirmations. The Xd reference point between DSC and DPC may use the DSAAP protocol for dynamic spectrum and resource arbitrage operations. The X2 interface/reference point between the eNodeBs may also use the DSAAP protocol to communicate information.

In various embodiments, the DSAAP component(s) may be configured to allow the various DSA components (e.g., DSC, DPC, eNodeB, etc.) to communicate using the DSAAP protocol and/or to perform various DSAAP methods. DSAAP methods may be performed in any of the DSA systems discussed in this application, such as a system that includes a first DSC server in a first telecommunication network (e.g., a lessee network), a second DSC server in second telecommunication network (e.g., a lessor network), and a DPC server that is outside of the first and second telecommunication networks.

Figure 21:
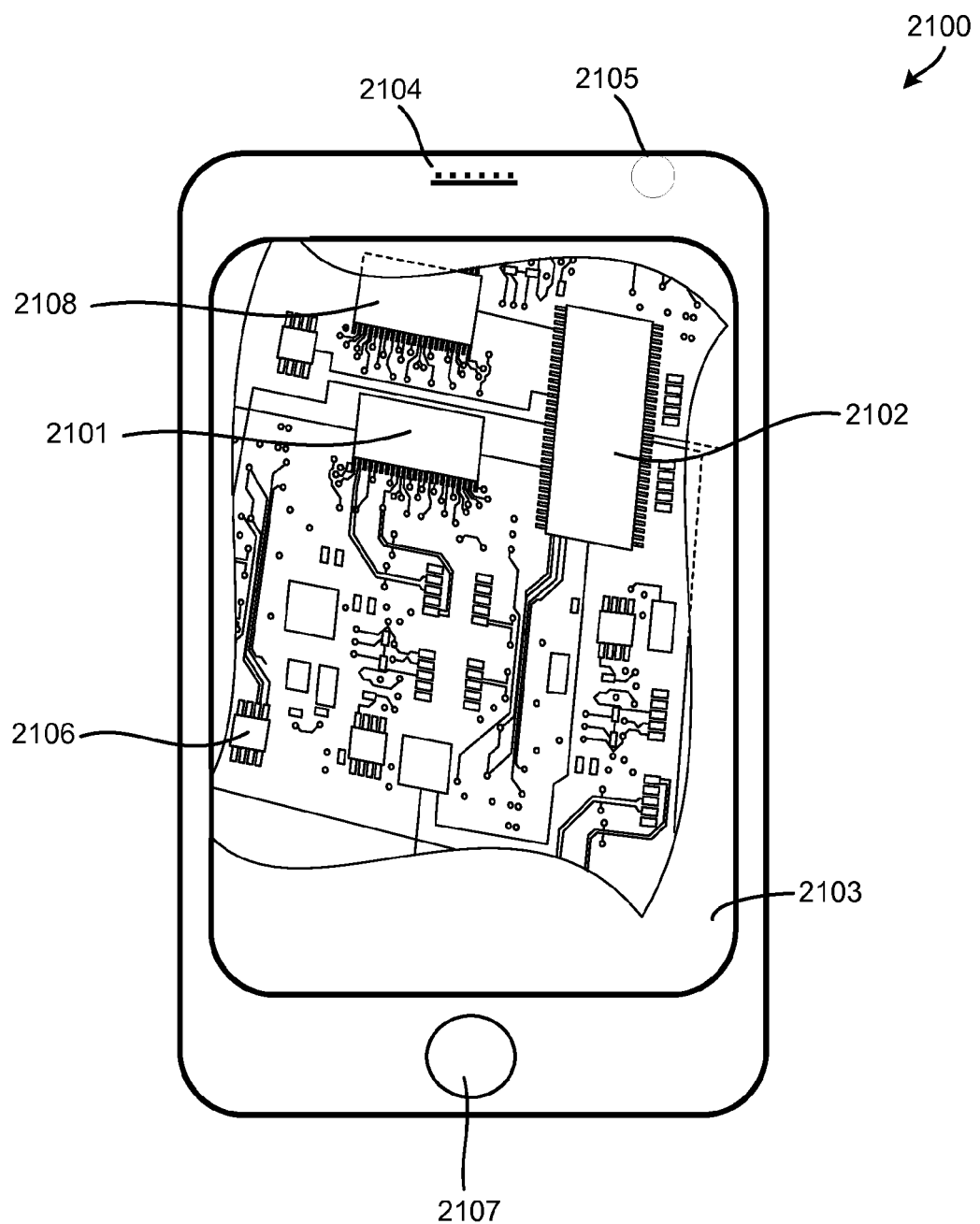
FIG. 21 is a component block diagram of an example wireless device suitable for use with the various embodiments.

The various embodiments may be implemented on a variety of mobile wireless computing devices, an example of which is illustrated in FIG. 21. Specifically, FIG. 21 is a system block diagram of a mobile transceiver device in the form of a smartphone/cell phone 2100 suitable for use with any of the embodiments. The cell phone 2100 may include a processor 2101 coupled to internal memory 2102, a display 2103, and to a speaker 2104. Additionally, the cell phone 2100 may include an antenna 2105 for sending and receiving electromagnetic radiation that may be connected to a wireless data link and/or cellular telephone transceiver 2106 coupled to the processor 2101. Cell phones 2100 typically also include menu selection buttons or rocker switches 2107 for receiving user inputs.

A typical cell phone 2100 also includes a sound encoding/decoding (CODEC) circuit 2108 which digitizes sound received from a microphone into data packets suitable for wireless transmission and decodes received sound data packets to generate analog signals that are provided to the speaker 2104 to generate sound. Also, one or more of the processor 2101, wireless transceiver 2106 and CODEC 2108 may include a digital signal processor (DSP) circuit (not shown separately). The cell phone 2100 may further include a ZigBee transceiver (i.e., an IEEE 802.15.4 transceiver) for low-power short-range communications between wireless devices, or other similar communication circuitry (e.g., circuitry implementing the Bluetooth® or WiFi protocols, etc.).

Figure 22:
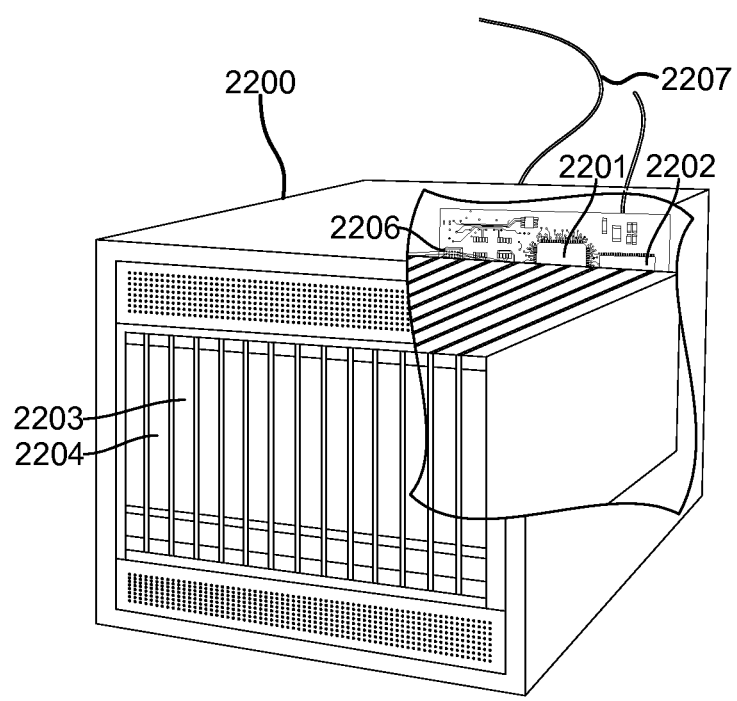
FIG. 22 is a component block diagram of a server suitable for use with an embodiment.

The embodiments described above, including the spectrum arbitrage functions, may be implemented within a broadcast system on any of a variety of commercially available server devices, such as the server 2200 illustrated in FIG. 22. Such a server 2200 typically includes a processor 2201 coupled to volatile memory 2202 and a large capacity nonvolatile memory, such as a disk drive 2203. The server 2200 may also include a floppy disc drive, compact disc (CD) or DVD disc drive 2204 coupled to the processor 2201. The server 2200 may also include network access ports 2206 coupled to the processor 2201 for establishing data connections with a network 2207, such as a local area network coupled to other communication system computers and servers.

The processors 2101, 2201, may be any programmable microprocessor, microcomputer or multiple processor chip or chips that can be configured by software instructions (applications) to perform a variety of functions, including the functions of the various embodiments described below. In some wireless devices, multiple processors 2201 may be provided, such as one processor dedicated to wireless communication functions and one processor dedicated to running other applications. Typically, software applications may be stored in the internal memory 2102, 2202, before they are accessed and loaded into the processor 2101, 2201. The processor 2101, 2201 may include internal memory sufficient to store the application software instructions. In some servers, the processor 2201 may include internal memory sufficient to store the application software instructions. In some receiver devices, the secure memory may be in a separate memory chip coupled to the processor 2101. The internal memory 2102, 2202 may be a volatile or nonvolatile memory, such as flash memory, or a mixture of both. For the purposes of this description, a general reference to memory refers to all memory accessible by the processor 2101, 2201, including internal memory 2102, 2202, removable memory plugged into the device, and memory within the processor 2101, 2201 itself.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DPC), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DPC and a microprocessor, a plurality of microprocessors, one or more microprocessors in conjunction with a DPC core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A dynamic spectrum arbitrage (DSA) method, comprising:
    traversing by a processor of a wireless device an ordered list of preferred of networks to select a first cell site in a first telecommunication network;
    establishing a first communication link between the wireless device and the selected first cell site;
    receiving in the wireless device network information identifying a geographic region in which the wireless device is allowed to use resources of a second telecommunication network;
    determining whether the wireless device is in the geographical region;
    receiving network information in a first dynamic spectrum controller (DSC) in the first telecommunication network;
    sending the network information from the first DSC to a dynamic spectrum policy controller (DPC) that is outside of the first and second telecommunication networks; and
    sending the network information from the DPC to a second DSC in the second telecommunication network; and
    establishing a second communication link between the wireless device and a second cell in the second telecommunication network based on the received network information and in response to determining that the wireless device is in the geographical region.

2. The DSA method of claim 1, wherein receiving network information comprises receiving a closed subscriber group (CSG) identifier that defines a specific CSG or hybrid cell in the second telecommunication network.

3. The DSA method of claim 1, wherein:
    establishing the first communication link between the wireless device and the selected first cell site comprises establishing the first communication link to a home network of the wireless device; and
    establishing the second communication link between the wireless device and the second cell in the second telecommunication network based on the received network information comprises establishing the second communication link to a cell site in a lessor network that is different than the home network of the wireless device.

4. The DSA method of claim 1, wherein receiving network information comprises receiving system information block (SIB) information.

5. The DSA method of claim 1, wherein establishing the second communication link between the wireless device and the second cell in the second telecommunication network based on the received network comprises establishing a connection between the wireless device and another Radio Access Technology (RAT) that is associated with the same or another network.

6. The DSA method of claim 1, wherein establishing the second communication link between the wireless device and the second cell in the second telecommunication network based on the received network comprises establishing a connection on another frequency band.

7. The DSA method of claim 1, wherein the wireless device includes a dual USIM configured to facilitate the proper acquisition of a network using a DSA process.

8. The DSA method of claim 1, further comprising:
    receiving in a processor of the DPC a request for radio frequency (RF) spectrum resources from the first DSC;
    determining an amount of RF spectrum resources available for allocation within the second telecommunication network;
    dynamically allocating a portion of available RF spectrum resources of the second telecommunication network for access and use by the first telecommunication network; and
    informing the first DSC that use of allocated RF spectrum resources may begin.

9. A dynamic spectrum arbitrage (DSA) system, comprising:
    a wireless device comprising a device processor; and
    a first dynamic spectrum controller (DSC) comprising a first DSC processor,
    wherein the device processor is configured with processor-executable instructions to perform operations comprising:
        traversing an ordered list of preferred of networks to select a first cell site in a first telecommunication network;
        establishing a first communication link to the selected first cell site;
        receiving network information from the DSC identifying a specific geographic region in which the wireless device is allowed to use resources of a second telecommunication network;
        determining whether the wireless device is in the geographical region; and
        establishing a second communication link to a second cell in the second telecommunication network based on the received network information, and
    wherein the first DSC processor is configured with processor-executable instructions to perform operations comprising:
        receiving the network information; and
        sending the network information to a dynamic spectrum policy controller (DPC) that is outside of the first and second telecommunication networks for forwarding to a second DSC in the second telecommunication network.

10. The DSA system of claim 9, wherein the device processor is configured with processor-executable instructions to perform operations such that receiving network information comprises receiving a closed subscriber group (CSG) identifier that defines a specific CSG or hybrid cell in the second telecommunication network.

11. The DSA system of claim 9, wherein the device processor is configured with processor-executable instructions to perform operations such that:

establishing the first communication link to the selected first cell site comprises establishing the first communication link to a cell site in the home network of the wireless device; and establishing a second communication link to a second cell in the second telecommunication network based on the received network information comprises establishing the second communication link to a cell site in a lessor network that is different than the home network of the wireless device.

12. The DSA system of claim 9, wherein the device processor is configured with processor-executable instructions to perform operations such that receiving network information comprises receiving system information block (SIB) information.

13. The DSA system of claim 9, wherein the device processor is configured with processor-executable instructions to perform operations such that establishing the second communication link between the wireless device and the second cell in the second telecommunication network based on the received network comprises establishing a connection between the wireless device and another Radio Access Technology (RAT) that is associated with the same or another network.

14. The DSA system of claim 9, wherein the device processor is configured with processor-executable instructions to perform operations such that establishing the second communication link between the wireless device and the second cell in the second telecommunication network comprises establishing a connection on another frequency band.

15. The DSA system of claim 9, wherein the wireless device includes a dual USIM configured to facilitate the proper acquisition of a network using a DSA process.

16. The DSA system of claim 9, wherein the DPC includes a DPC processor configured with processor-executable instructions to perform operations comprising:

receiving a request for radio frequency (RF) spectrum resources from the first DSC;

determining an amount of RF spectrum resources available for allocation within the second telecommunication network;

dynamically allocating a portion of available RF spectrum resources of the second telecommunication network for access and use by the first telecommunication network; and informing the first DSC that use of allocated RF spectrum resources may begin.

\* \* \* \* \*